United States Patent

Asamura et al.

[19]

[11] Patent Number: 6,081,649
[45] Date of Patent: *Jun. 27, 2000

[54] DIGITAL VTR FOR PROCESSING INTRA-PICTURE DATA ACCORDING TO REPLAY MODES

[75] Inventors: Masako Asamura; Satoshi Kurahashi; Tomohiro Ueda; Taketoshi Hibi; Tatsuo Yamasaki; Junko Ishimoto; Tohru Inoue; Ken Onishi, all of Nagaokakyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/925,074

[22] Filed: Sep. 8, 1997

Related U.S. Application Data

[63] Continuation of application No. 08/417,107, Apr. 5, 1995, abandoned.

[30] Foreign Application Priority Data

| Apr. 12, 1994 | [JP] | Japan | 6-099370 |
| Apr. 14, 1994 | [JP] | Japan | 6-102235 |
| Apr. 15, 1994 | [JP] | Japan | 6-102206 |
| Apr. 21, 1994 | [JP] | Japan | 6-107985 |
| May 10, 1994 | [JP] | Japan | 6-121718 |
| Aug. 8, 1994 | [JP] | Japan | 6-186036 |

[51] Int. Cl.[7] .................................................. H04N 5/91
[52] U.S. Cl. ........................................... 386/81; 386/111
[58] Field of Search .................................. 386/6, 7, 8, 33, 386/68, 69, 78, 80, 81, 109, 110, 111, 112; 360/8; H04N 5/91

[56] References Cited

U.S. PATENT DOCUMENTS

| 4,651,239 | 3/1987 | Omori et al. . |
| 4,663,673 | 5/1987 | Doutsubo ................................. 360/9.1 |
| 4,679,099 | 7/1987 | Edakubo ................................. 360/10.2 |

(List continued on next page.)

FOREIGN PATENT DOCUMENTS

| 0546691 | 11/1992 | European Pat. Off. . |
| 0551672 | 12/1992 | European Pat. Off. . |
| 0546691A2 | 6/1993 | European Pat. Off. . |

OTHER PUBLICATIONS

Anderson, Charles E.; Diermann, Joachim; Digitale Fernsehaufzeichnung—Fragen jenseits der Durchführbarkeit; In: Fernseh–und Kino–Technik, 1980, No. 4, pp. 119 to 123.

Siakkou, Manfred: Digitale Bild–und Tonspeicherung; 1st edition, Berlin, VEB Verlag Technik, 1985, pp. 246 to 255, ISBN 3–211–95816–9.

Yanagihara et al., "A Recording Method of A TV Data on a Consumer Digital VCR"; HDTV'93 Proceedings, vol. II, Oct. 26–28, 1993; Ottawa, Canada.

"A Study on Variable–Speed Reproduction of the Digital VTR" by Y. Hirano, S. Mita, A. Kohgami, Y. Eto, K. Takeshita, and N. Fujimura; SMPTE Journal, Jun. 1983, pp. 636–641.

"Discrete–Time Signal Processing" by A. Oppenheim and R. Schafer; Prentice Hall, Englewood Cliffs, NJ 07632; 1989; pp. 101–112.

Translation of a submission to the German Patent Office, Munich, by Philips Patentverwaltung GmbH, Hamburg, dated Dec. 13, 1996.

*Primary Examiner*—Young Lee

[57] ABSTRACT

A digital VTR for magnetically recording and replaying a bit stream, includes a detector, an extractor, a mode designator, and an output unit. The detector detects intra-picture data in the bit stream being replayed from tracks in a magnetic medium. The extractor extracts the intra-picture data from the bit stream based on output from the detector. The mode designator designates one of a normal replay and a slow replay as a replay mode. The slow replay is replay performed at a speed slower than normal replay. The output unit stores the extracted intra-picture data, and outputs only the extracted intra-picture data as replay picture data when the slow replay mode is designated.

17 Claims, 42 Drawing Sheets

U.S. PATENT DOCUMENTS

| | | | |
|---|---|---|---|
| 4,719,525 | 1/1988 | Hasegawa et al. | 360/10.2 |
| 4,748,520 | 5/1988 | Odaka . | |
| 4,942,487 | 7/1990 | Noguchi et al. . | |
| 5,126,852 | 6/1992 | Nishino et al. | 386/80 |
| 5,136,391 | 8/1992 | Minami | 360/32 |
| 5,148,331 | 9/1992 | Kashida et al. | 360/77.15 |
| 5,182,681 | 1/1993 | Yamazaki . | |
| 5,229,862 | 7/1993 | Takahashi et al. | 358/335 |
| 5,253,122 | 10/1993 | Chiba et al. | 360/33.1 |
| 5,434,677 | 7/1995 | Oikawa | 360/10.1 |
| 5,440,345 | 8/1995 | Shimoda | 348/411 |
| 5,510,899 | 4/1996 | Kim | 386/81 |
| 5,532,835 | 7/1996 | Nakagaki et al. | 360/10.2 |
| 5,537,215 | 7/1996 | Niimura et al. | 386/111 |
| 5,543,932 | 8/1996 | Chang et al. | 348/423 |

FOREIGN PATENT DOCUMENTS

| | | | |
|---|---|---|---|
| 0521191A2 | 7/1993 | European Pat. Off. . | |
| 0551694A1 | 7/1993 | European Pat. Off. . | |
| 0600690 | 11/1993 | European Pat. Off. . | |
| 0627855 | 5/1994 | European Pat. Off. . | |
| 0606857 | 7/1994 | European Pat. Off. . | |
| 0606857A2 | 7/1994 | European Pat. Off. . | |
| 62-289950A | 12/1987 | Japan | 360/77.15 |
| 162856A | 3/1989 | Japan | 360/77.15 |
| 1184651A | 7/1989 | Japan | 360/77.15 |
| 0 505 985 A2 | 9/1992 | Japan | H04N 5/92 |
| 684285 | 3/1994 | Japan . | |
| 2086171A | 5/1982 | United Kingdom . | |
| 2181619A | 4/1987 | United Kingdom . | |
| 2265047A | 9/1993 | United Kingdom . | |
| WO8200558 | 2/1992 | WIPO . | |
| WO 94/17631 | 8/1994 | WIPO | H04N 5/782 |
| 9527978 | 10/1995 | WIPO . | |

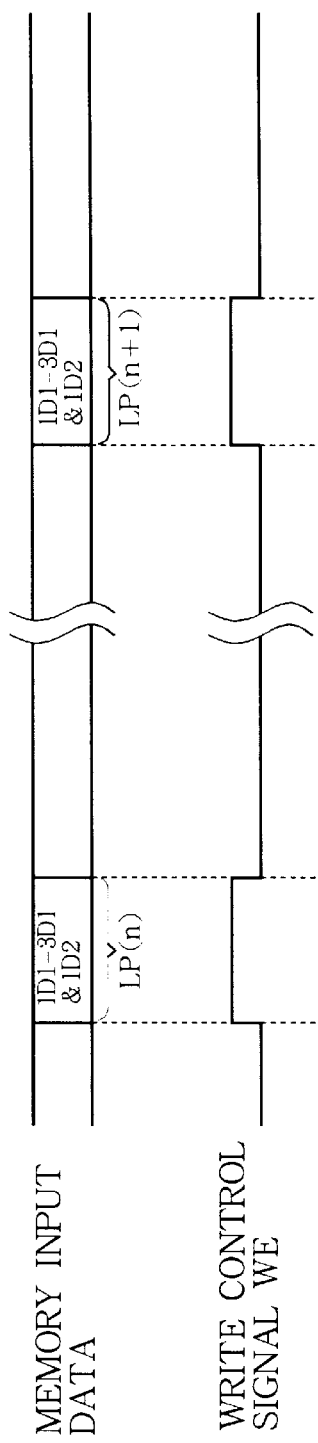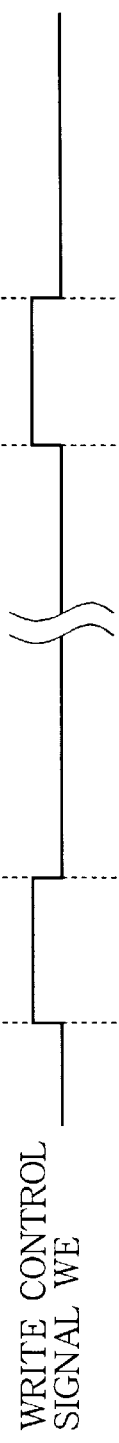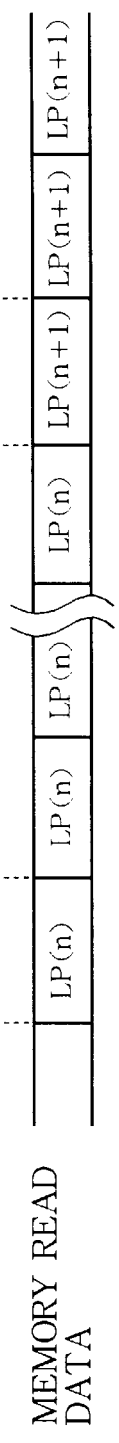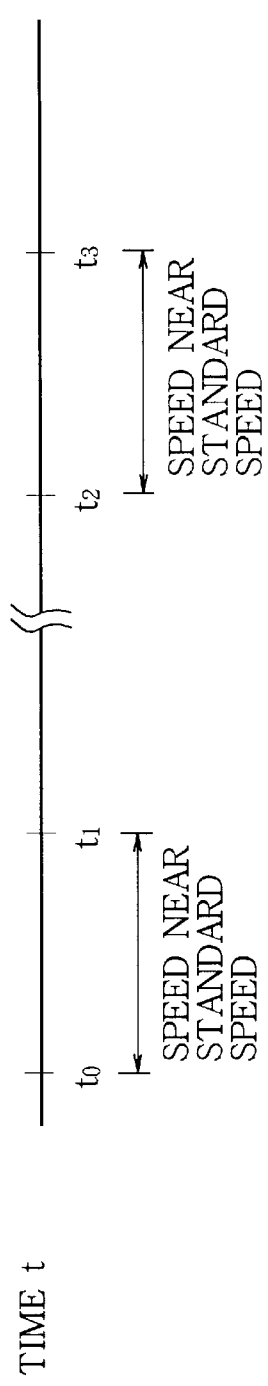

I : INTRA PICTURE
B : BI-DIRECTIONAL PREDICTED
    PICTURE
P : FORWARD DIRECTION PREDICTED
    PICTURE

SB : SYNC BLOCK
B : BYTES

FIG.35

| TRACK COUNTER VALUE | GENERATED PATTERN | | |
|---|---|---|---|
| 0 | A | B | A |
| 1 | C | A | C |
| 2 | A | A | A |
| 3 | C | A | C |
| 4 | A | A | A |
| 5 | C | A | C |
| 6 | A | A | A |
| 7 | C | A | C |
| 8 | A | C | A |
| 9 | C | B | C |
| 10 | B | B | B |
| 11 | C | B | C |
| 12 | B | B | B |
| 13 | C | B | C |
| 14 | B | B | B |
| 15 | C | B | C |
| 16 | B | B | B |

HEAD A

A B A B A B A B A B
HEAD A

REPLAY SIGNAL −6dB

TRACK A

CASE 1

CASE 2

DIGITAL VTR FOR PROCESSING INTRA-PICTURE DATA ACCORDING TO REPLAY MODES

This application is a continuation of application Ser. No. 08/417,107, filed on Apr. 5, 1995, now abandoned.

BACKGROUND OF THE INVENTION

The present invention relates to a digital video tape recorder (herein after referred to as digital VTR) having a track form at for recording digital video and audio signals in predetermined areas on oblique track, and relates to a digital VTR in which the digital video and audio signals are input in the form of a bit stream, and the bit stream is magnetically recorded and replayed (played back).

FIG. 41 is a diagram showing a track pattern of a conventional, general consumer digital VTR. Referring to the drawing, a plurality of tracks are formed on a magnetic tape 310, in a head scanning direction inclined to the tape transport direction, and digital video and audio signals are recorded therein. Each track is divided into two areas, a video area 312 for recording a digital video signal and an audio area 314 for recording a digital audio signal.

Two methods are available for recording video and audio signals on a video tape for such a consumer digital VTR. In one of the methods, analog video and audio signals are input, and recorded, using a video and audio high-efficiency encoding means; this is called a baseband recording method. In the other method, the bit stream having been digitally transmitted is recorded; this method is called a transparent recording method.

For the system of recording ATV (advanced television) signals, now under consideration in the United States, the latter, transparent recording method is suitable. This is because the ATV signal is digitally compressed signals, and does not require a high-efficiency encoding means or a decoding means, and because there is no degradation in the picture quality due to transmission.

The transparent recording system however is associated with a problem in the picture quality in a special replay mode, such as a high-speed replay mode, a still replay mode and a slow replay mode. In particular, when a rotary head scans the tape obliquely to record a bit stream, almost no image is replay at the time of high-speed replay, if not specific measure is taken.

An improvement for the picture quality for the transparent recording system recording the ATV signal is described in an article Yanagihara, et al. "A Recording Method of ATV data on a Consumer Digital VCR", in International Workshop on HDTV, 93, Oct. 26 to 28, 1993, Ottawa, Canada. Proceedings, Vol. II. This proposal is now explained.

With one basic specification of a prototype consumer digital VTR, in the SD (standard definition) mode, when the recording rate of the digital video signal is 25 Mbps, and the field frequency is 60 Hz, two rotary heads are used for recording a digital video signal of one frame, being divided into video areas on 10 tracks. If the data rate of the ATV signal is 17 to 18 Mbps, transparent recording of the ATV signal is possible with the recording rate in this SD mode.

FIG. 42A and FIG. 42B show tracks formed in a magnetic tape using a conventional digital VTR. FIG. 42A is a diagram showing scanning traces of the rotary heads during normal replay. FIG. 42B shows scanning traces of the rotary heads during high-speed replay. In the example under consideration, the rotary heads are provided in opposition, 180° spaced apart on a rotary drum, and the magnetic tape is wrapped around over 180°. In the drawing, adjacent tracks on the tape 310 are scanned by two rotary heads A and B having different azimuth angles, alternately and obliquely, to record digital data. In normal replay, the transport speed of the tape 310 is identical to that during recording, so that the heads trace along the recorded tracks. During high-speed replay, the tape speed is different, so that the heads A and B traces the magnetic tape 310 crossing several tracks. The arrow in FIG. 42B indicates a scanning trace by a head A at the time of five-time high-speed feeding. The width of arrow represents the width of the region read by the head. Fractions of digital data recorded on tracks having an identical azimuth angle are replayed from regions meshed in the drawings, within five tracks on the magnetic tape 310.

The bit stream of the ATV signal is according to the standard of the MPEG2. In this bit stream according to the MPEG2, only the intra-frame or intra-field encoded data of the video signal, i.e., the data of intra encoded block (intra encoded block) alone can be decoded independently, without reference to data of other frame or field. Where the bit stream is recorded in turn on the respective tracks, the recorded data are replayed intermittently from the tracks during fast replay, and the image must be reconstructed from only the intra-encoded blocks contained in the replay data. Accordingly, the video area updated on the screen is not continuous, and only the fractions of data of intra coded block are replayed, and may be scattered over the screen. The bit stream is variable-length encoded, so that it is not ensured that all the replay data over the screen is periodically updated, and the replay data of certain parts of the video area may not be updated for a long time. As a result, this type of bit stream recording system does not provide a sufficient picture quality during fast replay in order to be accepted as a recording method for a consumer digital VTR.

FIG. 43 is a block configuration diagram showing an example of recording system in a conventional digital VTR. Referring to the drawing, reference numeral 1 denotes an input terminal for the bit stream, 2 denotes an HP data format circuit, and 3 denotes a recording format circuit. Reference numeral 4 denotes a variable-length decoder, 5 denotes a counter, 6 denotes a data extractor, 7 denotes a EOB (end of block) appending circuit, and 8 denotes an output terminal.

The video area in each track is divided into a main area for recording the bit stream of the ATV signal, and copy area for recording important part (HP data) of the bit stream which are used for reconstruction of the image in fast replay. Only the intra-encoded blocks are effective during fast replay, so that they are recorded in the copy area. To reduce the data further, the only the low-frequency components are extracted from all the intra-encoded blocks, and recorded as HP data.

The bit stream of MPEG2 is input via the input terminal 2, and led to the recording format circuit 3. The bit stream from the input terminal 1 is also input to the variable-length decoder 4, and the syntax of the bit stream of the MPEG2 is analyzed, and the intra-picture data is detected, and timing signals are generated by the counter 5, and the low-frequency components of all the blocks in the intra-picture data are extracted. Furthermore, EOBs are appended at the EOB appending circuit 7, and HP data is constructed at the HP data format circuit 2. At the recording data format circuit 3, the HP data and the bit stream to be recorded in the main area are combined into a format suitable for recording in one track, and output via the output terminal 8, and respectively recorded in the main area and the copy area.

FIG. 44 shows a recording format on the tape. The combination of an alphabetic character A, B, C, and succeeding numerals 0, 1, 2 indicate the areas where HP data are recorded. Different data Ai, Bi, Ci (i=0, 1, 2, . . . ) are recorded in each tract. An identical set of data Ai, Bi and Ci are repeatedly recorded over 17 tracks within a range indicated by RP.

FIG. 45A and FIG. 45B show an example of replay system in a conventional digital VTR. FIG. 45A schematically shows normal replay. FIG. 45B schematically shows fast replay.

Separation of data from the magnetic tape during normal replay and fast replay are performed respectively in the following ways. During normal replay, the bit stream recorded in the main areas 270 is all replayed, and the bit stream from the data separation circuit 272 are sent as the normal replay data, to an MPEG2 decoder, provided outside the replay system. The HP data from the copy area 271 are discarded. During fast replay, only the HP data from the copy area 271 are collected, and sent, as fast replay data, to the decoder. At the data separation circuit 272, the bit stream from the main areas 270 is abandoned.

A method of fast replay from a track in which a main area 270 and copy areas 271 is next described. FIG. 46A shows a scanning trace of a head. FIG. 46B shows a track regions from which the replay is possible. When the tape speed is an integer multiple of the normal replay speed, if phase-locking control is conducted by an ATF (automatic track following) method or the like for tracking by moving the head itself, the head scanning is in a predetermined phase relationship with tracks having an identical azimuth. As a result, the data replayed by the head A from the tracks recorded alternately by the heads A and B, are fixed to those from the meshed regions.

In FIG. 46B, if the signal having an output level larger than −6 dB is replayed by the heads, the data is replayed by one head from the meshed tape regions. The drawing show an example of nine-time speed replay. If replay of the signals from the meshed regions is ensured at the nine-time replay, the regions are used as copy areas, and the HP data are recorded in the copy areas, so that the reading of the HP data from these regions at this speed is possible. However, reading of these signals at different speeds is not ensured. Accordingly, a plurality of areas need to be selected from the copy areas, so that the replay signals can be read at different tape speeds.

FIG. 47 shows regions where the copy areas overlap for a plurality of different replay speeds. It shows examples of scan regions for three different tape speeds, for cases where the head is in synchronism with a track of an identical azimuth. The scan regions where the reading by the head is possible at different tape speeds overlap, at some of the regions. By selecting the regions at which the overlapping occurs as the copy areas, reading of the HP data at different tape speeds can be ensured. The drawings show the regions at which overlapping occurs at the feed-forward at four-time, nine-time, 17-time speed. These scan regions are identical to those of feed-forward at −2 time, −7 time and −15 time high speeds (i.e., rewind at 2 time, 7 time and 15 time speeds).

Even though there are overlapping regions for different tape speeds, it is not possible to determine a recording pattern so that identical regions are always traced at different speeds. This is because the number of tracks crossed by the head differ depending on the tape speed. Moreover, it is necessary for the head to be capable of starting tracing at whichever identical azimuth track. For this reason, identical HP data is repeatedly recorded over a plurality of tracks, to solve the above problem.

FIG. 48 shows examples of scanning traces of the rotary head at different tape speeds. Regions 1, 2 and 3 are selected from among the overlapping regions for five-time and nine-time speeds. If identical HP data are repeatedly recorded over 9 tracks (over 9 tracks within the range indicated by RP in FIG. 48), the HP data can be read at five-time and nine-time speeds.

FIG. 49A and FIG. 49B show scanning traces at five-time speed replay. In the illustrated example, identical HP data is repeatedly recorded over five consecutive tracks (within the region indicated by RP). As will be seen from the drawings, identical HP data is recorded over the number of tracks identical to the number of times of the tape speed (i.e., 5). In either of case 1 and case 2, either the head A or B can read HP data from corresponding azimuth track. Accordingly, providing the copy areas in each track, in a number identical to the number of times of the tape speed at the fast replay, and repeatedly recording the HP data there, the copied HP data can be read at various speeds, and in either the forward or reverse direction.

In the manner described, the special replay data is recorded in the copy areas, repeatedly, to improve the picture quality during the special replay in the transparent recording system.

FIG. 50 shows a recording format on a track in a convention digital VTR. Main area 270 and copy areas 271 are provided in one track. In a consumer digital VTR, a video area in each track has 135 sync blocks (SB), and 97 sync blocks are assigned to main areas and 32 sync blocks are assigned to copy areas. The sync blocks at the regions corresponding to the 4-, 9- and 17-time speed shown in FIG. 47 are selected for the copy areas. The data rate of the main areas is about 17.46 Mbps (97×75×8×10×30), and the data rate of the copy areas where identical data is repeated 17 times is about 338.8 kbps (32×75×8×10×30/17).

The conventional VTR described above has the following problems.

In the conventional VTR, in any of the cases of the low-speed replay of 2- to 4 time speed, and the case of a fast replay of more than 9-time speed, the data of the copy areas consisting of the predetermined number of sync blocks contained in common overlapping areas is read and used for replay. As a result, the deterioration in the picture quality which is not conspicuous in a high-speed fast replay, in which the change of the scene is quick, shows up in a lower-speed replay, in which the change is of the scene is slow.

In the conventional device, the areas where the copy areas overlap are determined without taking account of the regions where the reading is possible in slow replay or still replay. As a result, when slow or still replay is conducted in the conventional device, the reading from the copy areas is not necessary ensure. Moreover, the picture is not reconstructed from only the HP data in the copy areas, so that the pictures of slow or still replay are not obtained.

When a bit stream from the main areas is used during slow or still replay, some regions may not be scanned, or the replay output may be insufficient, so that replay data is not obtained from some regions. Thus, replay of data from all the areas is not ensured, and slow or still replay pictures of good quality cannot be obtained.

In the conventional device, where each transport packet is divided and recorded in a plurality of sync blocks on the tape, the positions at which the packet is divided and the number of sync blocks into which the packet is divided are not constant because of the image compression. That is, depending on the characteristics of the picture, the amount of data contained may vary and the length of each packet may vary. For this reason, when the transport packet is divided and recorded in many sync blocks, it is affected easily by data errors for each sync block associated with the magnetic recording and replay.

More specifically, assume that a packet of a length of 188 bytes is divided and recorded in consecutive sync blocks of a length of 77 bytes. Generally, the ratio between the length of the packets and the length of the sync block is not an integer. The number of sync blocks for each packet differs. The position at which the packet is divided also varies, and accordingly, the number of sync blocks into which the packet is divided varies between 3 and 4.

When digital data is magnetically recorded or replayed, data errors for each sync block occurs. If the data in the replayed packet contains an error, it cannot be used. A packet which is divided into four sync blocks has a higher probability of being erroneous than a packet which is divided into three sync blocks.

When data for fast replay is used, by reducing the amount of data from ordinary encoded data, no control is made to maintain that the data of the image blocks is recorded at a predetermined number of sync blocks. Accordingly, when data of frame picture for high-speed replay is recorded in a plurality of sync blocks on a magnetic tape, the encoded data of the image blocks is divided at the boundaries between the sync blocks. As a result, the blocks recorded being divided is easily affected by the data errors for each sync block, associated with the magnetic recording and replay.

When image block data of a 50 byte length is recorded, it may be recorded within a single sync block, or it may be divided into two sync blocks. In comparison with the case where recording is in one sync block only, if the recording is into two sync blocks, the effect of errors for each sync block associated with recording and replay is twice.

Moreover, the positions at which the fast replay data is recorded are determined on the basis of the head scanning traces at a specific fast replay speed. As a result, fast replay is not possible at speeds other than the specific fast replay speed.

Furthermore, the copy areas where the fast replay data is recorded are disposed on the tracks such that reading from them can be made correctly. However, slow replay is not taken account of, so that it is not sure whether data is read correctly. Thus, the conventional device does not have any assurance with regard to the picture quality of slow replay.

Moreover, when still replay is selected, the replay data is not read, and no still picture is correctly displayed.

Furthermore, with regard to the speed of the fast replay in the conventional device, even where identical copy data is recorded over 17 tracks, odd-number multiple-speeds which can be selected are limited to +17-time speed, +13-time speed, +9-time speed, +5-time speed, -15-time speed, -11-time speed, -7-time speed, and -3-time speed.

In order to check all the intra-picture data, the headers of the ATV bit steams must be analyzed for each macro block.

SUMMARY OF THE INVENTION

The invention has been achieved to solve the problems described above, and its object is to provide a digital VTR with which the picture quality is higher in low-speed fast replay, than in middle- or high-speed fast replay.

Another object of the invention is to provide a digital VTR which records a bit stream transmitted digitally, and with which slow or still replay picture of a good quality can be obtained even when slow or still replay is conducted.

Another object of the invention is to provide a digital VTR which is less affected by data errors associated with recording and replay.

A further object of the invention is to provide a digital VTR with which a fast replay is possible at an arbitrary speed.

A further object of the invention is to provide a digital VTR which records a bit stream transmitted digitally, and with which slow or still replay pictures of a good quality are obtained even if slow or still replay is conducted.

A further object of the invention is to provide a digital VTR with which the number of multiple-speeds which can be selected for fast replay can be increased, and intra-picture data can be detected for each frame or each field.

According to a first aspect of the invention, there is provided a digital VTR magnetically recording and replaying video and audio signals at a recording data rate higher than a data rate of a bit stream which is digitally transmitted, recording the bit stream on a magnetic recording medium, by dividing the data for one screen as a baseband video signal, into a plurality of tracks, comprising:

data extracting means for dividing a first low-frequency component data from intra-encoded blocks of the bit stream, into a predetermined number L (L being a positive integer not smaller than 2) and extracting the divided low-frequency component, and extracting a second low-frequency component data having frequencies higher than the first low-frequency component data; and recording means for recording the first low-frequency component data, being divided, in said predetermined number L of first specific regions respectively disposed in a plurality of tracks into which data for said one screen is divided, and recording said second low-frequency component data in second specific regions disposed in specific tracks of said plurality of tracks, and recording all the bit stream in the remaining regions in each track, other than said first and second specific regions.

With the above arrangement, during normal replay, all the bit stream digitally transmitted during recording can be replayed and used, during middle-speed and high-speed fast replay, the first low-frequency component recorded in the first specific regions is replayed, and during low-speed fast replay, the second low-frequency component recorded in the second specific regions on the specific tracks and the first low-frequency component recorded in the first specific regions are replaced and used.

Accordingly, the first HP data D1 is recorded in the first specific regions and the second HP data D2 is recorded in the second specific regions in the specific tracks, within the range of data rate not larger than the remaining data rate after subtracting the date rate for recording the bit stream, so that it is possible to cope not only with the normal replay, but also with low-speed fast replay, and middle-speed and high-speed fast replay, in which the pictures are formed only of intra-encoded blocks, and the pictures of a better quality is obtained in the low-speed fast replay than in the middle-speed and high-speed fast replay.

The digital VTR of the first aspect of the invention may further comprise:

selecting means for selecting one of a normal replay and fast replays of a plurality of speeds, by varying the transport speed of the magnetic recording medium;

control means for causing, when the fast replay at a low-speed is selected by said selecting means, the transport speed of the magnetic recording medium to be periodically alternated between a speed near the standards speed for the normal replay and a speed near the speed for the low-speed fast replay; and replay means for replaying, at the speed near the standard speed, at least the second low-frequency component data recorded in said specific regions from said specific tracks, and the first low-frequency component data recorded in said first specific regions in said specific tracks.

With the above arrangement, in the middle-speed or high-speed fast replay, the magnetic recording medium is made to run continuously at a middle-speed or high-speed fast replay speed, so that the first low-frequency component data is collected and replayed from a plurality of tracks, and in the low-speed fast replay, at least the second low-frequency component recorded in the second specific regions in the specific tracks which can be obtained during transport at a speed near the normal replay speed, and the first low-frequency component recorded in the first specific regions in the specific tracks are replayed as fast replay data.

Accordingly, the bit stream digitally transmitted for recording can all be replayed during normal replay, so that there is no degradation in the picture quality. In the middle-speed and high-speed fast replay, although the picture quality is lower than in the normal replay, it is possible to cope with search of the recorded contents, and the like.

Moreover, in a replay of a low speed, of about twice the normal speed, the magnetic tape is alternately transported at a speed near the standard speed for normal replay, and a speed near the low-speed fast replay speed, and at the speed near the standard speed, at least the second low-frequency component data recorded in the second specific regions in the specific tracks, and the first low-frequency component data recorded in the first specific regions are all replayed, so that although the resolution of the high-frequency region is lost, compared with the normal replay, the pictures with a better quality than in the middle-speed and high-speed fast replay can be obtained.

According to a second aspect of the invention, there is provided a digital VTR for magnetically recording and replaying a bit stream digitally transmitted, comprising:

detecting means for detecting intra-picture data in the bit stream that are replayed;

extracting means for extracting the intra-picture data from the replayed bit stream, according to the result of the detection at the detecting means;

replay mode designating means for selecting and designating one of the normal replay, slow replay and still replay, as a replay mode; and replay data outputting means for storing the extracted intra-picture data, and outputting the intra-picture data as the replay picture data, according to the mode signal output by said replay mode designating signal.

With the above arrangement during replay with a digital VTR for recording and replaying a bit stream digitally transmitted, the intra-picture data in the bit stream that is replayed is detected, and intra-picture data is extracted from the replayed bit stream on the basis of the result of the detection, and the intra-picture data is stored, and output as the replay picture data according to the replay mode signal, so that even when the replay mode is slow replay, or still replay, the stored intra-picture data can be output as the replay data, and slow or still replay pictures with a good quality can be obtained.

In the digital VTR of the second aspect of the invention, it may be so arranged that said replay data output means comprises:

address detecting means for detecting an address of the track at which the intra picture data is recorded;

control means for causing normal speed replay and rewinding, for reverse control, on the basis of the result of the detection of the address of the track.

With the above arrangement, when the replay mode signal designates slow replay or still replay, and the normal speed replay and rewinding are conducted alternately for slow replay, the intra-picture data in the bit stream during normal speed replay is detected, and the intra-picture data is extracted from the replayed bit stream on the basis of the result of the detection, and the intra-picture data is stored, and the address of the recording track where the intra picture data is recorded is detected, and the reverse control is conducted on the basis of the result of the detection, and the stored intra-picture data is output as the replay picture data, so that when the designed replay mode is slow replay or still replay, the stored intra-picture data is output as the replay data, and slow or still replay pictures of a good quality are obtained.

Accordingly, the stored intra-picture data can be output as the replay data, during slow or still replay, so that slow or still replay pictures of a good quality can be obtained.

In the digital VTR of the second aspect of the invention, said replay data output means may comprise:

control means for stopping the tape for a predetermined period after all the intra-picture data is extracted from the bit stream by normal speed replay.

With the above arrangement, when normal speed replay and halting are conducted intermittently, as replay mode signal indicates slow replay, the intra-picture data in the bit stream during normal speed replay is detected, and the intra-picture data is extracted from the replayed bit stream, and stored, and after all the intra-picture data is extracted, the tape is halted for a predetermined period, and the stored intra-picture data is output as the replay picture data, so that when the designated replay mode is slow replay, the intra-picture data is output as the replay data, whereby slow replay pictures with a good quality are obtained.

According to a third aspect of the invention, there is provided a digital VTR for magnetically recording and replaying digitally transmitted bit stream in a predetermined recording format, a magnetic recording and replaying device comprising:

division number setting means responsive to a bit stream input, a predetermined number M (M being a positive integer) of transport packets as a unit, for setting the division number N (N being a positive integer, N≠M) into sync blocks which are to form the recording format;

header appending means for appending, to data of the bit stream before the division, a header indicating the transport packet; and format forming means for forming N consecutive sync blocks from the data after the division of the bit stream.

With the above arrangement, the predetermined number M of packet data are divided into and recorded in the predetermined number N of the sync blocks. For instance, when the size of the packet is 188 bytes, and the data capacity of the sync block is 77 bytes, 376 bytes, which is twice 188 bytes, is smaller than 376 bytes, which is five times 77 bytes, so that M is set to 2 and N is set to 5, and two packets are recorded in five sync blocks. There are four boundaries between five consecutive sync blocks, and each of the packet data extends across the boundaries at two locations, and to at three or more locations.

Accordingly, when transparent recording is effected, the number of units into which the packets of the bit stream is divided can be made small on average, and the probability of the entire packet being rendered erroneous because of the data error due to recording and replay can be minimized.

According to fourth aspect of the invention, there is provided a digital VTR for magnetically recording and replaying a digitally transmitted bit stream in a predetermined recording format, comprising:

decoding means for decoding the content of data of an input bit stream;

data extracting means for extracting a series of encoded data used for fast replay, on the basis of the decoded data; and data reducing means for reducing the data amount of the extracted encoded data to a data amount which can be recorded in K sync blocks (K being a positive integer) in said predetermined format.

With the above arrangement, when encoded data used for fast replay is formed form original data, by reducing the data amount, the data amount after the reduction is of such a size which can be recorded in a predetermined number of sync blocks, and the data is recorded in the predetermined number of sync blocks.

Accordingly, the number of units into which block data is divided when the fast replay data is recorded on the tape can be minimized on average, so that the probability of the entire block data being erroneous because of data error due to recording and replay can be minimized.

In the digital VTR of the fourth aspect of the invention, it may be so arranged that said encoded data is recorded repeatedly for a number of times about twice the multiplier of the maximum fast replay speed (maximum speed at which the fast replay is possible).

With the above arrangement, the encoded data for fast replay is recorded repeatedly on consecutive tracks a number of times which is about twice the multiplier of the fast replay speed, so that either of the heads of the different azimuths scans the recording regions of the encoded data for fast replay at least once, even when the replay is made with the maximum speed at which replay is possible.

If the heads on the drum are disposed in opposition, 180° apart, the tape is wrapped around the drum over about 180°, and the speed of the maximum fast replay is an even multiple speed, the first and second azimuth heads supplement, each other, the data that cannot be replayed by each of the heads, alone.

All the replay encoded data can be reproduced, and the fast replay can be conducted at any arbitrary even multiple speed. The fast replay in a reverse direction is also possible, at any arbitrary even multiple speed.

According to a fifth aspect of the invention, there is provided a digital VTR for magnetically recording and replaying a digitally transmitted bit stream, comprising:

detecting means for detecting intra-picture data in an input bit stream;

forming means for forming fast replay data from the intra-picture data;

header appending means for appending a first header for discriminating the fast replay data from normal replay data, and a second header for discriminating, within said normal replay data, the intra-picture data and non-intra-picture data from each other, and recording means for recording the fast replay data together with the normal replay data on a magnetic recording medium.

With the above arrangement, in a device for recording and replaying a digitally transmitted bit stream, at the time of recording, intra-picture data is detected from the input bit stream, and fast replay data is formed, and a first header for discriminating the normal replay data and the fast replay data from each other, a second header for discriminating, within the normal replay data, the intra-picture data and non-intra-picture data from each other, are appended before recording. Accordingly, during normal replay, normal replay data is selected from the data having been read, according to the first header, and output.

The data output respectively for normal replay and fast replay, can therefore be smoothly selected.

The digital VTR of the fifth aspect of the invention may further comprise:

replay means for replaying normal replay data, together with fast replay data from the magnetic recording medium;

separating means for separating the normal replay data, by checking the first header appended to the replay data from the magnetic recording medium;

storage means for storing the intra-picture data, by checking the second header appended to the normal replay data selected by the separating means; and switching means for selectively outputting the normal replay data or the intra-picture data stored in the storage means, depending on whether the replay mode is the normal replay or the still replay.

With the above arrangement, the normal replay data is selected and separated from the data having been read during normal replay, according to the first header, only the intra-picture data is extracted from the normal replay data according to the second header, and stored, so that, during still replay, the normal replay data is selected and output from the storage means. As a result, satisfactory still replay can be achieved.

The second headers for discriminating between the intra-picture data and non-intra-picture data are appended to the transport packets which are normal replay data before recording, so that the detection of the intra-picture data during still replay is facilitated.

Moreover, the intra-picture data detected according to the second header during normal replay is stored, and output when still replay is selected, so that switching to the still replay mode is achieved with ease.

The digital VTR of the fifth aspect of the invention may further comprise:

replay means for replaying normal replay data together with the fast replay data from the magnetic recording medium;

separating means for separating the normal replay data, by checking the first header appended to the replay data from the magnetic recording medium;

storage means for storing the intra-picture data, by checking the second header appended to the normal replay data selected by said separating means; and switching means for selectively outputting the normal replay data or the intra-picture data stored in the storage means, depending on whether the replay mode is the normal replay or the slow replay.

With the above arrangement, during slow replay, the normal replay data is selected and separated according to the first header, and only the intra-picture data is extracted from the normal replay data according to the second header, so that, by selectively outputting the normal replay data from the storage means, satisfactory low-speed replay can be achieved.

The intra-picture data detected according to the second header is recorded during slow replay, and intra-picture data is selected and output, so that slow replay can be achieved with ease.

Moreover, the transport packets which are the normal replay data are recorded, after having appended second headers for discriminating the intra-picture data and non-intra-picture data from each other, so that, during slow replay, detection of the intra-picture data is achieved with ease.

The digital VTR of the fifth aspect of the invention may further comprise:

replay means for replaying normal replay data together with the fast replay data from the magnetic recording medium;

separating means for separating the fast replay data from the normal replay data, by checking the first header appended to the replay data from the magnetic recording medium; and switching means for selectively outputting the normal replay data or the high-speed data, depending on whether the replay mode is the normal replay or the fast replay.

With the above arrangement, during fast replay, the fast replay data can be selected and output with ease, from the data having been read, according to the second header.

Because the first header for discriminating the transport packets with which normal replay is possible, and fast replay data from each other, selection of the data output respectively during normal replay and fast replay can be made smoothly.

According to a sixth aspect of the invention, there is provided a digital VTR for magnetically recording and replaying a digitally transmitted bit stream, comprising:

means for forming HP data for fast replay, by extracting low-frequency component from intra-encoded data of an input bit stream;

pattern generating means for forming a recording pattern for recording the HP data, being divided, and a plurality of times, in copy areas respectively set in J tracks (J=12×I×5, I being a positive integer) forming one track group; and recording means for recording in the formats according to the recording patterns, partitioning one track into a main area in which only said bit stream is recorded, and a plurality of copy areas in which said HP data is recorded, being divided;

wherein the recording patterns of the HP data A, B and C recorded, being divided into the N tracks include a pattern TP1 in which HP data B is recorded in the copy area at the center of the track, and HP data A is recorded in the copy areas at both ends of the track, a pattern TP2 in which HP data A is recorded in the copy area at the center of the track, and HP data C is recorded in the copy areas at both ends of the track, a pattern TP3 in which HP data A is recorded in the copy areas at the center and both ends of the track, a pattern TP4 in which HP data C is recorded in the copy area at the center of the track, and HP data A is recorded in the copy areas and both ends of the track, a pattern TP5 in which HP data B is recorded in the copy area at the center of the track, and HP data C is recorded in the copy areas and both ends of the track, and a pattern TP6 in which HP data B is recorded in the copy areas at the center and both ends of the track, and in one track group, a first track of pattern TP4 is disposed in the center of the track group, a second track of pattern TP1 is disposed at one end of the track group, a third track of pattern TP6 is disposed at the opposite end of the track group, tracks of patterns TP2 and TP3 are alternately and repeatedly disposed between the first track and the second track, tracks of patterns TP5 and TP6 are alternately and repeatedly disposed between the first track and the third track.

With the above arrangement, when 1 track group is formed of 17 tracks, the recording format permits the multiplier of the fast replay speed to be, in addition to +17, +13, +9, +5, −15, −11, −7, and −3, as in prior art, 3, 7, −5, and −1.

It is thus possible to form a recording format by which, by disposing the HP data, the number of multiple-speeds which can be selected for the fast replay can be increased.

According to a seventh aspect of the invention, there is provided a digital VTR for magnetically recording and replaying a digitally transmitted bit stream, comprising:

means for forming HP data for fast replay, by extracting low-frequency component from intra-encoded data of an input bit stream;

pattern generating means for forming a recording pattern for recording the HP data, being divided, and a plurality of times, in copy areas respectively set in J tracks (J=12×I+5, I being a positive integer) forming one track group; and recording means for recording in the formats according to the recording patterns, partitioning one track into a main area in which only said bit stream is recorded, and a plurality of copy areas in which said HP data is recorded, being divided;

wherein the recording patterns of the HP data, A, B and C recorded, being divided into the N tracks include a pattern TP1 in which HP data B is recorded in the copy area at the center of the track, and HP data A is recorded in the copy areas at both ends of the track, a pattern TP2 in which HP data A is recorded in the copy area at the center of the track, and HP data B is recorded in the copy areas at both ends of the track, a pattern TP3 in which HP data A is recorded in the copy areas at the center and both ends of the track, a pattern TP4 in which HP data A is recorded in the copy area at the center of the track, and HP data C is recorded in the copy areas at both ends of the track, a pattern TP5 in which HP data C is recorded in the copy area at the center of the track, and HP data A is recorded in the copy areas at both ends of the track, a pattern TP6 in which HP data C is recorded in the copy areas at the center and both ends of the track, a pattern TP7 in which HP data C is recorded in the copy area at the center of the track, and HP data B is recorded in the copy areas at both ends of the track, a pattern TP8 in which HP data B is recorded in the copy area at the center of the track, and HP data C is recorded in the copy areas at both ends of the track, and a pattern TP9 in which HP data B is recorded in the copy areas at the center and both ends of the track, and in one track group, a first tack of pattern TP5 is disposed in the center of the track group, second and third tracks of pattern TP6 are disposed on both sides of and adjacent to the first track of pattern TP5, a fourth track of pattern TP5 is disposed adjacent the second track of pattern TP6, a fifth track of pattern TP7 is disposed adjacent the third track, and on the opposite side of the fourth track of pattern TP5, with respect to the first track, a sixth track of pattern TP1 is disposed at the head or tail of the track group, and on the same side of the first track as the fourth track, a seventh track of pattern TP2 is disposed next to the track of pattern TP1, and on the same side of the first track as the fourth track, an eighth track of pattern TP9 is disposed at the tail or head of the track group, and on the same side of the first track as the fifth track, tracks of patterns TP3 and TP4 are alternately and repeatedly disposed between the seventh track and the fourth track, tracks of patterns TP8 and TP9 are alternately and repeatedly disposed between the eighth track and the fifth track.

With the above arrangement, when 1 track group is formed of 17 tracks, the recording format permits the multiplier of the fast replay speed to be, in addition to +17, +13, +9, +5, −15, −11, −7, and −3, as in prior art, 3, 7, −5, and −1.

It is thus possible to form a recording format by which, by disposing the HP data, the number of multiple-speeds which can be selected for the fast replay can be increased.

In either of the six the seventh aspects of the invention, it may be so arranged that, in normal replay, the bit stream recorded in the main area is transmitted to a decoder as a replay signal, and, in fast replay, a replay bit stream is formed from the HP data, and transmitted to the decoder as replay HP data.

With the above arrangement, when 1 track group is formed of 17 tracks, it is possible to perform replay at the speeds of +17-time, +13-time, +9-time, +5-time, −15time, −11-time, −7-time, and −3-time, as in prior art, and, in addition, 3-time, 7-time, −5-time, and −1-time.

It is thus possible to increase the number of multiple-speeds which can be selected for fast replay from a format used for recording with the digital VTR.

In either of the sixth or seventh aspects of the invention, it may be so arranged that, wherein the intra-encoded blocks forming the HP data belong to intra-encoded frame or intra-encoded field.

With the above arrangement, detection of the intra-picture data which forms the basis for forming the HP data recorded in the copy areas is simplified.

BRIEF DESCRIPTION OF THE DRAWINGS

In the accompanying drawing:

FIG. 7A to FIG. 7D are diagrams for explaining the memory control operation in the low-speed fast replay;

FIG. 35 is a diagram showing the pattern signal generated by the pattern signal generator;

DETAILED DESCRIPTION OF THE PREFERRED EMBODIMENTS

Embodiment 1

Embodiment 1 is for obtaining a replay picture with a good picture quality, in particular at the time of low-speed fast replay.

Figure 1:
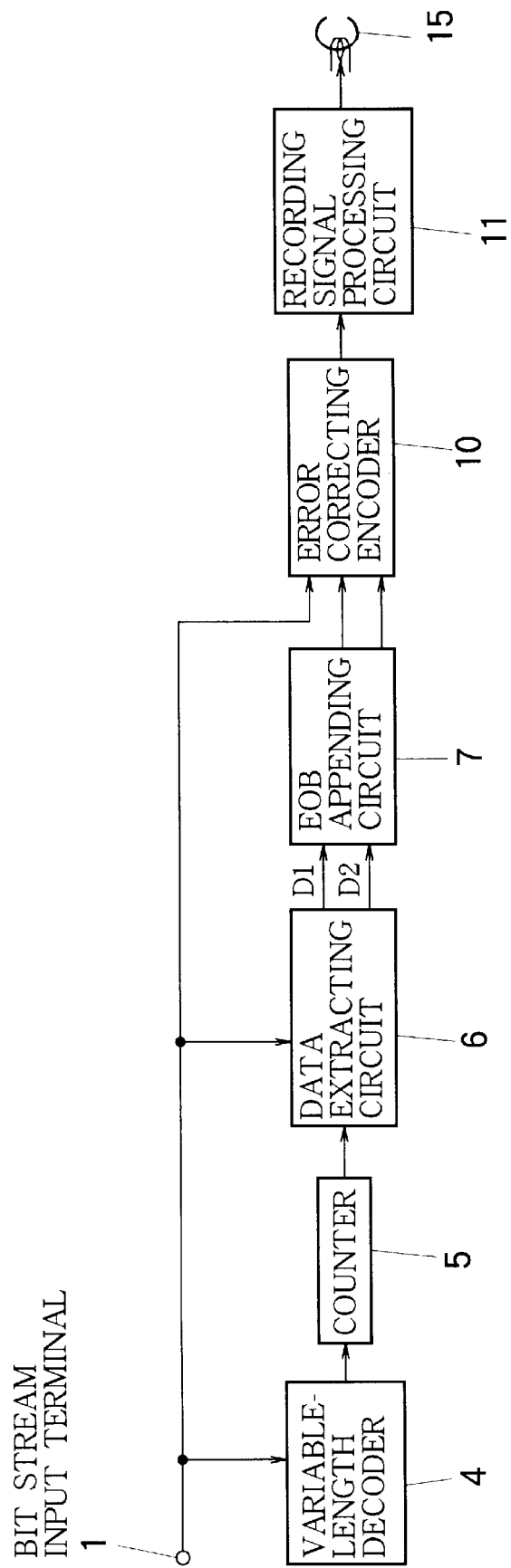
FIG. 1 is a block diagram showing a recording system of a digital VTR of Embodiment 1 of the invention.

FIG. 1 is a block diagram showing a recording system of a digital VTR of an embodiment of the invention. In the drawing, reference numeral 1 denotes a bit stream input terminal, 4 denotes a variable length decoder, 5 denotes a counter, 6 denotes a data extracting circuit, 7 denotes an EOB (end of block) appending circuit, 10 denotes an error correction encoder, 11 denotes a recording signal processing circuit comprising a modulating circuit and a recording amplifier, and 15 denotes a magnetic head.

An MPEG2 bit stream is input via the input terminal 1 to the error correction encoder 10, where error correction codes used during normal replay are appended, and sync signals and ID information are also appended. The error correction codes used during normal replay consist for example of a product code configuration, consisting of inner error correction codes and outer error correcting codes.

The bit stream via the input terminal 1 is also input to the variable-length decoder 4, where the syntax of the MPEG2 bit stream is analyzed, and variable-length encoded intra-picture data is detected, and the number of the data units is counted at the counter 5. The counter 5 provides the data extracting circuit 6 with timing signals for commencing and terminating extraction of intra-encoded blocks. The data extracting circuit 6 extracts all the intra-encoded blocks forming the intra-picture data, and extracts the low-frequency components of the intra-encoded blocks, in order to reduce the data. That is, the data extracting circuit 6 applies DCT processing to the blocks of 8×8 pixel configuration in the intra-picture data, and extracts the low-frequency component data of the DCT coefficients, consisting of DC components and low-frequency AC components in the horizontal and vertical spatial frequency regions of the DCT coefficients.

The low-frequency component data extracted from the intra-picture data is the important part (hereinafter referred to as HP data) of the bit stream used for the reconstruction of the picture at the time of fast or multiple-speed replay. At the time of extraction, the HP data is divided into two units of two special replay data, i.e., first HP data D1 and second HP data D2, and output via the data extracting circuit 6. The division is so made that the first and second HP data D1 and D2 respectively contain first and second low-frequency components, and the second HP data D2 contains AC components having higher frequencies that the first HP data D1. The EOBs are appended at the EOB appending circuit 7 to the first and second HP data D1 and D2, and the first and second HP data D1 and D2 with the EOBs appended is input to the error correction encoder 10, as data for recording in the copy areas, and error correction codes, sync signals and ID information which are used in fast replay are appended to form recording blocks. The error correction codes of the recording blocks used during fast replay are of inner codes configuration.

The recording signal processing circuit 11 modulates the recording blocks for the main and copy areas output from the error correction encoder 10 and records via the magnetic head 15 on a magnetic recording medium, such as a magnetic tape (not shown).

Figure 2:
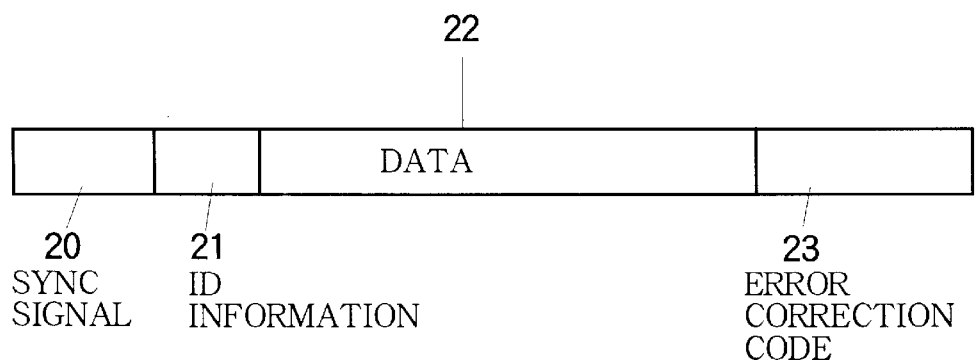
FIG. 2 is a diagram showing a sync block forming a recording block.

FIG. 2 shows sync blocks forming the recording blocks. In the drawing, reference numeral 20 denotes a region for recording a sync signal, 21 denotes a region for recording ID information (identification information), such as recorded track address information, 22 denotes a region for recording the data regarding the bit stream for the main areas, or the first and second HP data for the copy areas, and 23 denotes a region for recording error correction codes which are inner codes appended to the sync blocks.

Figure 3:
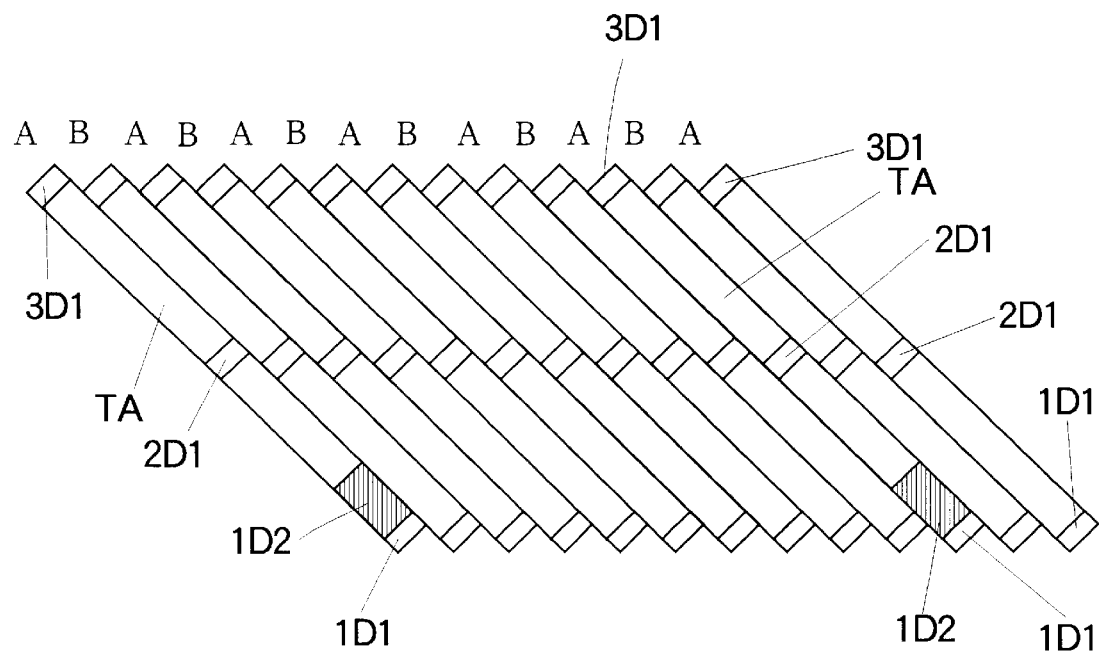
FIG. 3 is a diagram showing a track format of recording data according to Embodiment 1.

FIG. 3 shows a track format of the recording data of Embodiment 1. In the drawing, each of reference marks A and B denotes the type of the track corresponding to the respective azimuth, and the tracks are helical. That is, each track is helical-recorded alternately on the magnetic tape using heads of different azimuths. The regions denoted by marks 1D1, 2D1, 3D1 are first specific regions where sync blocks for the first HP data D1 for the copy areas are recorded.

The first HP data is divided into and recorded in the first specific regions 1D1 to 3D1, at three specific locations on one track. An example of the division is such that then sync blocks (hereinafter referred to as SBs) are allotted to the region 1D1, eight SBs are allotted to the region 2D1, and seven SBs are allotted to the region 3D1. The SBs allotted to the regions 1D1 to 3D1 correspond to the overlapping regions commonly head-traced at various fast replays like in the prior art example, and SBs of 1D1 to 3D1 of the same content are repeatedly recorded over the number of tracks identical to the speed multiplier of the highest-speed replay speed. The term "multiplier" is used to mean the ratio of the fast replay speed to the normal replay speed. This has already been described in detail in connection with the prior art example, so its further description is omitted here. In this embodiment, however, the first HP data contained in the SBs of the regions 1D1 to 3D1 are used only at a middle-speed fast replay, around 9-time speed, or of a higher-speed fast replay.

In FIG. 3, SBs for the second HP data D2 for the copy areas are disposed in the second specific region 1D2 which is indicated by hatching. This second specific region 1D2 is positioned on a specific track, e.g., the first track TA, within ten recording tracks for one frame (where the field frequency 60 Hz) as a baseband video signal which is a basic specification for a consumer digital VTR. In the example under consideration, 1D2 is formed of 50 SBs, and contains much more intra-picture data than 1D1 to 3D1, which contain 25 SBs in total. In this embodiment, this region 1D2 is used for a low-speed fast replay, of for example around double-speed. In this specific track TA, 50 SBs for 1D2 and 25 SBs for 1D1 to 3D1 are disposed. In the tracks other than the specific track TA, 25 SBs for 1D1 to 3D1 are disposed as copy areas.

In the remaining regions, other than the first specific regions in each track in FIG. 3, and the remaining regions other than the first and second specific regions, are the main areas, where all the SBs regarding the MPEG2 bit stream are recorded, and replayed during normal replay. In consumer digital VTRs, the video area on each track is formed of 135 SBs, so that the number of SBs for the bit stream in the main areas in the specific track TA is 60 (=135−75), and is 110 (=135−25) in the tracks other than the specific track TA.

Figure 41:
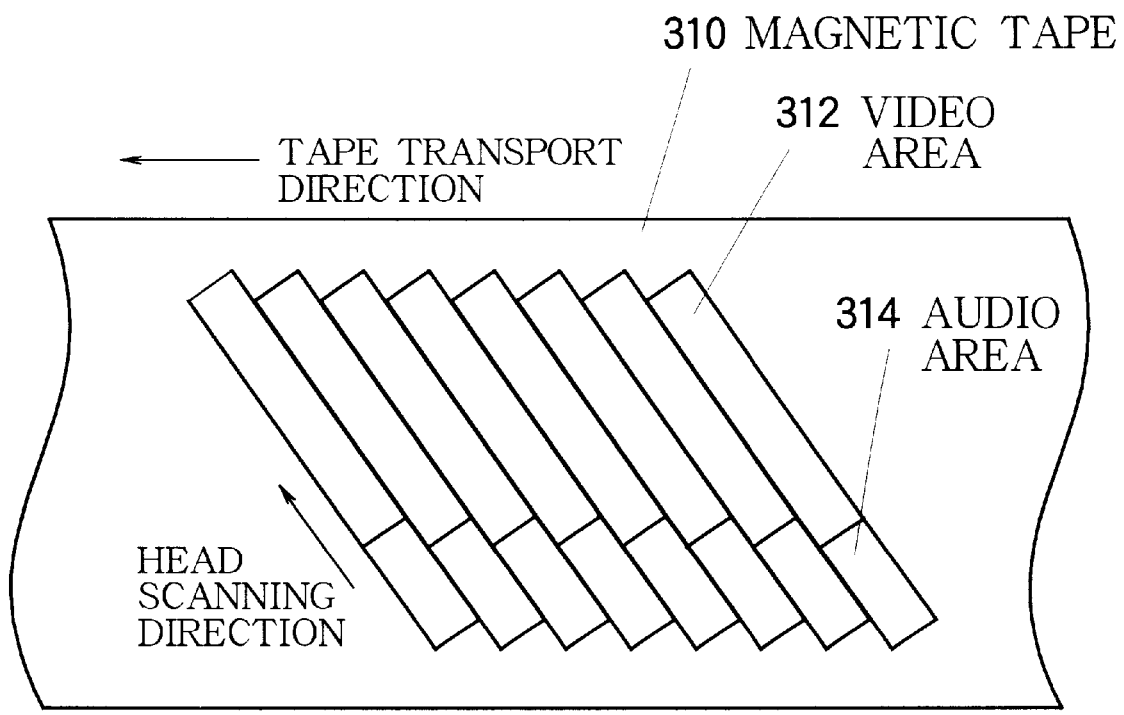
FIG. 41 is a diagram showing a track pattern of a conventional consumer digital VTR.
Figure 42A:
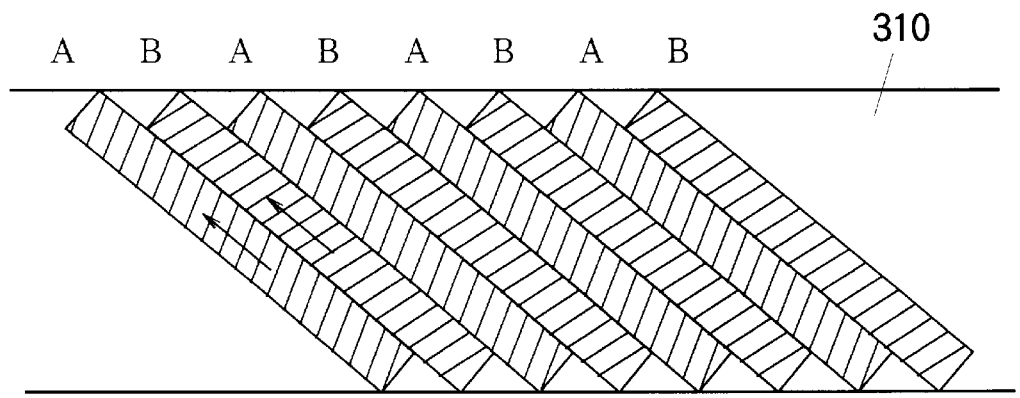
FIG. 42A shows scanning traces against tracks formed on the magnetic tape in normal replay in a conventional digital VTR.
Figure 42B:
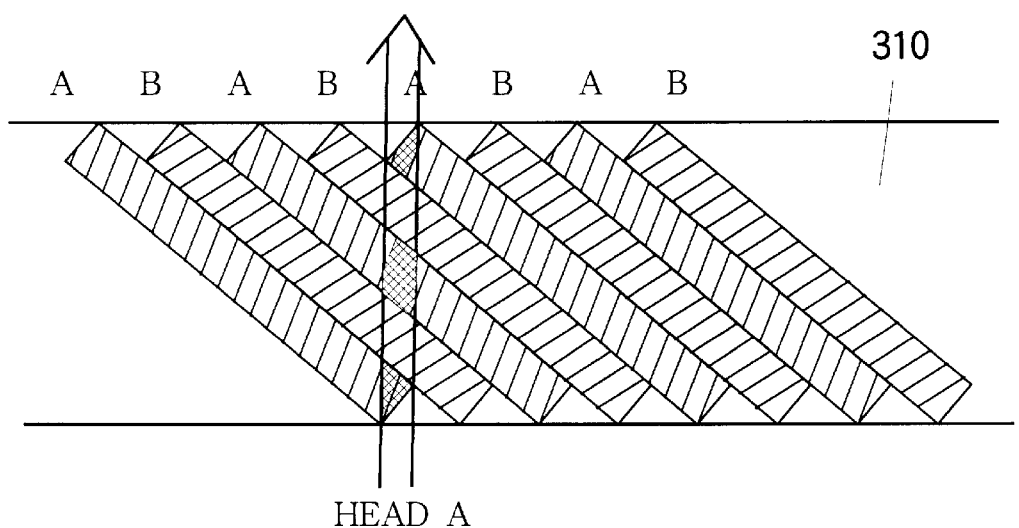
FIG. 42B shows scanning traces against tracks in a fast replay in the conventional digital VTR.

As described above with reference to FIG. 41 in connection with the prior art example, in a consumer digital VTR, data areas such as audio areas, not shown, are provided on the extensions of the video areas in each rack, and the 135 SBs do not occupy all the area of in the tape width direction. But FIG. 3 shows only the video areas.

Figure 4:
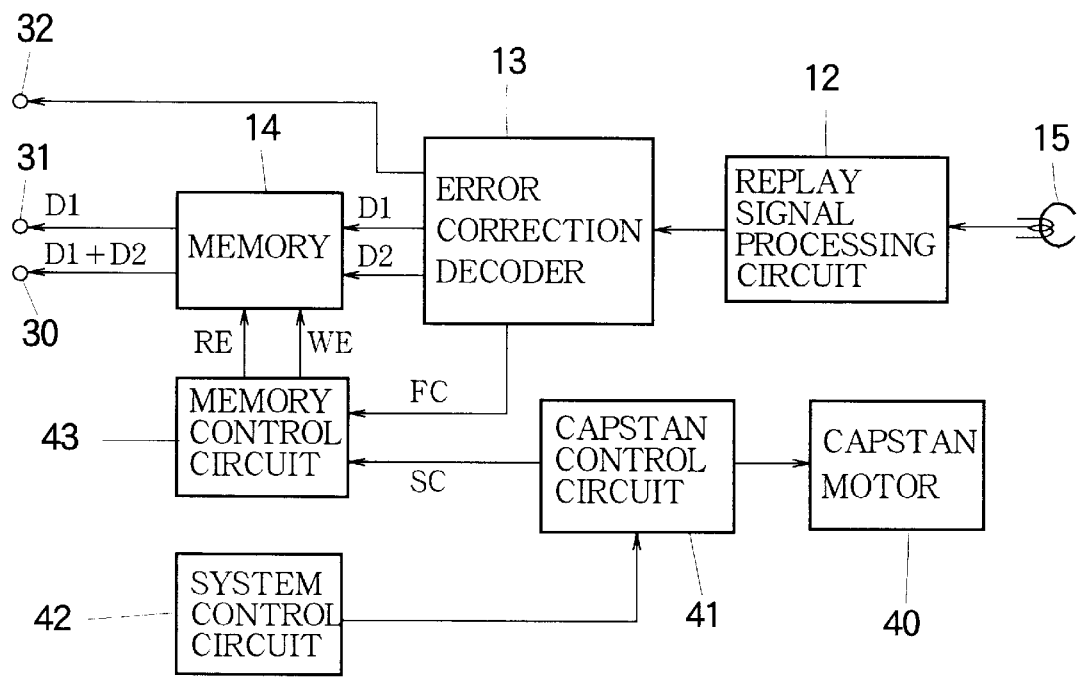
FIG. 4 is a block diagram showing a replay system of a digital VTR of Embodiment 1 of the invention.

FIG. 4 is a block diagram showing the replay system of a digital VTR which is an example of the invention. In the drawing, reference numeral 15 denotes a replay magnetic head, 12 denotes a replay signal processing circuit comprising a head amplifier and having functions of detection and demodulation of the replay signals, 13 denotes an error correction decoder correcting the errors in the replay signal on the basis of the error correction inner codes appended for each SB at the time of recording, and 14 denotes a memory having a capacity of constructing a picture (whole frame) at the time of fast replay, by collecting only the first and second HP data, or the first HP data only, from the copy areas. Reference numeral 30 denotes an output terminal for low-speed fast data, 32 denotes an output terminal for normal replay data, 40 denotes a capstan motor, 41 denotes a capstan control circuit, 42 denotes a system control circuit for switching between modes such as normal replay mode, low-speed fast replay mode, and high-speed fast replay mode, and 43 denotes a memory control circuit.

Figure 5:
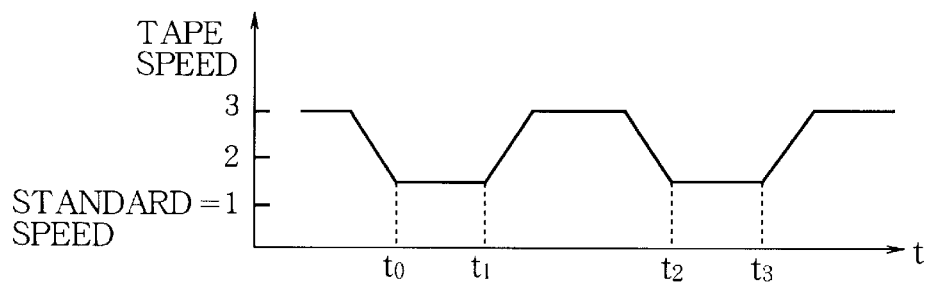
FIG. 5 is a diagram showing the state of transport of a magnetic tape in low-speed fast replay.
Figure 6:
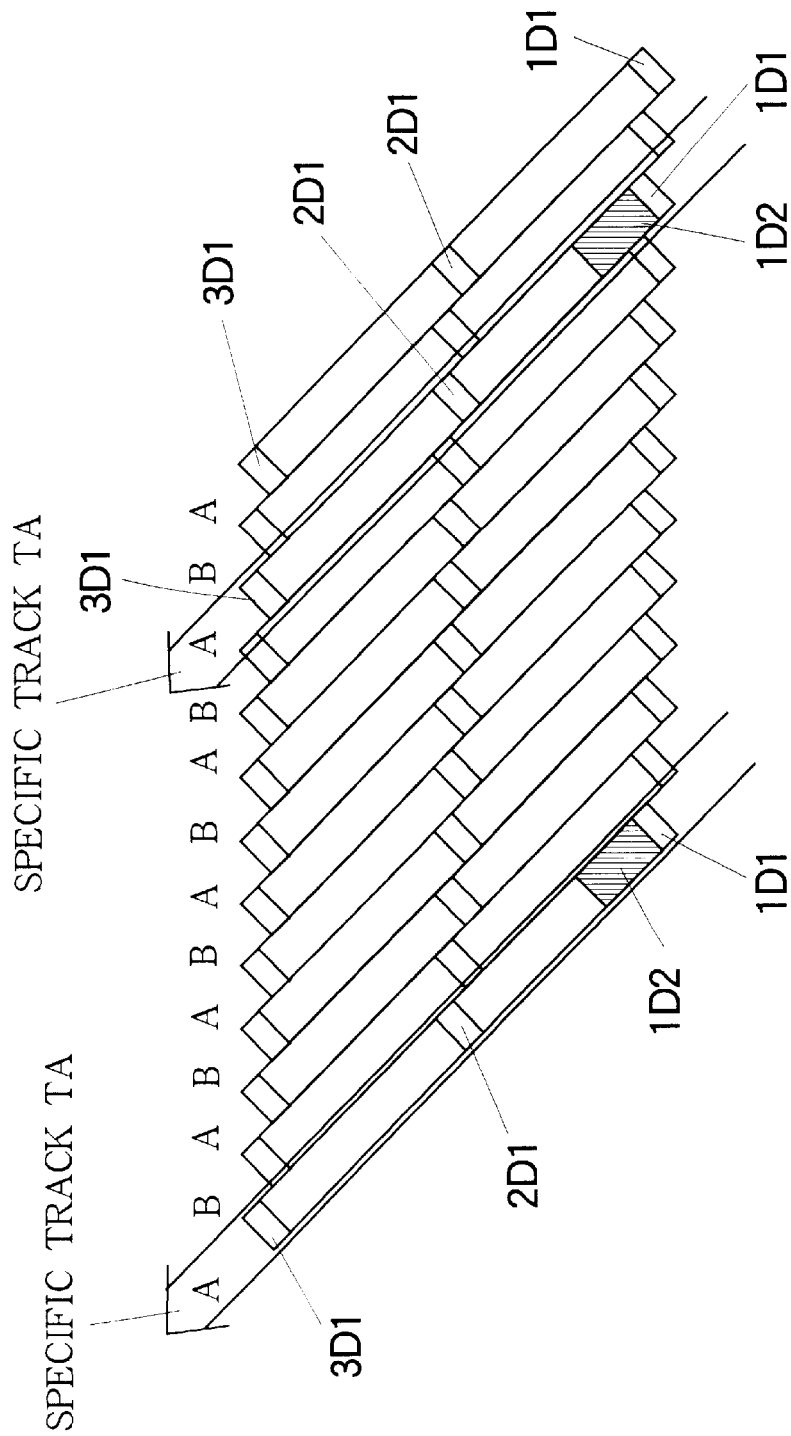
FIG. 6 is a diagram showing the scanning trace of a head against a specific track in a low-speed fast replay.

Description is now made of the operation of the fast replay at a low-speed, around a double speed, for example. FIG. 5 shows the scanning of tape transport at the time of the low-speed fast replay. FIG. 6 shows the scanning trace of the head against a magnetic tape during a low-speed fast replay. Responsive to a mode signal designating a low-speed fast replay from the system control circuit 42, the capstan control circuit 41 causes the capstan motor 40 to rotates in accordance wit the tape speed control curve shown in FIG. 5. That is, the tape transport speed is switched periodically at a certain interval, between a speed which is a little higher than and near the standard speed which is the normal replay speed, and a high speed, e.g., about three-time speed. In the period (t0 to t1) for the speed a little higher than the standard speed, tracking is so made along the specific track TA as shown in FIG. 6, to replay all the SBs including the 50 SBs for ID2, 10 SBs for the 1D1, 8 SBs for 2D1 and 7 SBs for 3D1. In the fast replay of around the double speed, fast replay data LP(n) consisting of 75 SBs are output via the output terminal 30.

FIG. 7A to FIG. 7D are diagrams showing the memory control operation during the low-speed fast replay. FIG. 7A and FIG. 7B show the contents of the input data written in the memory 14, and the control signal WE. FIG. 7C shows the content of the output data read from the memory 14, and FIG. 7D shows the time axis.

The data of 75 SBs replayed during low-speed fast replay, are error-correction processed at the error correction decoder 13 using the error correction inner codes, and flag information FC indicating whether the error is correctable or uncorrectable is output to the memory control circuit 43. Input to the memory control circuit 43 from the capstan control circuit 41 is a speed control information SC indicating the period (t0 to t1) for the speed a little higher than the standard speed, and during such period, the control signal WE is provided so that only the SBs error-corrected at the error correction decoder 13, and so indicated by the flag information FC are written in the memory 14. The memory control circuit 43 supplies the memory 14 with a control signal SE for continuously reading the previous fast data LP(n), until the next period (t2 to t3) of a speed of a little higher than the standard speed, shown in FIG. 5, when fast replay data LP (n+1) of 75 SBs in total regarding 1D2, 1D1, 2D1 and 3D1 on the next specific track TA is replayed.

By repeating the above operation, during the low-speed fast replay, the low-frequency component data which are important part in the bit stream for reconstructing the picture during low-speed replay is read from the memory 14 as the first and second HP data D1 and D2, and output via the output terminal 2, and supplied to the MPEG2 decoder, not shown, and external to the digital VTR.

Next, description is made of the operation of the middle-speed replay, of for example around 9 time-speed.

Figure 8:
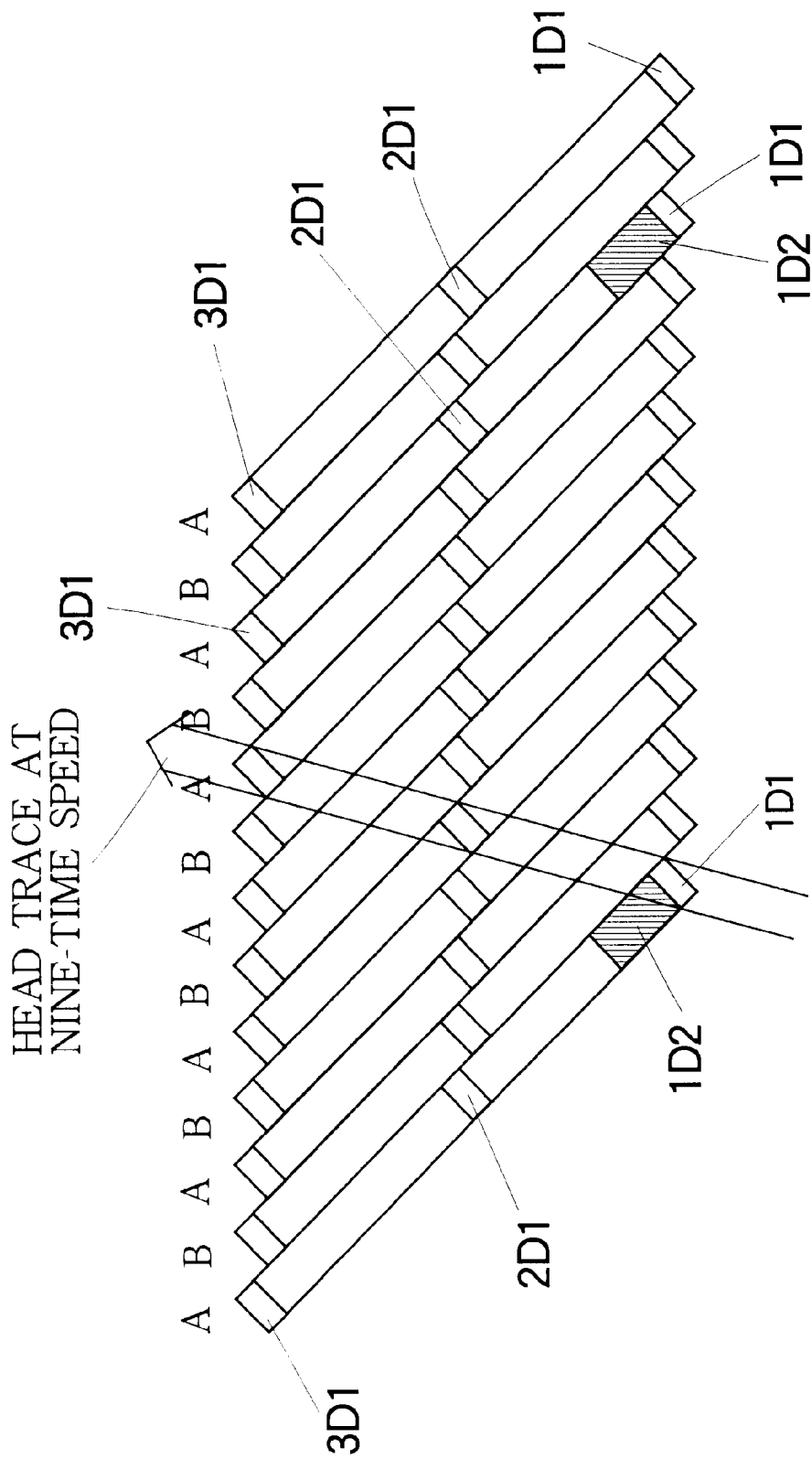
FIG. 8 is a diagram showing the scanning trace of a head against a specific track in a middle-speed or high-speed replay.
Figure 48:
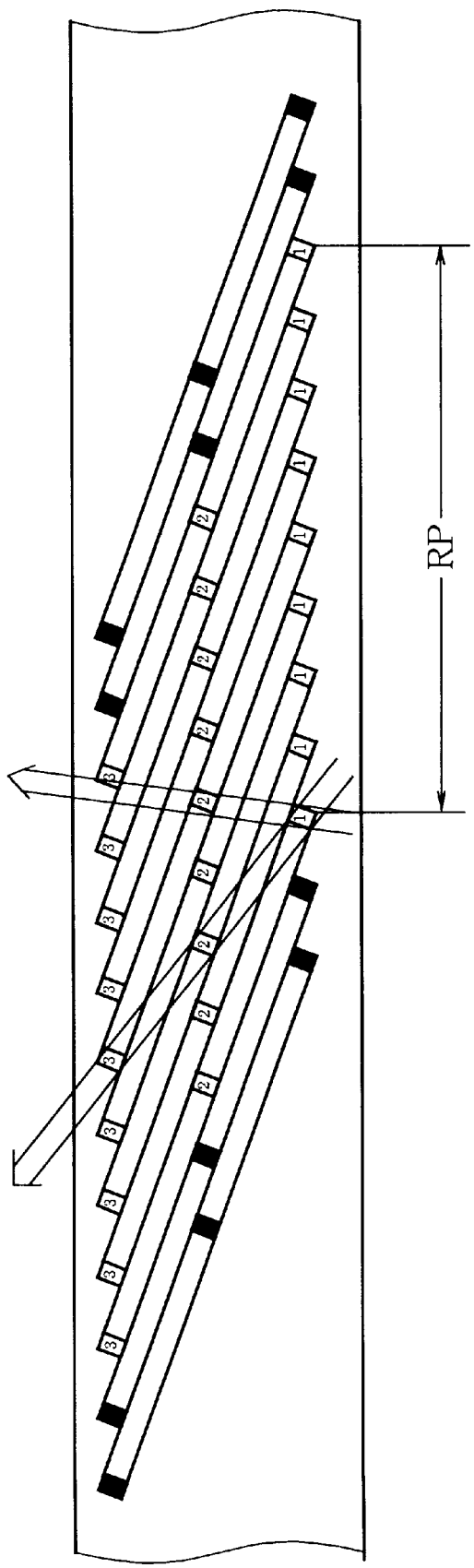
FIG. 48 is a diagram showing examples of scanning traces of a rotary head of different tape speeds.
Figure 49A:
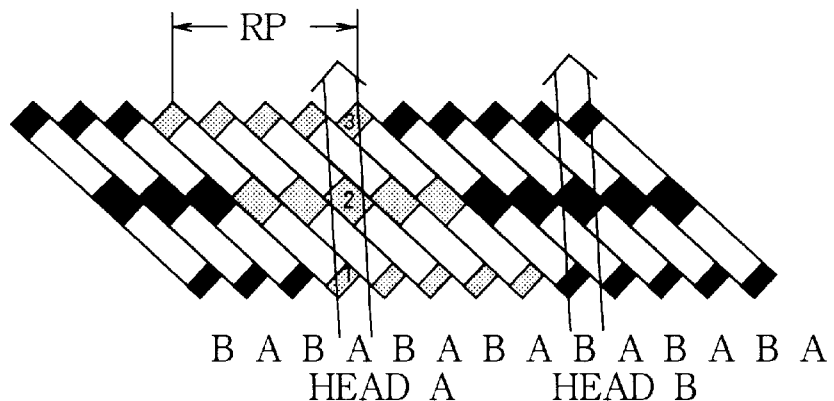
FIG. 49A and FIG. 49B are diagrams showing the scanning traces of a rotary head in five-time speed replay.
Figure 49B:
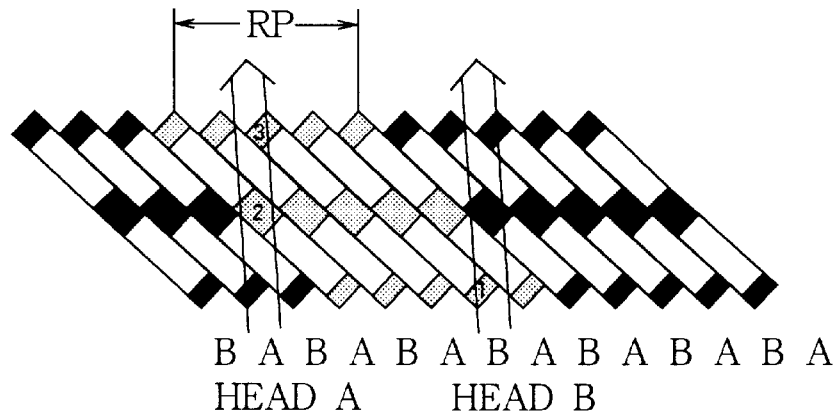
Figure 50:
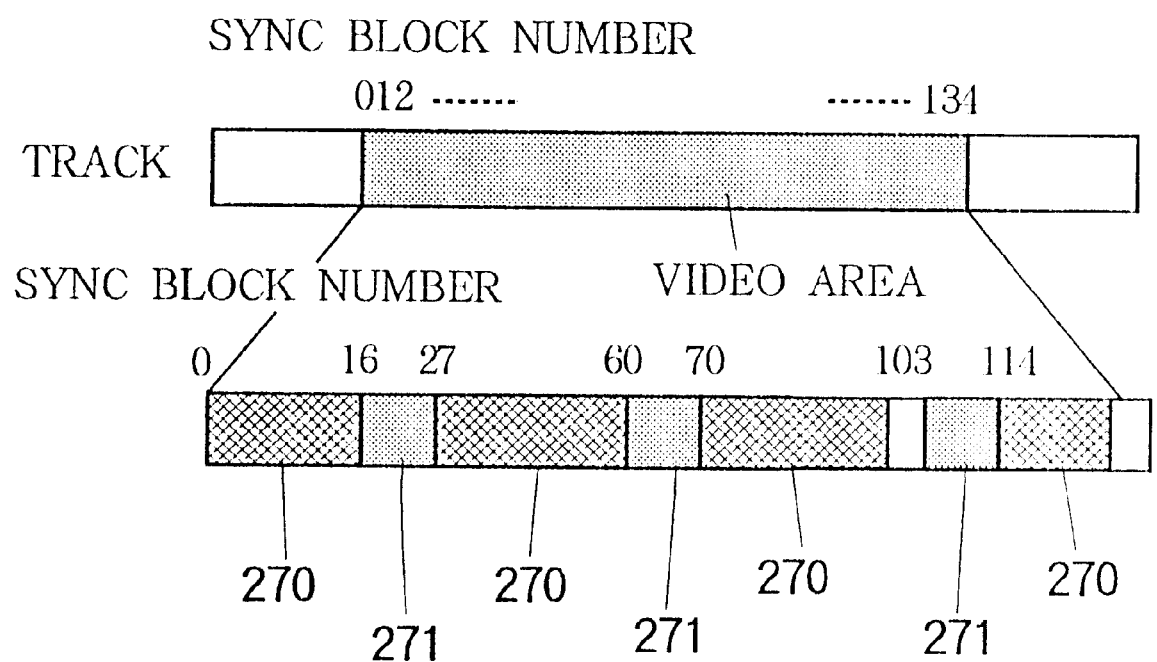
FIG. 50 is a diagram showing scanning traces showing recording format on the tracks of a conventional digital VTR.

FIG. 8 shows the scanning traces of the head against the specific tracks in the middle-speed or higher-speed fast replay. Responsive to the mode signal for middle-speed fast replay from the system control circuit 42, the capstan control circuit 41 causes the magnetic tape to be transported at a speed around nine times the standard speed. As in the nine-time speed of FIG. 48 of the prior art example, the magnetic head 14 picks up 1D1, 2D1, 3D1 for the first HP data, from the overlapping regions traced commonly at various fast replay speeds, over a plurality of tracks, so that 25 SBs in total are reproduced.

The 25 SB data replayed during the middle-speed replay is error-corrections processed at the error correction decoder 13 using the error correction inner codes, and flag information FC indicating whether the data is correctable or uncorrectable is output to the memory control circuit 43. During the middle-speed replay, the magnetic tape is transported continuously at a speed around nine times the normal speed, so that the speed control information SC input to the memory control circuit 43 is disregarded, and only the middle-speed fast replay data LP(n) consisting of SBs having been error-corrected at the error correction decoder 13 and so indicated by the flag information FC (i.e., correctable SBs) is written in the memory 14. The data LP(n) is continuously read until the next middle-speed replay data LP(n+1) is replayed and written in the memory 14. The first HP data D1 as the low-frequency component data which is an important part of the bit stream for reconstructing a picture of a fast replay is output via the output terminal 31, and sent to an MPEG decoder not shown and external to the digital VTR.

The operation during fast replay at a speed higher than nine-time speed is identical to that described above, so its description is omitted.

The operation during normal replay is next described briefly. In FIG. 3, during the normal relay, all the SBs for the MPEG2 bit stream in the main areas which are the remaining regions of the respective tracks are replayed. The replay data is error-corrected at the error correction decoder 13 using the inner codes and the outer codes, or amended (for concealment), and is output via the output terminal 32, and sent to the MPEG2 decoder not shown and external to the digital VTR.

In the above description, the first one of the ten tracks for one frame period (where the field frequency is 60 Hz) is assigned to the specific track TA, as shown in FIG. 3. However, any other one of the ten tracks may be assigned to the specific track, or two or more of the ten tracks may be assigned to specific tracks. In the latter case, the specific tracks may be adjacent to each other or separated from each other.

In the above description, 50 SBs forming the second HP data D2 are disposed collectively in the second specific region on a specific track. The 50 SBs forming the second HP data may be divided into units of smaller numbers of SBs, and disposed at different positions on the specific tracks.

In the low-speed fast replay, the entire specific track TA is generally head-traced as shown in FIG. 6, so that the intra-encoded sync blocks in the MPEG2 bit stream recorded in the remaining regions on the specific track TA can also be used. In that case, more intra-encoded data can be used than in the case described above, so that the picture of the lower-speed fast replay is further improved.

Embodiment 2

Embodiments 2, 3 and 4 described next are for obtaining the slow- and still-replay pictures of a good quality in a bit stream recording and replay device, such as a digital VTR.

Embodiment 2 is for implementing slow replay by means of a pre-roll method in which the replay system alternately conducts normal speed replay and rewinding.

Figure 9:
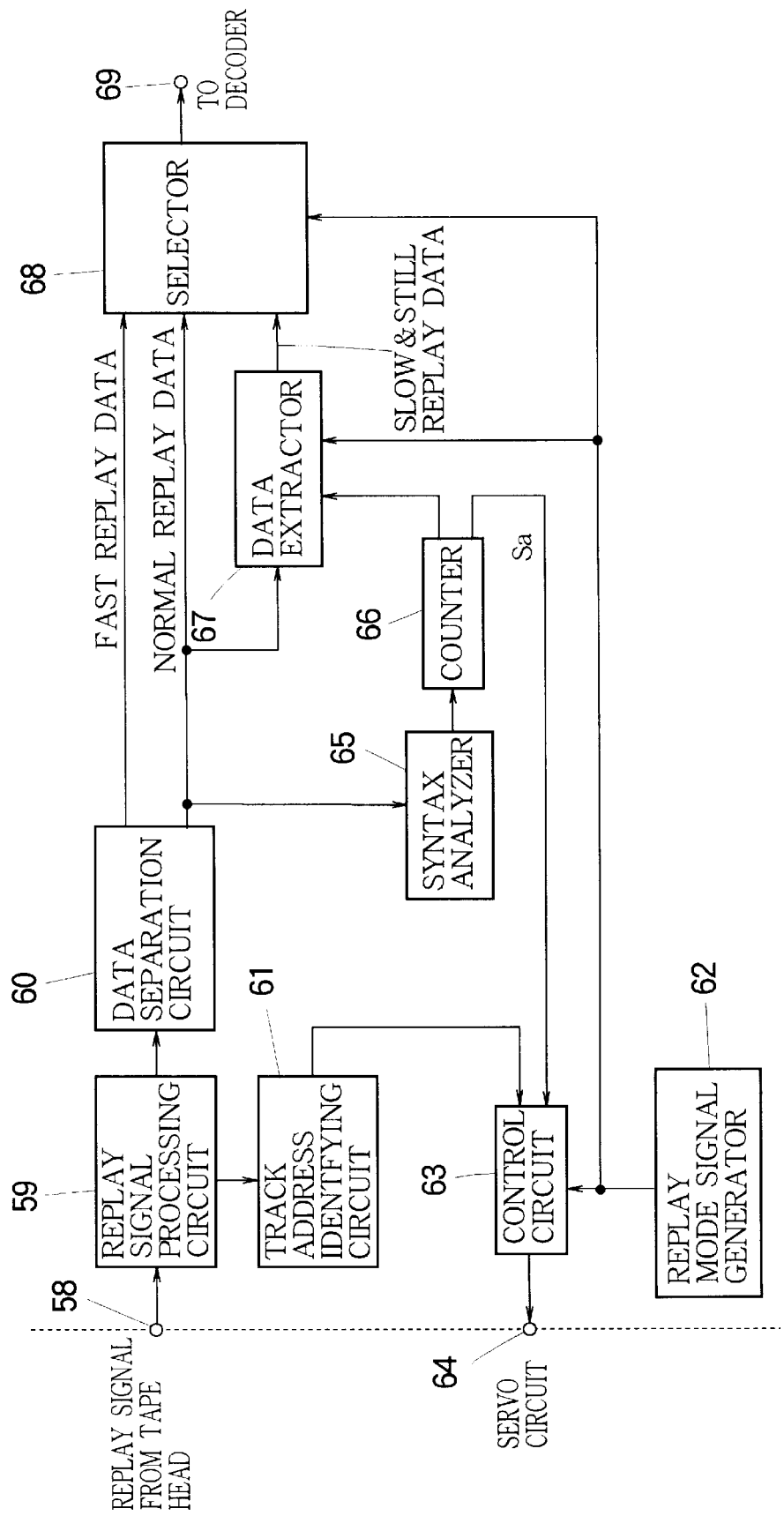
FIG. 9 is a block diagram showing a replay system of a digital VTR of Embodiment 2 of the invention.

FIG. 9 is a block diagram showing the replay system of a digital VTR in Embodiment 2. In the figure, reference numeral 58 denotes an input terminal for inputting replay signals read by the head from the main areas and copy areas of the tape, 59 denotes a replay signal processing circuit for performing processing such as waveform equalization, signal detection and modulation, and outputting the bit stream of the ATV signal, and the HP data, 60 denotes a data separation circuit for separating the input data into the bit stream from the main areas and the HP data from the copy areas, and 61 denotes a track address identifying circuit for identifying the track address track replayed from the replay signal from the replay signal processing circuit 59, and outputting a signal indicative of the track number. Reference numeral 62 denotes a replay mode signal generator for generating a signal indicative of the replay mode of the respective one of the normal replay, fast replay, slow replay and still replay, 63 denotes a control circuit for generating control signals, such as the ones for controlling the tape transport during slow replay and still replay, and 64 denotes an output terminal for outputting the control signals from the control circuit 63 to the servo circuit.

Reference numeral 65 denotes a syntax analyzer for analyzing the syntax of the MPEG2 bit stream from the main areas and detecting intra-picture data, 66 denotes a counter, 67 denotes a data extractor for extracting, storing and outputting intra-picture data from the bit steam, 68 denotes a selector for selecting the data according to the replay mode signal from the replay mode signal generator 62, and 69 denotes an output terminal for outputting the selected data to the MPEG2 decoder, provided outside the digital VTR.

The replay operation of the digital VTR of Embodiment 2will next be described in detail. During normal replay and fast replay, the replay signal read by the head from the tape is input via the input terminal 58, and sent to the replay signal processing circuit 59, where waveform equalization, signal detection and demodulation are performed, and output as the original ATV signal in the form of a bit stream and the HP data. The data separation circuit 60 separates the replay data from the replay signal processing circuit 59 into the bit stream from the main areas and the HP data from the copy areas. The bit stream from the main areas is output as the normal replay data, and the HP data from the copy areas is collected and output as the fast replay data, and they are supplied to the selector 68. The the selector 68 selects, on the basis of the replay mode signal from the replay mode signal generator 62, the normal replay data in the form of the bit stream from the main areas during normal replay, and the fast replay data in the form of the HP data from the copy areas during fast replay. The selected data is output via the output terminal 69 to the decoder, not shown.

The operation during slow replay in Embodiment 2 will next be described.

Figure 10:
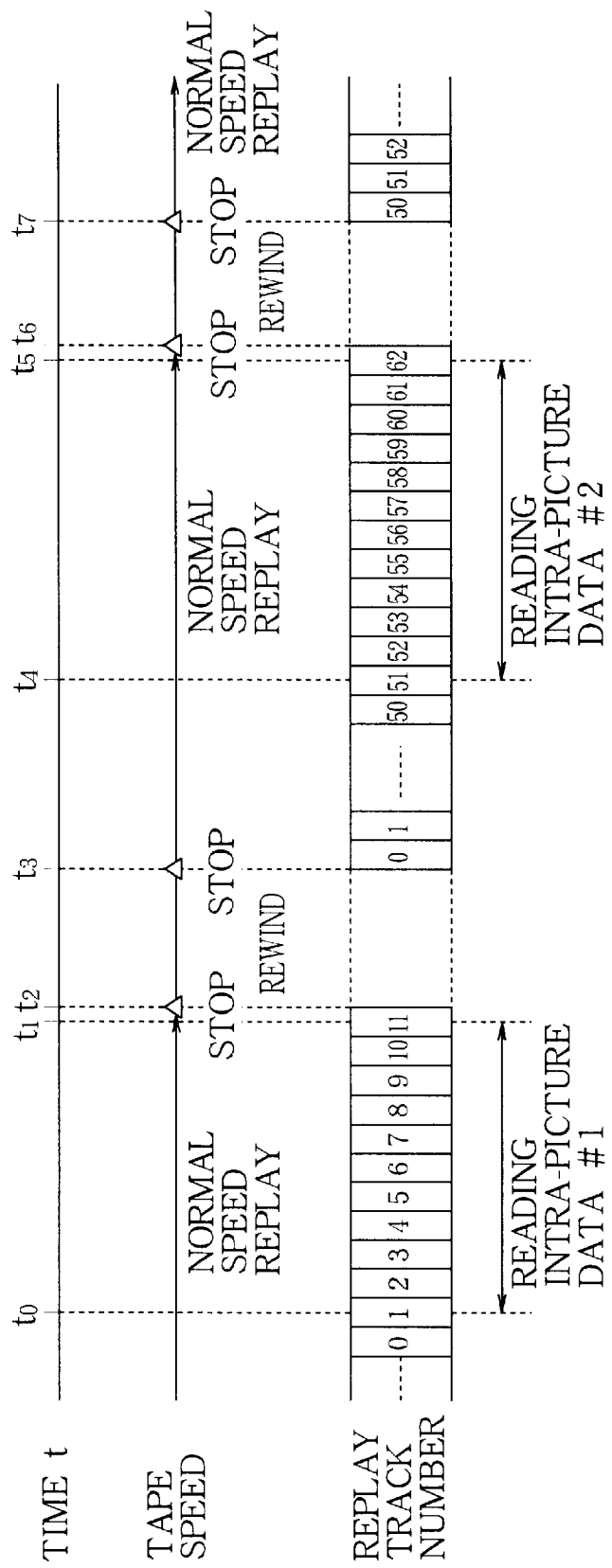
FIG. 10 is a diagram for explaining the control operation in slow replay.

FIG. 10 shows the control operation in the slow replay. It is assumed that the slow replay is achieved by a pre-roll method in which normal speed replay and rewinding are alternately conducted. In the normal speed replay during slow replay, the replay signal read by the head from the tape is input via the input terminal 58, and sent to the replay signal processing circuit 59, where replay signal processings, such as waveform equalization, signal detection and demodulation, are applied, and output as the bit stream forming the original ATV signal and the HP data. At the data separation circuit 60, the replay data is separated into the bit stream from the main areas and the HP data from the copy areas, and the bit stream from the main areas is output as the normal replay data, and the HP data from the copy areas is collected and output as fast replay data. The replay data from the replay signal processing circuit 59 is sent to the track address identifying circuit 61, and the data indicating the address of the track from which the replay data is replayed, and the signal indicative of the track number is output and input to the control circuit 63.

The bit stream from the main areas, forming the normal replay data, output form the data separation circuit 60 is input to the syntax analyzer 65, where the intra-picture data in the bit stream is detected, and timing signals are generated by the counter 66, and the intra-picture data is extracted by the data extractor 67. The counter 66 generates a timing signal Sa indicating that an intra-picture data has been extracted, and supplies the timing signal Sa to the control circuit 63.

Figure 11:
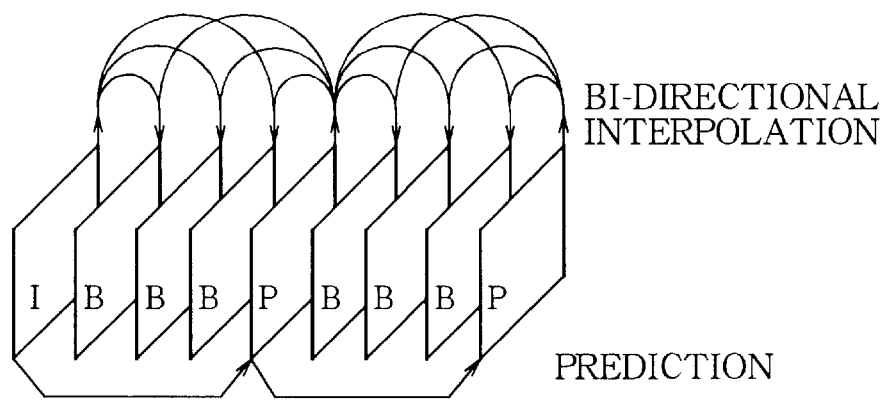
FIG. 11 is a schematic diagram showing a GOP forming an MPEG2 bit stream.

FIG. 11 is a schematic diagram showing a GOP forming the MPEG2 bit stream. In the MPEG2 bit stream, an intra-picture data, which can be decoded independently, without referring to other pictures, is present at the head of each GOP. The syntax analyzer 65 therefore detects a GOP header indicating the head of each GOP, and the counter 66 generates a timing signal. In this way, the intra-picture data immediately succeeding the GOP header can be extracted by the data extractor 67.

When the rotary drum is stopped in normal speed replay, the drum rotates for several tracks after a stop control signal is generated and until the drum is actually brought to a standstill, and when the replay is resumed by starting rotation of the rotary drum a certain servo-pull-in time is required. The length of the intra-picture data in the MPEG2 bit stream having been variable-length encoded is not constant, and the period from the detection of intra-picture data to detection of next intra-picture data is not constant. Accordingly, in the pre-roll method, the tape is rewound for a certain period from the end of the detected intra-picture data, to ensure the detection of the next intra-picture data.

Referring to FIG. 10, it is assumed that intra-picture data #1 is detected at the track Nos. 1 to 11, forming the addresses of the replay tracks. The data extractor 67 extracts the intra-picture data #1, stores the data, and sends the intra-picture data #1, as the slow replay data, to the selector 68, while the replay mode signal from the replay mode signal generator 62 indicates slow-replay. Since the replay mode signal indicates slow replay, the selector 68 outputs the intra-picture data #1 from the data extractor 67, to the output terminal 69.

The track address of the replay track for which the intra-picture data #1 has been detected is identified by the track address identifying circuit 61, and at the control circuit 63, on the basis of the signal Sa from the counter 66, the address of the track in which the intra-picture data #1 is recorded is detected. As a result, the control circuit 63 generates a control signal for stopping the transport of the tape, at the address No. 11 of the last track from which the intra-picture data #1 is read. When this control signal is sent via the output terminal 64 to the servo circuit, the tape transport is stopped, and the tape is rewound from the last track No. 11 from which the intra-picture data #1 has been read, to a track (track No. 0) one track before the track at the head of the intra-picture data #1, and then normal speed replay is again conducted. During the period t2 to t3 when the stopping and rewinding are conducted, the data extractor 67 outputs, as the slow replay data, the intra-picture data #1 having been read immediately before.

The MPEG2 bit stream is variable-length encoded, so that the length of the intra-picture data varies. That is, more than ten tracks (ten tracks forming a standard length for one frame in a consumer digital VTR) may be required for recording the intra-picture data. However, in the illustrated example, it is assumed that the intra-picture data is recorded over ten or eleven tracks.

Figure 12:
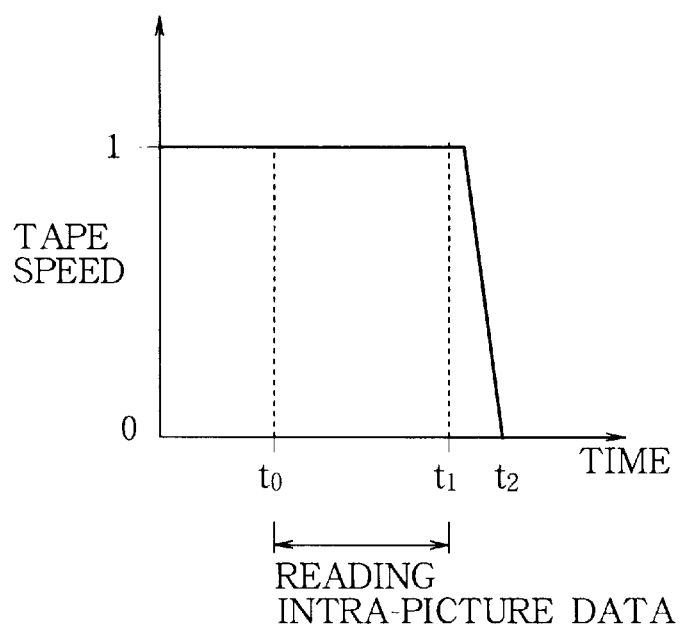
FIG. 12 is a diagram showing therelationship between the tape transport speed and the period when the intra-picture data is picked up, in Embodiment 2.

FIG. 12 is a diagram showing the relationship between the tape transport speed and the interval for the reading or extraction of the intra-picture data. In the illustrated example, the speed "1" is the normal replay speed, and speed "0" represents the state in which the tape is at standstill. The reading or extraction of the intra-picture data is conducted in a period of from time t0 to time t1.

As shown in FIG. 10, when the normal speed replay state is resumed (t3), the replay signal read by the head from the tape is input via the input terminal 58, and is sent to the replay signal processing circuit 59, where the replay signal processings are applied, and the data separation circuit 60 separates the replay data into the bit stream from the main areas and the HP data from the copy areas, and output them. The replay data from the replay signal processing circuit 59 is sent to the track address identifying circuit 61, and the data indicating the track address replayed from the replay data is identified, and the signal indicative of the track number is supplied to the control circuit 63. The bit stream from the main areas, which is the normal replay data from the data separation circuit 60 is input to the syntax analyzer 65, where the intra-picture data in the bit stream is detected, and the counter 66 generates start and termination timing signals for extracting the intra-picture data. The data extractor 67 extracts the intra-picture data, and the counter 66 generates a timing signal Sa indicating that the intra-picture data has been extracted. The timing signal Sa is input to the control circuit 63. The control circuit 63 receives the track address number identified by the track address identifying circuit 61, and the signal Sa indicating that the intra-picture data has been extracted, and when the intra-picture data #2 next to the intra-picture data #1 which was extracted previously is extracted, the control circuit 63 detects the address of the track in which the intra-picture data #2 is recorded, and at the last track where the intra-picture data is extracted, the control signal for stopping the tape transport is generated. When this control signal is supplied via the output terminal 64 to the servo circuit, the tape transported is stopped.

Referring to FIG. 10, let us assume that the intra-picture data #2 of the tracks Nos. 51 to 62 is detected, after the intra-picture data #1. When the intra-picture data #2 is extracted, the data extractor 67 stores the intra-picture data #2 in substitution for the intra-picture data #1, and outputs the intra-picture data #2 as the slow replay data, to the selector 68. Since the replay mode signal indicates slow replay, the selector 68 outputs the data from the data extractor 67 to the output terminal 69. Responsive to the track address number from the track address identifying circuit 61 and the timing signal Sa indicating that the intra-picture data #2 has been detected, the control circuit 63 generates a control signal for stopping the tape transport at the last track of the address No. 62 where the intra-picture data #2 is read. The tape is rewound from the last track with the address No. 62 where the intra-picture data #2 is read, to the track (track No. 50) one before the first track where the intra-picture data #2 starts, and normal speed replay is again conducted. For the period (t6 to t7) when the stopping and rewinding are conducted, the data extractor 67 outputs the intra-picture data #2 having extracted immediately before the stopping as the slow replay data.

Next, the normal speed replay is again conducted, and the operation similar to that described above is repeated, and the slow replay is thus continued.

For still replay, like the slow replay, during the normal speed replay, intra-picture data in the bit stream from the main areas separated form the replay data, at the data separation circuit 60 is detected at the syntax analyzer 65, and a timing signal is generated at the counter 66, and the intra-picture data is extracted and stored at the data extractor 67. When the tape is at a standstill, the intra-picture data extracted by the data extractor 67 immediately before is kept output as the still replay data.

As has been described, the normal speed replay and rewinding are alternately conducted, and the intra-picture data in the bit stream from the main areas, extracted during normal speed replay, is stored, and output as slow or still replay data. Reproduction of data for slow or still replay is ensured, and slow or still replay pictures of a good quality can be obtained.

Embodiment 3

In Embodiment 2, the pre-roll method was used, in which when forward slow replay is performed, intra-picture data in the bit stream from the main areas is extracted during normal sped replay, and is stored, and used as image data during slow replay. The pre-roll method can be similarly used in reverse slow replay. The intra-picture data in the bit stream from the main areas is extracted, stored, rearranged and output, and used as the image data for the slow replay.

Figures 13A, 13B:
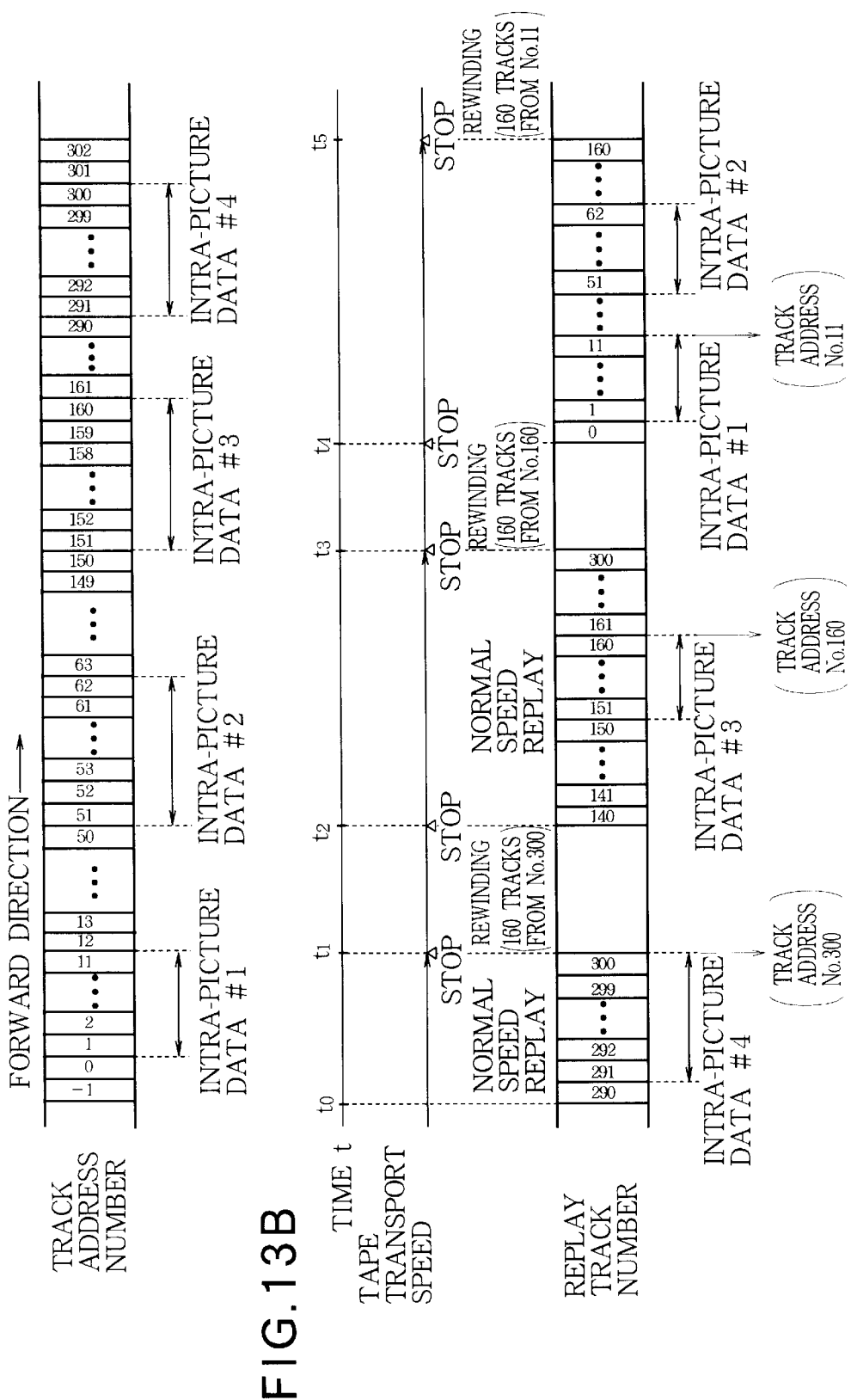
FIG. 13A and FIG. 13B are diagrams for explaining the control operation in reverse slow replay in Embodiment 3.

FIG. 13A and FIG. 13B are explanatory diagrams for showing the control operation in the reverse slow replay in Embodiment 3. FIG. 13A shows an example of tracks in which track address and intra-picture data are recorded on the tracks. It is assumed that the value of the track address (track number) increases rightward, starting from the track address No. 0. As in Embodiment 2, the reverse slow replay is performed by the pre-roll method, in which normal speed replay and rewinding are conducted alternately. It is assumed that the reverse slow replay is started from the track No. 290 in FIG. 13A.

First, normal speed replay is conducted starting at the track No. 290, and intra-picture data #4 recorded in the track Nos. 291 to 300 in the bit stream from the main areas is detected, separated at the data separation circuit 60 in FIG. 9, a timing signal is generated by the counter 66, and the intra-picture data #4 is extracted and stored at the data extractor 67 (t0 to t1). The data extractor 67 outputs the intra-picture data #4 as the reverse slow replay data, to the selector 68. Because the replay mode signal indicates reverse slow replay, the selector 68 outputs the data from the data extractor 67 to the output terminal 69. The counter 66 generates a timing signal Sa indicating that the intra-picture data #4 has been extracted, and supplies it to the control circuit 63. The addresses of the tracks from which the intra-picture data #4 has been detected are identified by the track address identifying circuit 61, and the addresses of the tracks where the intra-picture data #4 is recorded are detected at the control circuit 63, in accordance wit the signal Sa from the counter 66. As a result, the control circuit 63 rewinds the tape from the last track of address No. 300 from which the intra-picture data has been detected, to a track No. 140 preceding by the number of tracks (160 tracks in this example) within which at least one other intra-picture data is recorded, and stops the tape (t1 to t2), and again conducts the normal speed replay.

When the state of normal speed replay is resumed, as in the above description, the bit stream from the main areas, forming the normal replay data, output from the data separation circuit 60 is input to the syntax analyzer 65. The syntax analyzer 65 detects the intra-picture data #3 recorded in the track Nos. 151 to 160, from the bit stream, and the counter 66 generates starting and terminating timing signals for extracting the intra-picture data. The data extractor 67 extracts the intra-picture data #3. The counter 66 generates a timing signal Sa indicating that the intra-picture data has been extracted, and supplies it to the control circuit 63. The control circuit 63 receives the track address number identified by the track address identifying circuit 61 and the signal Sa from the counter 66 indicating that the intra-picture data has been extracted. When the intra-picture data #3 is extracted, the control circuit 63 detects the address of the track where the intra-picture data #3 is recorded, stores the number of the last track from which the intra-picture data #3 is extracted, and generates a control signal to stop the tape at the last track No. 300 from which the previous intra-picture data #4 was extracted (t2 to t3). This control signal is supplied via the output terminal 64 to the servo circuit, so that the tape is stopped.

When the intra-picture data #3 is extracted, the data extractor 67 substitutes the intra-picture data #3 for the intra-picture data #4, and outputs the intra-picture data #3, as the reverse replay data, to the selector 68. Since the replay mode signal indicates the reverse slow replay, the selector 68 outputs the data from the data extractor 67 to the output terminal 69. Then, the tape is rewound to a track No. 0, which is 160 tracks preceding, by 160 tracks within which at least one other intra-picture data is recorded, the last track No. 160 from which the intra-picture data #3 was extracted, and is stopped (t3 to t4), and then normal speed replay is again conducted.

When the state of normal speed replay is resumed, as in the above description, the bit stream from the main areas output from the data separation circuit 60 is input to the syntax analyzer 65. The syntax analyzer 65 detects the intra-picture data #1 recorded in the track Nos. 1 to 11, from the bit stream, and the counter 66 generates starting and terminating timing signals for extracting the intra-picture data. The data extractor 67 extracts the intra-picture data #1. The counter 66 generates a timing signal Sa indicating that the intra-picture data has been extracted, and supplies it to the control circuit 63. The control circuit 63 receives the track address number identified by the track address identifying circuit 61 and the signal Sa from the counter 66 indicating that the intra-picture data #1 has been extracted. When the intra-picture data #1 is extracted, the control circuit 63 detects the address of the track where the intra-picture data #1 is recorded, and stores the number of the last track from which the intra-picture data #1 is extracted.

The normal speed replay is continued, and the intra-picture data #2 in the bit stream recorded in the track Nos. 51 to 62 is detected, and the counter 66 generates a timing signal, and the data extractor 67 extracts and stores the intra-picture data #2, and a control signal for stopping the tape transport is generated at the last track No. 160 of the intra-picture data #3 of the previous normal speed replay (t4 to t5). This control signal is sent via the output terminal 64 to the servo circuit, so that the tape transport is stopped.

When the intra-picture data #1 and #2 is extracted, the data extractor 67 rearranges the data by reversing the order, and substitutes, for the intra-picture data #3, the intra-picture data #2 and then the intra-picture data #1, and successively outputs them as the slow reverse data, to the selector 68. Since the replay mode signal indicates the reverse slow replay, the selector 68 outputs the data from the data extractor 67 to the output terminal 69.

Then, the normal speed replay is conducted, and the operation similar to that described above is repeated. The reverse slow replay is continued in this way.

In this way, normal speed replay and rewinding are alternately conducted, and the intra-picture data in the bit stream from the main areas extracted during normal speed replay is stored, and while tape is rewound to a track preceding the track from which the normal speed replay was started, the intra-picture data is rearranged and output, and used as the image data for the reverse slow replay. Thus, the data for the reverse slow replay is ensured, and a replay picture of a good quality is obtained, and effects similar to those of Embodiment 2 are obtained.

Embodiment 4

Figure 14:
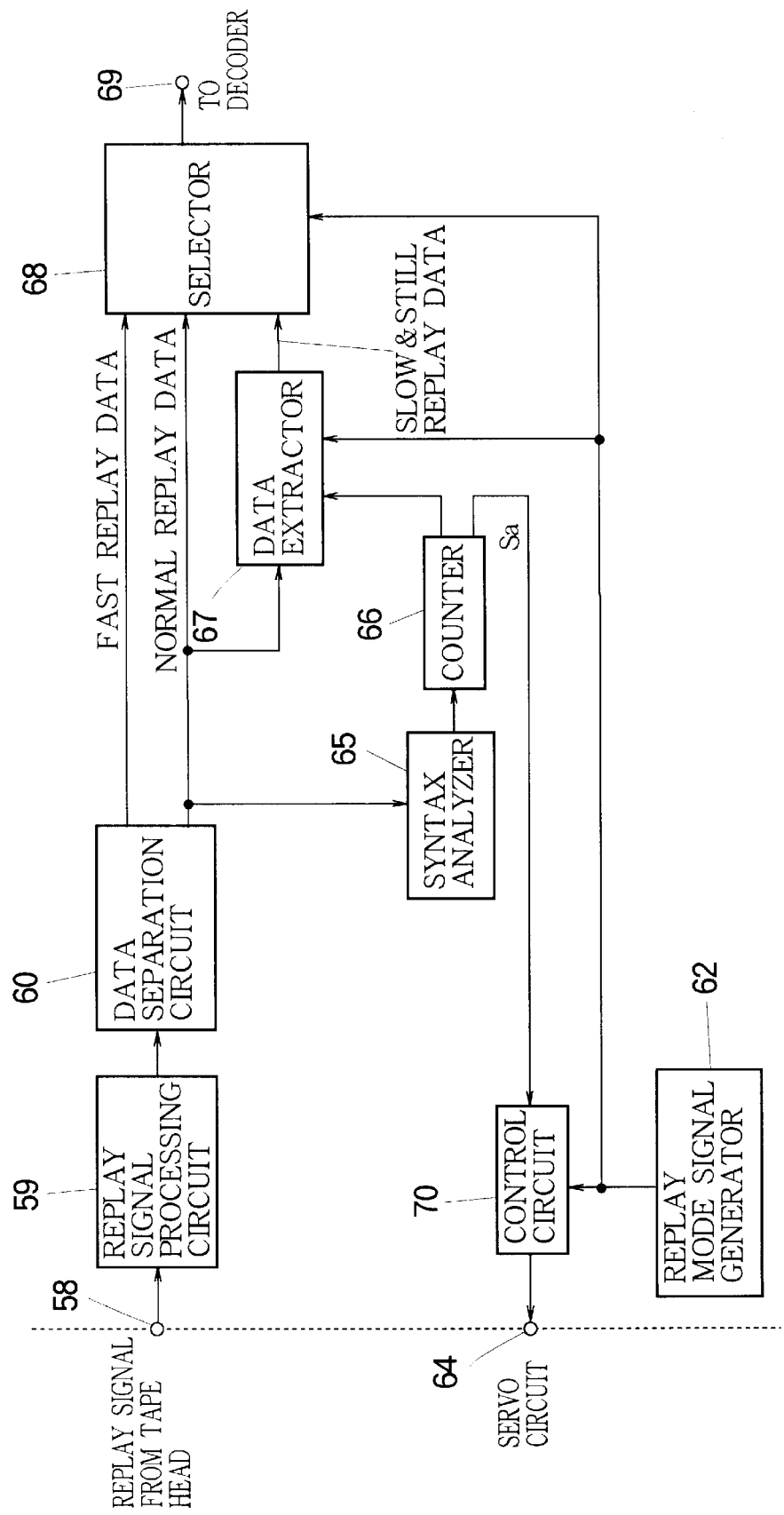
FIG. 14 is a block diagram showing a replay system of a digital VTR of Embodiment 4 of the invention.

FIG. 14 is a block diagram showing a replay system of a digital VTR of Embodiment 4 of the invention. In the drawing, reference numerals 58 to 60, 62, and 64 to 69 are identical to those in the device of Embodiment 2. Reference numeral 70 a control circuit for generating signals for controlling tape transport, and the like during slow and still replays, and the control signals are supplied to a servo circuit.

Intermittent drive for intermittently conducting normal speed replay and stopping to achieve slow replay will next be described. The operations for the normal replay and the fast replay are identical to those in Embodiment 2, and their description is omitted.

Figure 15:
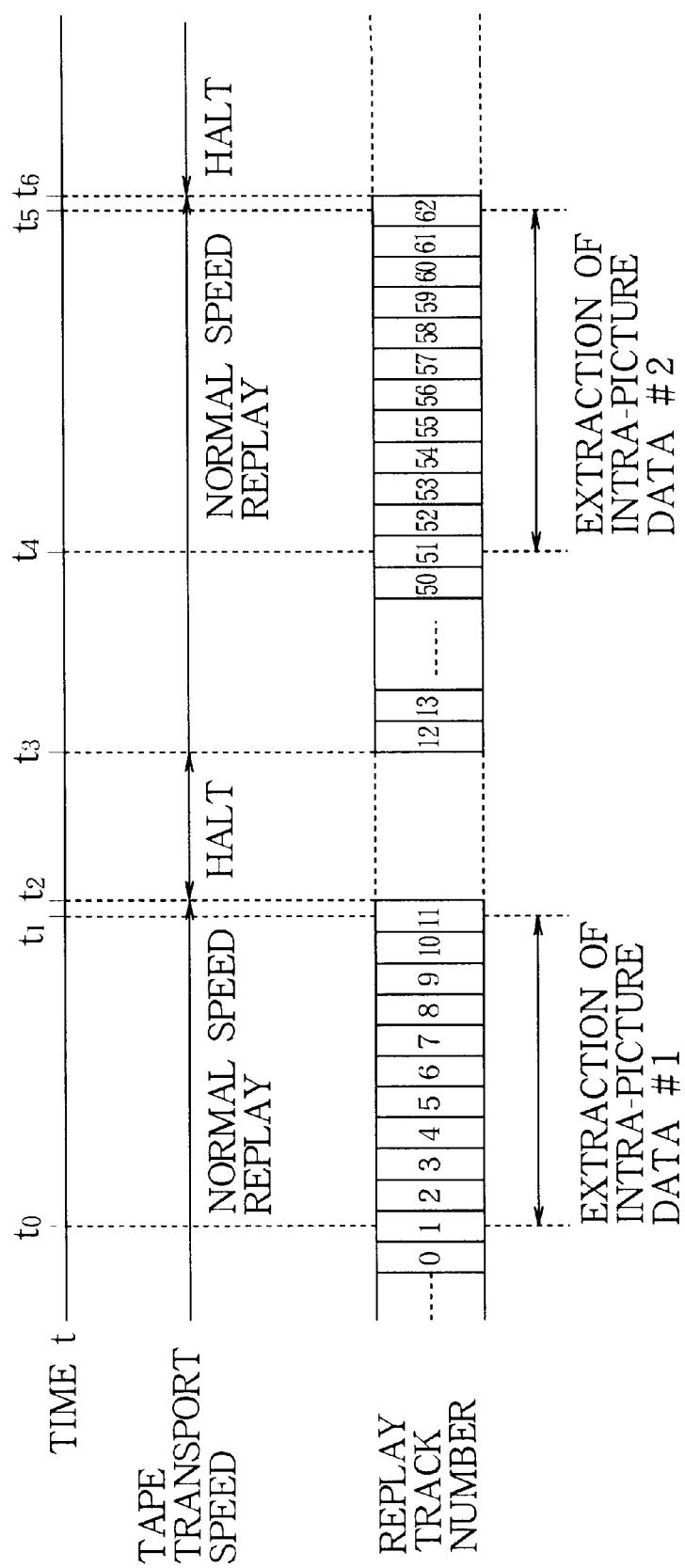
FIG. 15 is a diagram for explaining the control operation in slow replay.

FIG. 15 is an explanatory diagram showing the control operation during slow replay. The replay signal read by the head from the tape at the normal replay speed, during the slow replay, is input via the input terminal 58, sent to the replay signal processing circuit 59, where replay signal processings, such as waveform equalization, signal detection and modulation, are applied, and output as the bit stream of the original ATV signal and the HP data. The data separation circuit 60 separates the replay data into the bit stream from the main areas and the HP data from the copy areas, outputs the bit stream from the main areas as the normal replay data, and collects and outputs the HP data from the copy areas as the fast replay data. The bit stream from the main areas forming the normal replay data, output from the data separation circuit 60 is input to the syntax analyzer 65, where the intra-picture data in the bit stream is detected, the counter 66 generates a timing signal, and the data extractor 67 extracts the intra-picture data #1 (t0 to t1). The counter 66 generates a timing signal Sa indicating that the intra-picture data has been detected, and supplies it to the control circuit 70.

As was described in connection with Embodiment 2, the MPEG2 bit stream is formed of a GOP (group of pictures) shown in FIG. 11, and the intra-picture data which can be decoded independently without referring to other pictures is present at the head of the GOP. Accordingly, the syntax analyzer 65 detects the GOP header indicating the beginning of the GOP, the counter 66 generates a timing signal, and the intra-picture data immediately after the GOP header is extracted at the data extractor 67.

Referring to FIG. 15, let us assume that the intra-picture data #1 is extracted at the track Nos. 1 to 11. The data extractor 67 extracts and stores the intra-picture data #1, and sends the data as the slow replay data to the selector 68 while the replay mode signal from the replay mode signal generator 62 indicates slow replay. Since the replay mode signal indicates slow replay, the selector 68 outputs the data from the data extractor 67 to the output terminal 69.

When the extraction of the intra-picture data #1 is completed, the counter 66 supplies the control signal 70 with a signal Sa indicating that the intra-picture data #1 has been extracted. The control signal 70 then generates a signal for stopping the tape transport, so that the tape transport is stopped. The tape is halted for a period (t2 to t3) corresponding to the speed of the slow replay, and then normal speed replay is conducted again. While the tape is halted, the data extractor 67 outputs the intra-picture data #1 extracted immediately before, as the slow replay data.

Figure 16:
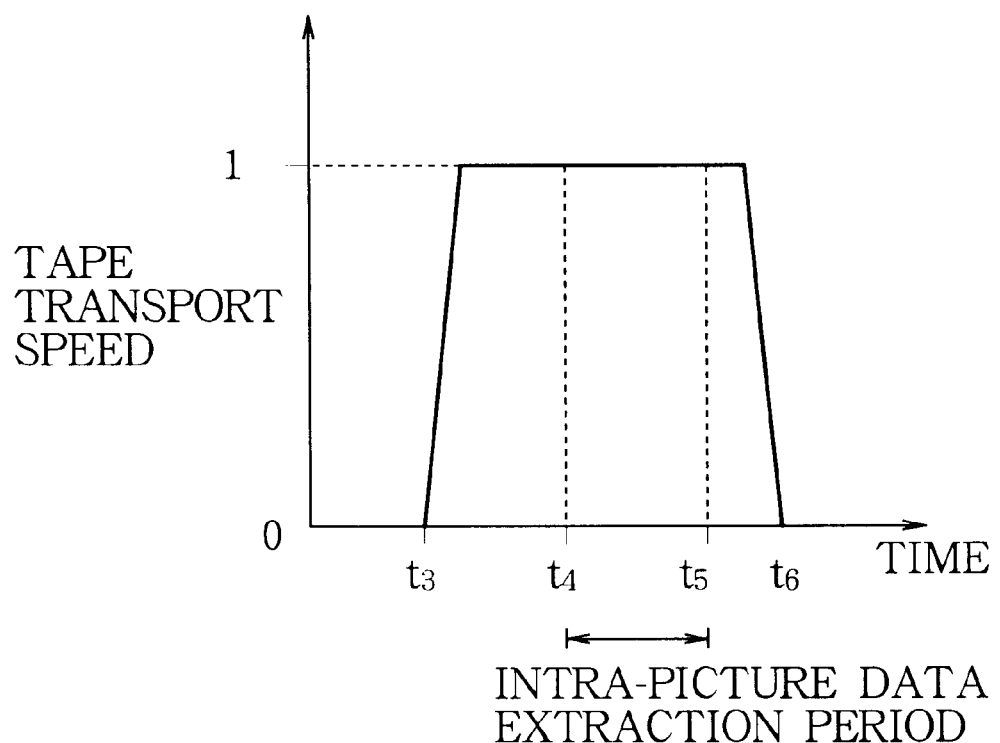
FIG. 16 is a diagram showing the relationship between the tap transport speed and the period when the intra-picture data is picked up, in Embodiment 4.

FIG. 16 shows the relationship between the tape transport speed and the period of extraction of the intra-picture data in Embodiment 4. The transport speed "1" represents the normal replay speed, and transport speed "0" represents the state in which the speed "zero", i.e., the state in which the tape is halted. The extraction of the intra-picture data is conducted for a period from time t4 to t5 in the drawing. That is, the extraction of the intra-picture data after time t2 when the tape transport is stopped is conducted for a period of from time t4 to time t5. At time t3, when the normal speed replay state is resumed, the replay signal read by the head from the tape is input via the input terminal 58, and sent to the replay signal processing circuit 59, where replay signal processings are applied. The data separation circuit 60 separates the replay data into the bit stream from the main areas and the HP data from the copy areas, and outputs them. The bit stream from the main areas, forming the normal replay data, output from the data separation circuit 60, is input to the syntax analyzer 65, which detects the intra-picture data in the bit stream. The counter 66 generates timing signals for extracting the intra-picture data. The data extractor 67 extracts the intra-picture data, and the counter 66 generates a timing signal Sa indicating that the intra-picture data has been extracted, and supplies it to the control circuit 70. On the basis of the signal Sa from the counter 66, indicating that the intra-picture data has been detected, the control circuit 70 generates a control signal for stopping the tape transport when the intra-picture data #2 next to the intra-picture data #1 that is extracted previously. This control signal is sent via the output terminal 64 to the servo circuit, so that the tape transport is stopped.

Referring to FIG. 15, let us assume that the intra-picture data #2 is extracted at the track Nos. 51 to 62, after the intra-picture data #1. When the intra-picture data #2 is extracted, the data extractor 67 replaces the intra-picture data #1 with intra-picture data #2, and outputs the intra-picture data #2 as the slow replay data, and sends the intra-picture data #2 to the selector 68. Since the replay mode signal indicates slow replay, the selector 68 outputs data from the data extractor 67 to the output terminal 69. The tape is halted for a period corresponding to the speed of the slow replay, and then normal speed replay is again conducted. During the period (t2 to t3) when the tape is halted, the data extractor 67 outputs the intra-picture data #2 as the slow replay data.

Then, normal speed replay is again conducted, and the operation similar to that described is repeated. The slow replay is thus continued.

In still replay, as in the slow replay, intra-picture data in the bit stream from the main areas, separated from the replay data, at the data separation circuit 60 is detected by the syntax analyzer 65, and the counter 66 generates a timing signal, and the data extractor 67 extracts and stores the intra-picture data. When the tape transport is halted, the data extractor 67 keeps outputting the intra-picture data extracted immediate before, as the still replay data. In this way, the normal speed replay and the halting are intermittently conducted, to store and output the intra-picture in the bit stream from the main areas, and use it as the image data for slow or still replay, and the data for slow and still replays is ensured, and slow or still replay images of a good quality are obtained.

Embodiment 5

Embodiment 5 is for providing a digital VTR which is less easily affected by data errors due to recording and replay, and with which fast replay at an arbitrary speed.

Figure 17:
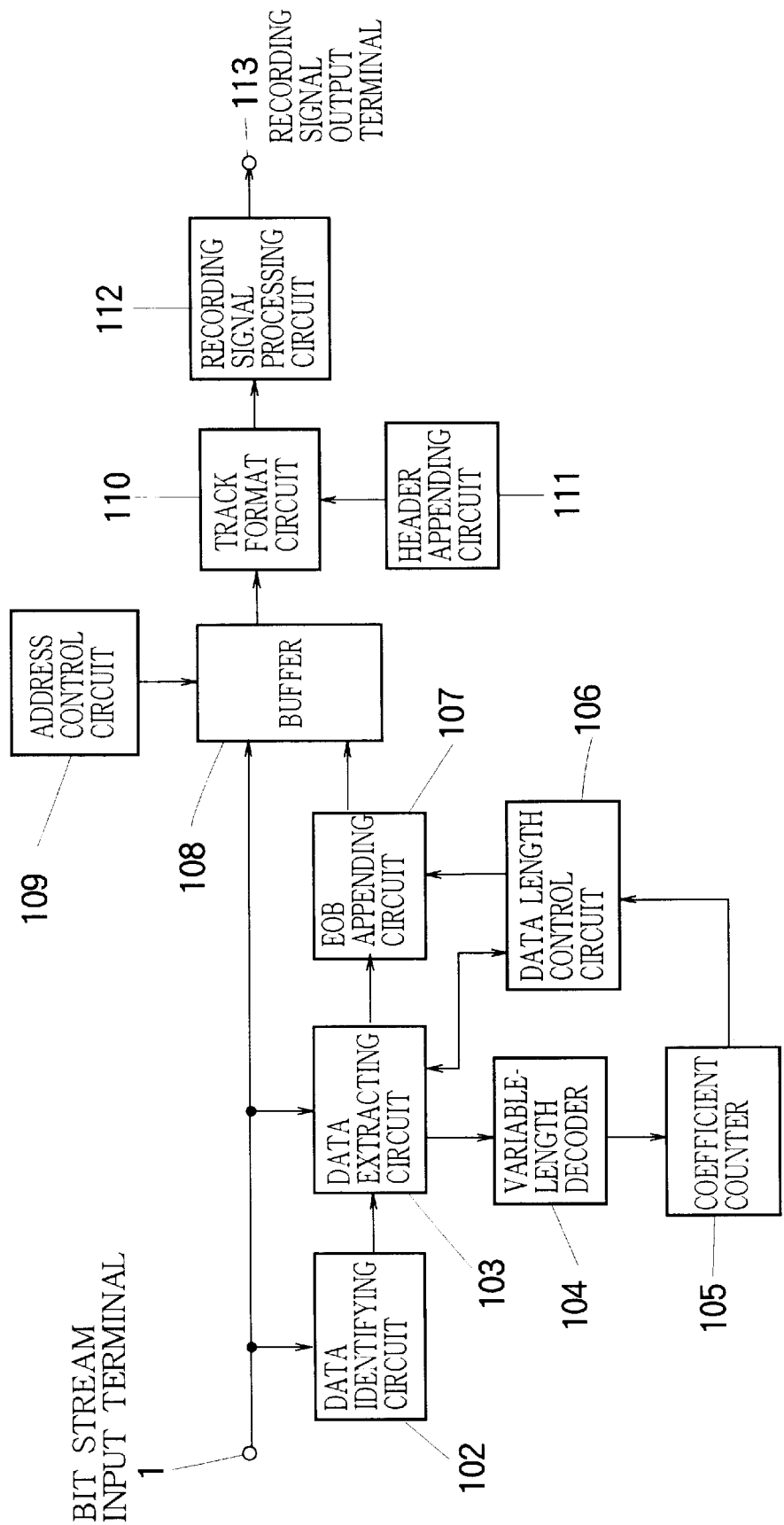
FIG. 17 is a block diagram showing a recording system of a digital VTR of Embodiment 5 of the invention.

FIG. 17 is a block diagram showing a recording system of a digital VTR of Embodiment 5 of the invention. In the drawing, reference numeral 1 denotes an input terminal for a bit stream with a packet length of 188 bytes, 102 denotes a data identifying circuit, 103 denotes a data extracting circuit, 104 denotes a variable-length decoder for compressed data, 105 denotes a coefficient counter counting the number of coefficients created as a result of the decoding, 106 denotes a data amount control circuit, 107 denotes an EOB (end of block) appending circuit, 108 denotes a buffer, 109 denotes an address control circuit, 110 denotes a track format circuit, 111 denotes a header appending circuit, 112 denotes a recording signal processing circuit, and 113 denotes an output terminal for a recording signal for a magnetic tape.

When recording onto a magnetic tape is conducted, transparent recording is conducted, and at the same time, fast replay data is extracted and recorded. The data identifying circuit 102 denotes the header information of the bit stream input via the input terminal 1, and selects the transport packet containing the image of the intra-picture data. The data extraction circuit 103 extracts intra-picture data within the transport packet, from the bit stream, and outputs the the encoded data of the image block to the variable-length decoder 104. The variable-length decoder 104 having received the encoded code, outputs the orthogonal transform coefficients of the image block, to the coefficient counter 105. The coefficient counter 105 outputs the count value of the number of the orthogonal transform coefficients to the data amount control circuit 106. The data amount control circuit 106 receives the coefficient count value and the amount of decoded data, and controls the data extraction circuit 103 so that the extracted data is accommodated in one sync block under the condition that the sum of the count values of the orthogonal transform coefficients is within a predetermined range.

The buffer 108 temporarily stores the bit stream and the fast replay data output from the EOB appending circuit 107. In doing so, it reads the data in the order in which it is received on the tape, under the control by the address control circuit 109. The data output from the buffer 108 is input to the track format circuit 110, where sync data, ID data, parities are added for each sync block, and the header output from the header appending circuit 111 is appended to the data input from the buffer 108, and the data is then output to the recording signal processing circuit 112, and then to the output terminal 113, as the recording signal to be recorded on the tape.

Figure 18A:
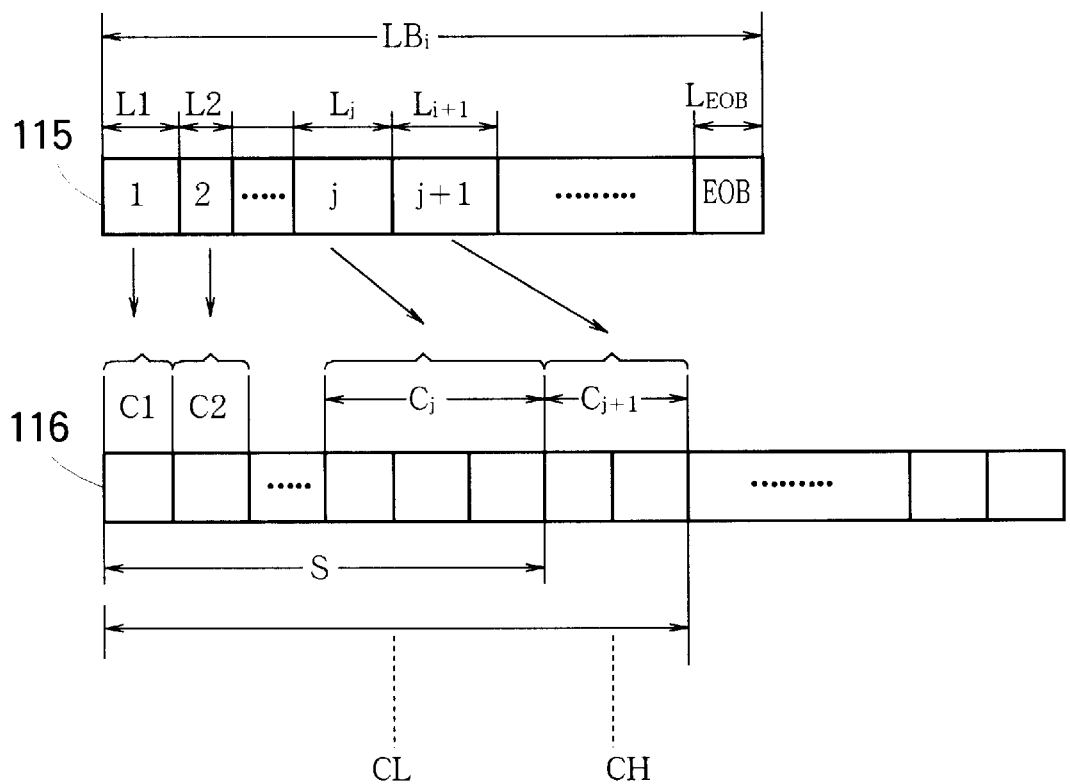
FIG. 18A shows the encoded data and decoded data of the image block, for explaining the decoding of the image block in a recording system.
Figure 18B:
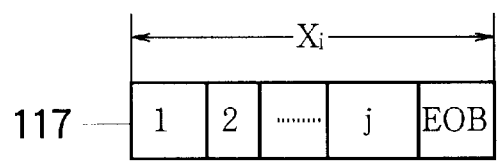
FIG. 18B shows the configuration of the HP data for high-speed replay, for explaining the decoding of the image block in the recording system.

FIG. 18A and FIG. 18B are diagrams for explaining the decoding of the image block in the recording system. FIG. 18A shows the configuration of the encoded data and the decoded data of the image block. In the drawing, reference numeral 115 denotes an i-th image block data, and its length is LBi (bits). Reference numeral 116 denotes orthogonal coefficients obtained by decoding the encoded data (1, 2, . . .) of the image block data 115. FIG. 18B shows the configuration of the HP data for fast replay. In the drawing, reference numeral 117 denotes data extracted from the image block data 115, and its length is Xi (bits).

Figure 19:
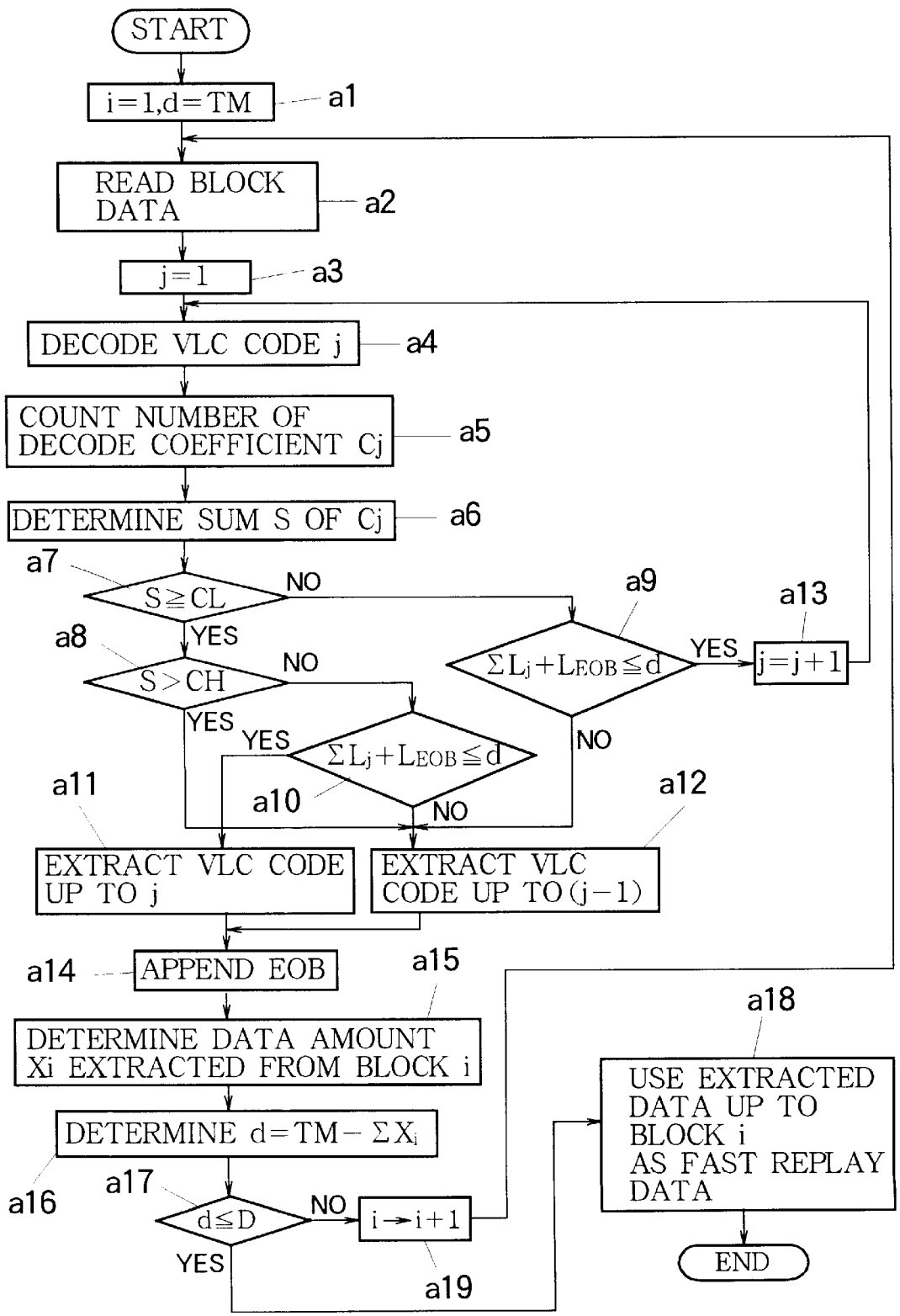
FIG. 19 is a flow chart showing the procedure of the decoding of the image block in the recording system.

FIG. 19 is a flow chart showing the procedure of decoding the image block in the recording system. The method for determining the amount of extracted data at the data amount control circuit 106 will next be described with reference to FIG. 18A, FIG. 18B and FIG. 19. The reference marks used in FIG. 18A, FIG. 18B and FIG. 19 in connection with the image block data are as follows:

i: image block number

LBi: data length (number of bits) of the i-th image block data 115

Xi: data length (number of bits) of the HP data extracted from the i-th image block j: number of the encoded code forming an image block Lj: length (number of bits) of the j-th encoded code Cj: number of orthogonal transform coefficients obtained by decoding the j-th encoded code $L_{EOB}$: length (number of bits) of the EOB code TM: control target of data amount (number of bits) for recording in the sync block D: permissible maximum value (number of bits) of vacant capacity d: vacant capacity (number of bits)

S: sum of the numbers Cj of the j-th orthogonal transform coefficient

CL: contact not smaller than 2

CH: constant larger than CL

Referring to FIG. 19, when the fast replay data is newly extracted, the control data is initialized so that the number i of the image block is set to 1, and the vacant capacity is set to TM (step a1—hereinafter simply referred to as a1), and the data 115 of the i-th image block is read (a2). The length of the entire image block data 115 is LBi bits, and the length of the encoded code j which is a constituent thereof is Lj bits, and an EOB code of a length of $L_{EOB}$ is present at the end of the encoded code.

In the image block data 115, the encoded codes for the low-frequency coefficients appear first. The value j is initialized to "1" (a3) and then the encoded codes are decoded by the variable-length decoder 104 (a4) to obtain Cj orthogonal transform coefficients (a5). The number Cj of the orthogonal transform coefficients varies within the encoded code j. The values Cj obtained by counting by the coefficient counter 105 are accumulated, and the resultant sum S of the numbers Cj of the orthogonal transform coefficients, up to the j-th encoded code is determined (a6). The accumulated value S is compared with a predetermined value CL (a7). If S is greater than CL, it is then compared with another constant CH greater than CL (a8).

When the accumulated value S is smaller than CL, judgement is made whether the length of the code including the encoded codes having been decoded, with the EOB appended, is not longer than the vacant capacity d (a9). If it is not longer, j is incremented by one (a13), and the operation returns to the step a4. When the accumulated value S is not smaller than CL and not larger than CH, judgement is made whether the length of the code including the encoded codes having been decoded, with the EOB appended, is not longer than the vacant capacity d (a10). If it is not longer, the VLC codes (variable length codes) up to the j-th code are extracted (a11). If the accumulated value S is judged to be larger than CH at the step a8, and or if the code length is judged to exceed the vacant capacity d, the VLC codes up to the (j−1)-th code are extracted (a12).

An EOB code is appended at the EOB appending circuit 107, to the codes 117 that have thus been extracted (a14), and the sum Xi of the length of the j or (j−1) data having been extracted and the EOB code is determined (a15).

The sum (ΣXi) of the length Xi of the data having been extracted is subtracted from the data amount target TM to find the vacant capacity d (a16), and judgement is made whether d is not larger than a permissible value D (a17). If the vacant capacity d is larger than the permissible value D, i is incremented by one (a19), and the operation returns to the step a2, and the next image block is read. If d is not larger than the permissible value D at the step a17, the data up to the image block i is output as the fast replay data to the buffer 108 (a18).

Figure 20:
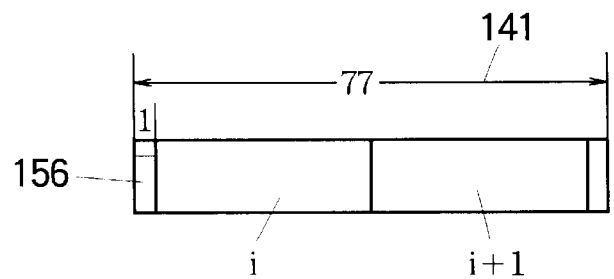
FIG. 20 is a diagram showing a recording pattern of the high-speed replay data.

FIG. 20 shows the recording pattern of the fast replay data. In the drawing, reference numeral 141 denotes the data region of 77 byte long, 156 denotes a header of one byte appended at the header appending circuit 111, and i and (i+1) denote data of the image blocks for high speed replay read from the buffer 108. Recorded in the header 156 is identification information for intra-frame and the image blocks obtained by extracting the fast replay data. The data of each image is recorded, without being divided into a plurality of sync blocks. The constant TM is dependent on the length of which can be data recorded in the sync block, and CL and CM define the upper and lower limits for the number of the transform coefficients of the image used for the fast replay. By the above procedure, the encoded data corresponding to the orthogonal transform coefficients of the length which is not smaller than CL and not larger than CM is extracted from the bit stream, and used as the fast replay data. The fast replay data is recorded in the data regions of one sync block on the magnetic tape, without the data of the image block being divided, with the vacant capacity being not larger than D.

In the transparent recording, two packets of 188 byte long in the bit stream are recorded in five sync block on the tape. Each packet is read by the buffer 108, and then read by the address control circuit 109, and divided into three, by selection of a bit, and according to the predetermined bit position. The data of two packets, having been divided, is input to the track format circuit 110, and a header generated by the header appending circuit 111 is appended, and the recording data of five consecutive sync blocks is reconstructed.

Figure 21:
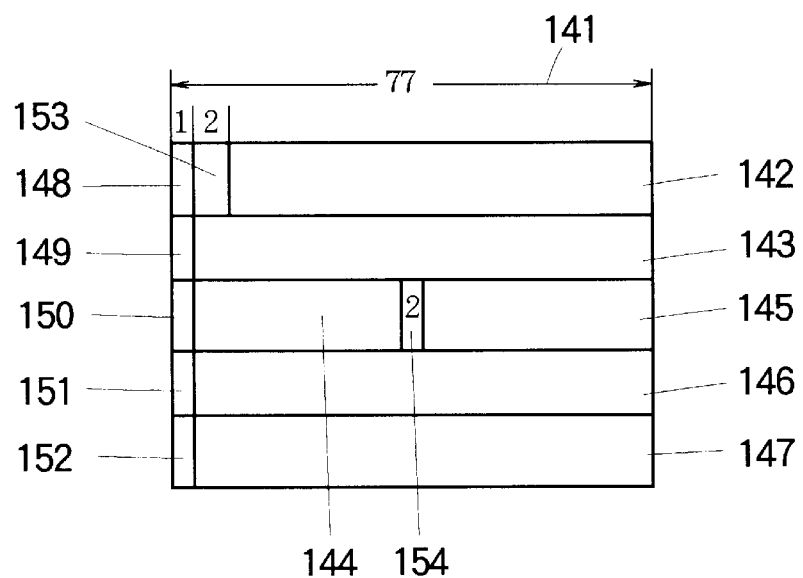
FIG. 21 is a diagram showing a packet recording pattern.

FIG. 21 shows a recording pattern of the packet. It illustrates, in two-dimensional representation, the data of five sync blocks consecutive on the tape region in which transparent recording is made. In the drawing, reference numeral 141 denotes a data region of 77 bytes in one sync block, and the five rows respectively represent data of five sync blocks. Reference numerals 142 to 144 denote data of the first packet read from the buffer 108. Reference numerals 145 to 147 denote data of the second packet read from the buffer 108. Reference numerals 148 to 152 denote first headers, each one byte long, appended at the header appending circuit 111. Reference numerals 153 and 154 denote second headers, each two bytes long, appended at the header appending circuit 111.

Regions 142 to 144 are respectively 74 bytes, 76 bytes and 38 bytes long, and the first packet is expressed by 188 bytes in total. Regions 145 to 147 are respectively 36 bytes, 76 bytes and 76 bytes long, and the second packet is expressed by 188 bytes in total.

The regions 148 to 152 are headers, and contain a flag indicating whether the corresponding sync block is a region for transparent recording or a recording region for fast replay data, a flag for identifying which of the five consecutive sync blocks, and a code for indicating the partition for of the first encoded data of the succeeding packet data.

The regions 153 and 154 contain codes for indicating the type of the data of the packet, e.g., video data, audio data, character data and program data.

Figure 22:
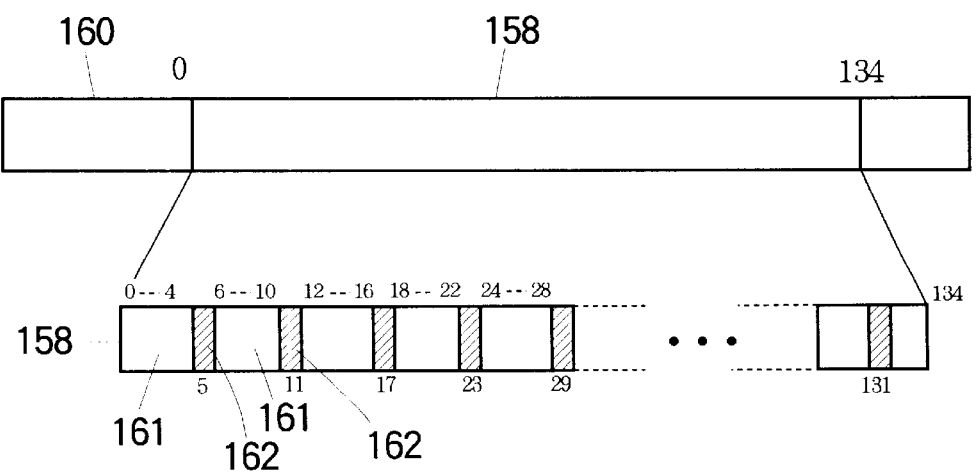
FIG. 22 is a diagram showing a recording track on a magnetic tape.

FIG. 22 shows the recording track on the magnetic tape. In the drawing, reference numeral 160 denotes a track, 158 denotes a video recording region, 161 denotes a transparent recording region, and 162 denotes fast replay data recording region. The numerical values along the track represent the sync block numbers for the video regions. The region 161 consists of five sync blocks consecutive to each other, and records the bit stream data shown in FIG. 21. The region 162 is one sync block adjacent to the region 162, and records the fast replay data in the format shown in FIG. 20. The regions 161 and 162 are disposed alternately in the video recording region 158.

Figure 23:
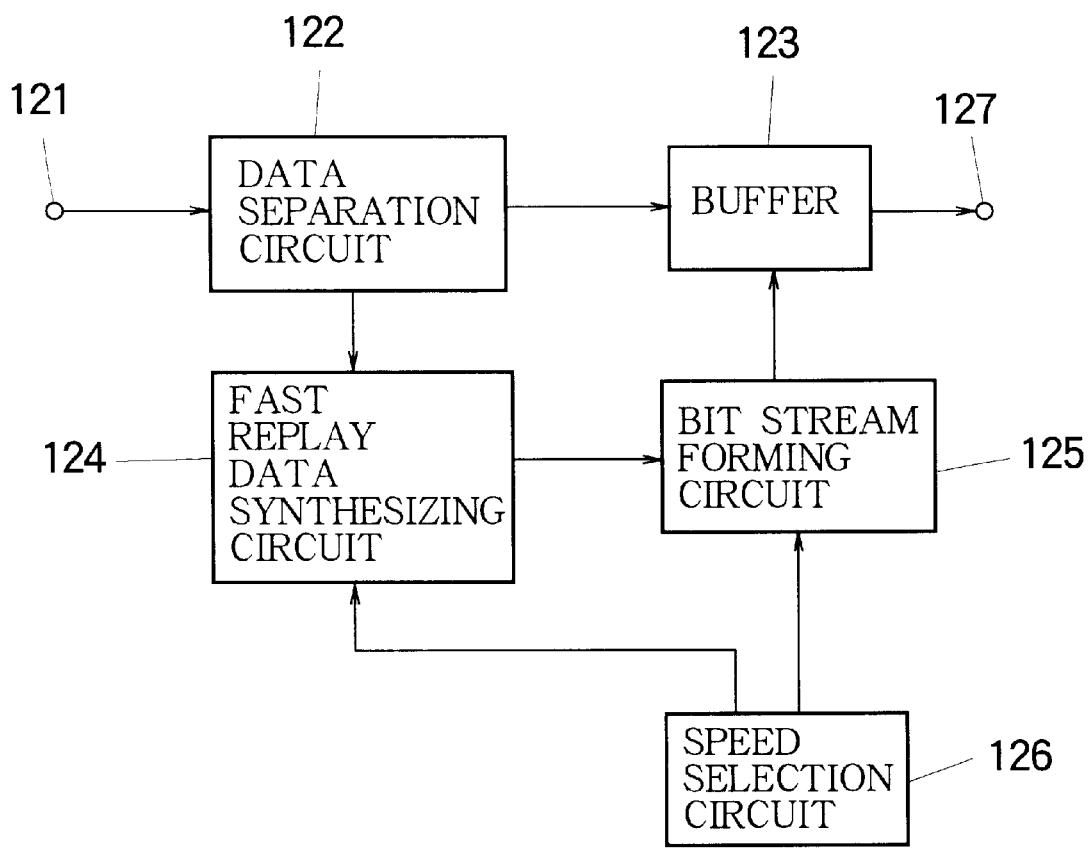
FIG. 23 is a block diagram showing a replay system of a digital VTR of Embodiment 5.

FIG. 23 is a block diagram showing a replay system of a digital VTR of Embodiment 5. In the drawing, reference numeral 121 denotes a replay signal input terminal, 122 is a data separation circuit for separating the transparent recording data and fast replay data from each other, 123 denotes a buffer for forming a bit stream, 124 denotes a synthesizing circuit for fast replay data, 125 denotes a bit stream forming circuit for fast replay data, 126 denotes a fast replay speed selecting circuit, and 127 is an output terminal for the bit stream.

The signal replayed from the magnetic tape is input via the input terminal 121 to the data separation circuit 122, and is separated into the transparent recording data and the fast replay data. The transparent recording data is read at a predetermined rate, in a sequence by the buffer 123, and the data of a plurality of packets which were recorded, being divided, are read in sequence at a predetermined rate, so that a bit stream identical to those is output via the output terminal 127.

When fast replay is to be conducted, the speed selection circuit 126 controls the entire system so that the tape transparent speed is at an even-multiple speed, and the fast replay data synthesizing circuit 124 collects the fast replay data without duplication, on the basis of the signals replayed by the head. When the fast replay data is replayed, the data of the intra frame is constructed and output to the bit stream forming circuit 125. The bit stream forming circuit 125 repeats the intra-frame data for a predetermined number of times, on the basis of the speed data from the speed selection circuit 126, and adds a packet header to it, to form bit stream data. The bit stream data that has been formed is output to the buffer 123, and is output from the buffer 123 at a predetermined rate.

Factors affecting the scanning pattern of the head at the time of the fast replay include the number and disposition of the heads on the drum, the width of each head, the angle over which the tape is wrapped around the drum, and the tape transport speed. Head scanning patterns on the assumption that two head of different azimuths are disposed on the drum 180° apart, and the angle over which the tape is wrapped around the drum is 180° will next be shown.

Figure 24:
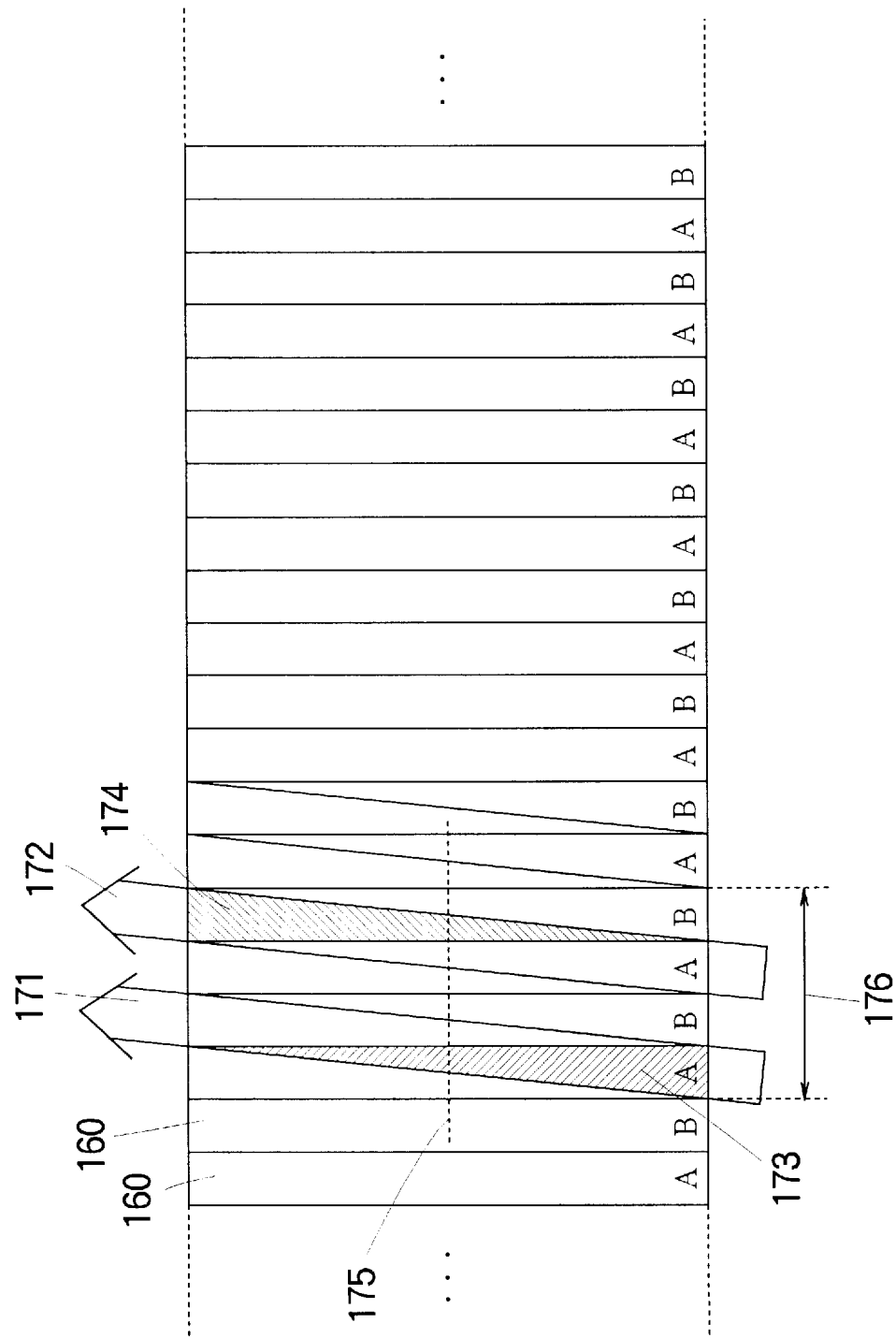
FIG. 24 is a diagram showing a track format and a head scanning pattern that result when double speed replay is conducted from a recorded tape.

FIG. 24 shows the track format and head scanning pattern when the tape is double-speed replayed. In the drawing, the character ("A" or "B") written in each track 160 indicates whether the head used for recording the track is head A or head B. Reference numeral 171 denotes the scanning regions by a first head A, and reference numeral 172 denotes the scanning region by a second head B. Reference numeral 173 denotes tape region where data can be replayed by the first head A, and reference numeral 174 denotes tape region where data can be replayed by the second head B. The width of the head is assumed to be identical to the width of the track, and the tracks which are actually inclined are shown to be perpendicular to the longitudinal direction of the tape, for the sake of simplicity of illustration.

The data recorded in the regions 173 and 174 can be picked up, but as the overlapping between the track and the head becomes small, the signal level become insufficient, so that the data cannot be reproduced. Usually, when the head and track overlaps more than half the track width, then the data can be replayed. Accordingly, data can be replayed from the part of the region 173 below the line 175 and the part of the region 174 above the line 175.

In the double-speed replay, if fast replay data is repeatedly recorded over four consecutive tracks as indicated by 176, all the data can be replayed if scanned twice by the heads A and B. However, identical data need to be recorded in identical sync blocks of the four tracks.

The number of times the fast replay data is repeatedly recorded can be determined from the specification for the fast replay speeds of the device, and is set to be twice the multiplier of the maximum fast replay speed.

Figure 25:
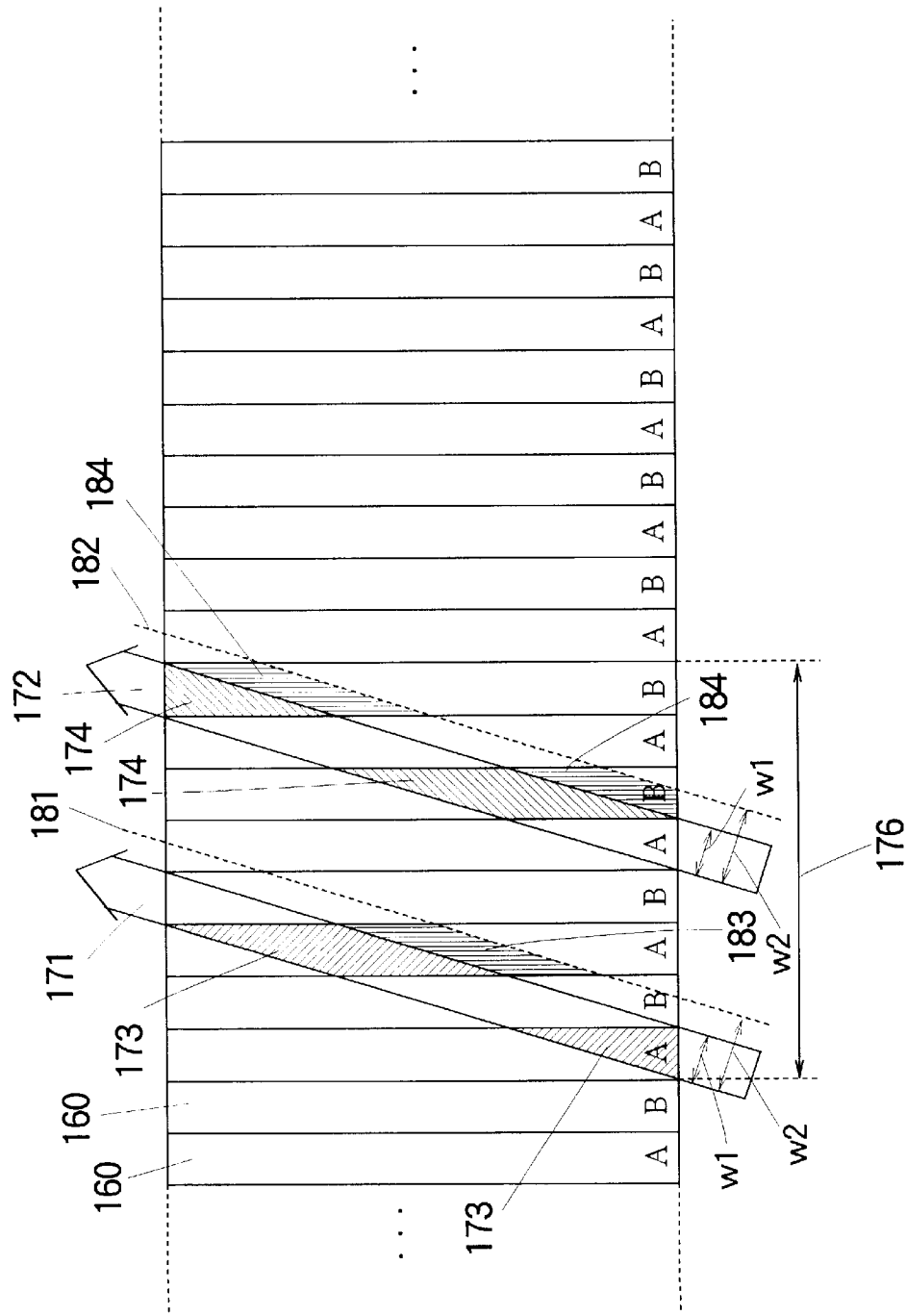
FIG. 25 is a diagram showing a track and a head scanning pattern that result when four-time sped replay is conducted from a recorded tape.

FIG. 25 shows the track pattern and the head scanning pattern when the recorded tape is four-time speed replayed. In the drawing, the reference numerals identical to those in FIG. 24 denote identical elements. Lines 181 and 183 show the head scanning regions if the head width is 1.5 times the track width. As described above, for four-time speed replay, fast replay data must be repeatedly recorded at least (4×2) or 8 times, to enable replay of all the data. However, in actual fast replay, the tape is transported at a high speed, so that the contact between the head and the tape is unstable, and the level of the replay signal may fluctuate. Moreover, as the tape transport speed varies a little, the head scanning pattern may shifts from that illustrated. The regions 173 and 174 may not cover all the data. In such a case, by using a head of a width W2 (=W1×1.5, W1 representing the width the track), data in the regions 183 and 184 can also replayed, and all the fast replay data can be replayed. This is next explained further.

Figure 26A:
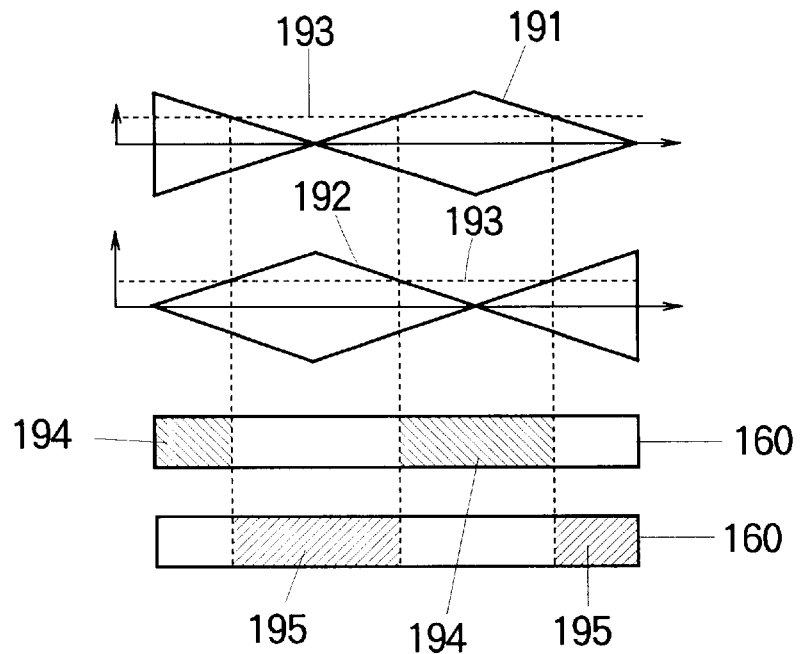
FIG. 26A and FIG. 26B are diagrams showing the signal level obtained when replayed by two different heads of different widths, and the track regions where data is reproduced, in the track pattern of FIG. 25.

FIG. 26A shows the signal level when the head of a width W1 is used for replay from a track pattern shown in FIG. 25, and the track regions from which data replay is possible. In the drawing, the horizontal axis represents the position in the longitudinal direction of the track, and the vertical axis represents the replay signal level. 191 represents the replay signal level by the head A, 192 represents the replay signal level by the head B, 193 represents the half peak value, 194 denotes the recording region from which the fast replay data repeatedly recorded can be replayed by the head A, and 195 denotes the recording regions from which the data can be replayed by the head B.

By adding the regions 194 and 195, all the fast replay data recorded along the entire length of the tracks can be replayed. However, when the replay signal level varies, the data in the peripheries of the regions 194 and 195 may not be replayed, and when the tape transport speed fluctuates, the regions 194 and 196 may shift left or right, for example. In these cases, all the fast replay data cannot be replayed from the addition of the regions 194 and 195.

Figure 26B:
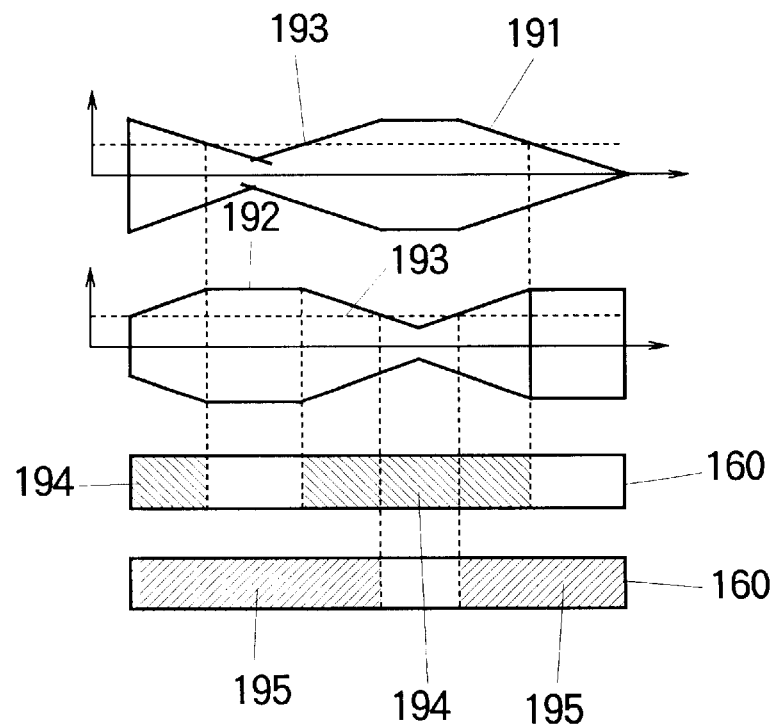

FIG. 26B shows the signal level when the head of a width W2 is used for replay from the track pattern shown in FIG. 25, and the track regions from which data replay is possible.

When compared with FIG. 26A, the signal levels 191 and 192 are increased by the amount corresponding to the regions 183 and 184. As a result, the fast replay data of all the track are replayed sufficiently from the addition of the region 194 and 195 from which replay is possible.

In Embodiment 5, description is made for the case where the track format is as shown in FIG. 22. However, the fast replay data may be concentrated in a specific part of a track, for instance in the central part of the track. In this case, the parts of the track near the tape edges where the signal level fluctuation is larger are not used, so that the fast replay data can be replayed stably.

The fast replay data may be concentrated at the beginning ends. In this case, it is possible to reduce the angle over which the tape is wrapped around the drum, to thereby reduce the load on the tape transport system. In this way, the tape transport can be thereby stabilized, and the speed for the fast replay can be increased.

In Embodiment 5, the fast replay data is repeatedly recorded for a number twice the multiplier of the maximum fast replay speed. By adding a head C for use in fast replay only, having the same azimuth as the head B, and being disposed near the head A, the fast replay data recorded by the head B can be replayed simultaneously with the scanning by the head A. In this case, the speed of the fast replay can be increased to double the multiplier of the above-mentioned maximum fast replay speed.

In Embodiment 5, the fast replay speed is recorded each sync block by sync block, but may alternatively be recorded, taking every two sync blocks as a unit. In this case, the constant TM is set to 76 bytes×2×8=1216 bits.

Embodiment 6

Figure 27:
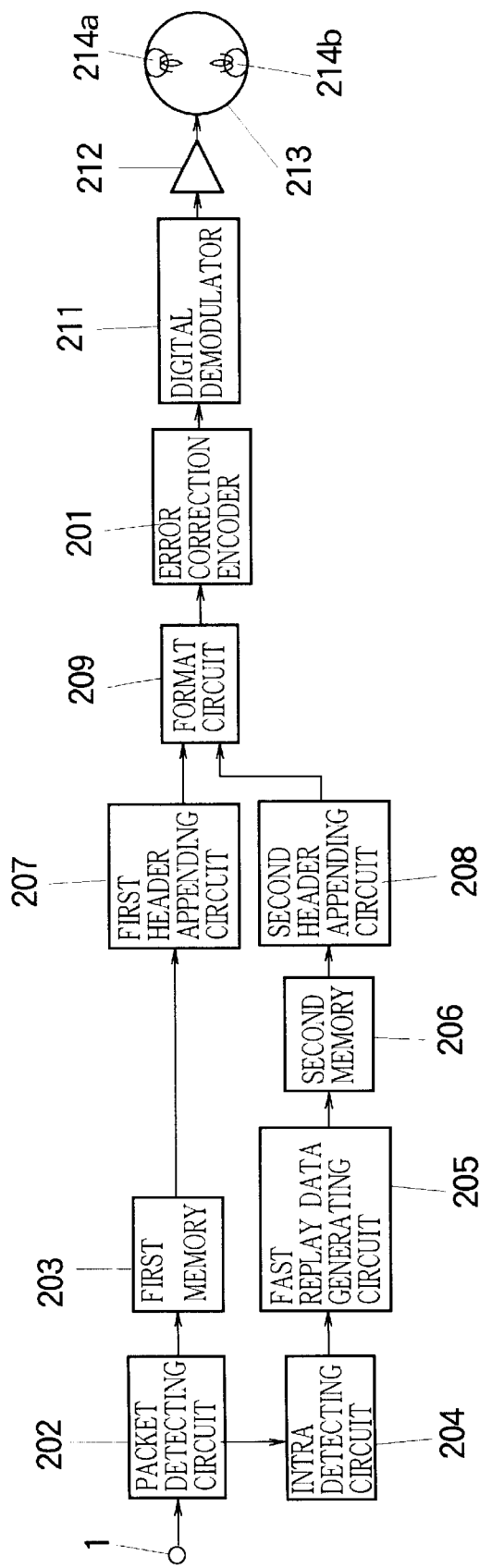
FIG. 27 is block diagram showing a recording system of a digital VTR of Embodiment 6 of the invention.

FIG. 27 is a block diagram showing a recording system of a digital VTR of Embodiment 6 of the invention. In the drawings, reference numeral 1 denotes an input terminal for receiving the digital video signal in the form of a bit stream, 202 denotes a packet detecting circuit for detecting packets of the video signal from the bit stream having been supplied, 203 denotes a first memory for storing the data from the packet detecting circuit 202, packet by packet, 204 denotes an intra detecting circuit for detecting whether the transport packet contains an intra-picture data, 205 denotes a fast replay data generating circuit receiving the transport packet containing intra-picture data and forming fast replay data, and 206 denotes a second memory for storing the fast replay data formed by the fast replay data generating circuit 205. Reference numeral 207 denotes a first first header appending circuit for appending a header to the data read from the first memory 203. Reference numeral 208 denotes a second header appending circuit for appending a header to the data read from the second memory 206. Reference numeral 209 denotes a format circuit for forming video areas from the input data, 210 denotes a error correction encoder for performing error correction encoding, 211 denotes digital modulator for conversion into data suitable for recording on the tape, 212 denotes a recording amplifier, 213 denotes a rotary drum, and 214a and 214b denote magnetic heads.

Figure 28:
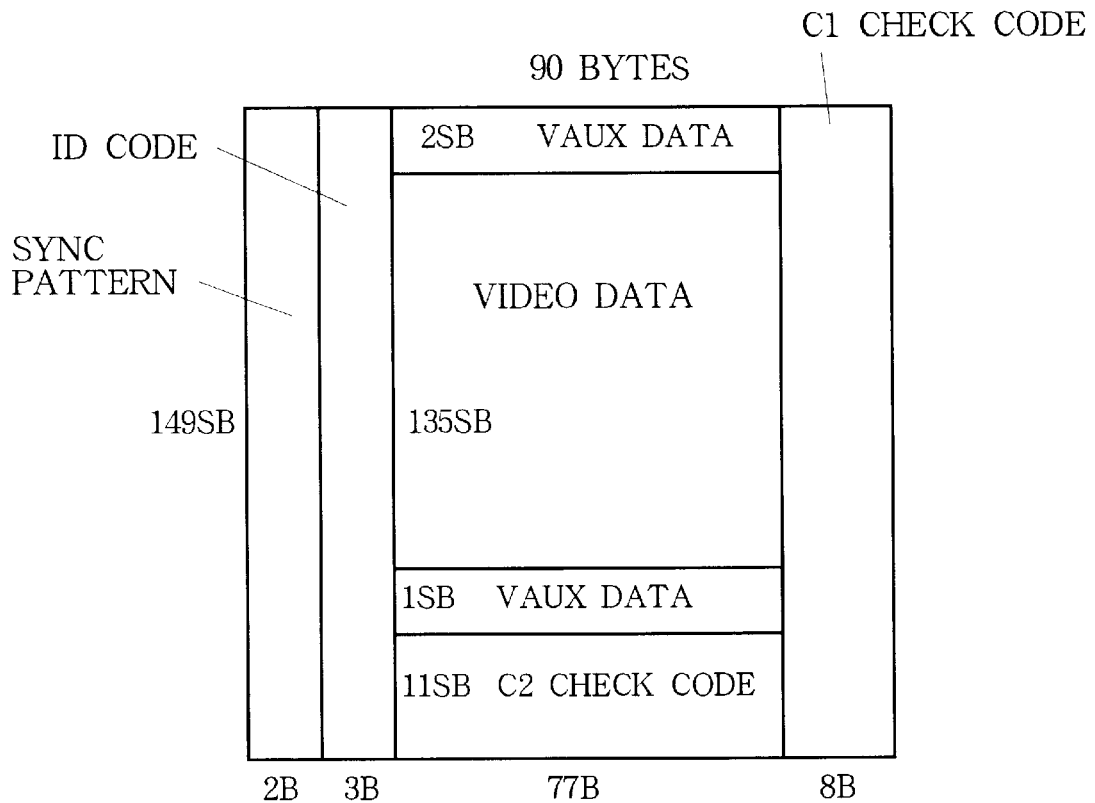
FIG. 28 is a diagram showing the data track format in the video area of a digital VTR.

FIG. 28 shows data format of the video areas in the digital VTR.

Figure 29:
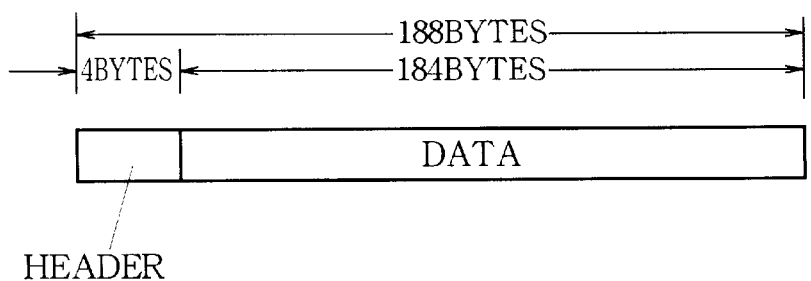
FIG. 29 is a diagram showing the configuration of a transport packet contained in the bit stream.
Figure 30:
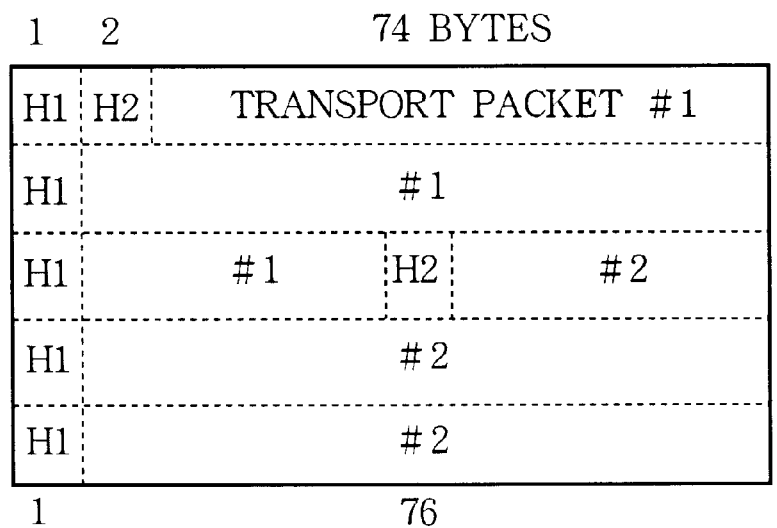
FIG. 30 is a diagram showing the configuration of data of the main areas recorded on the magnetic tape.
Figure 31:
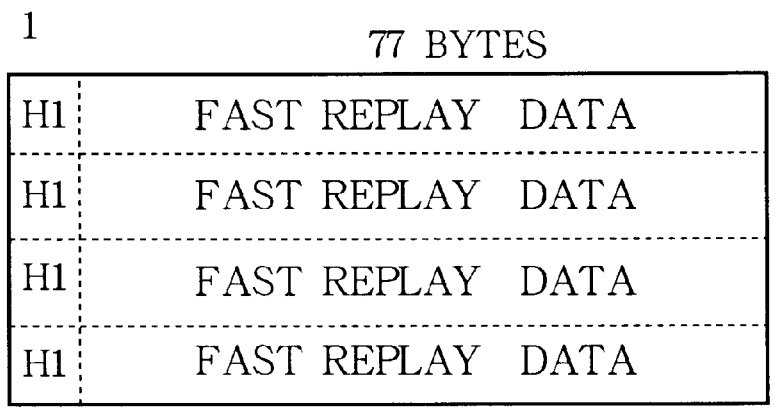
FIG. 31 is a diagram showing the data configuration of the copy areas.

FIG. 29 to FIG. 31 show data packets according to this embodiment. FIG. 29 shows the configuration of the transport data packet contained in the input bit stream. FIG. 30 shows the configuration of data of the main area recorded on the magnetic tape. FIG. 31 shows the configuration of data in the copy area.

The operation in the recording in the digital VTR of Embodiment 6 will next be described with reference to FIG.

27 to FIG. 31. The bit stream input via the input terminal 1 contains digital video and audio signals, and digital data signals concerning the video and audio signals, and they are transmitted, being partitioned into transport packets, as shown in FIG. 29. Each transport packet comprises a header of 4 bytes, and a data section of 184 bytes.

In the present digital VTR, low-frequency components are extracted from the transport packets containing intra-picture data to form fast replay data, or so-called HP data, and the transport packets are recorded in the main areas and the fast replay data is recorded in the copy areas. The input bit stream is supplied to the packet detecting circuit 202 where the transport packets are detected, and sent to the first memory 203 and the intra detecting circuit 204.

The first memory 203 stores the bit stream data packet by packet, and the data is read so that it forms recording data packet shown in FIG. 30. FIG. 30 shows the case where the length of data within one sync block is 77 bytes, and two transport packets are used to form five sync blocks. In the drawing, H1 denotes a first header, and H2 denotes a second header. H1 is positioned at the head of each sync block, and contains a flag indicating whether the sync block belongs to the main areas or to the copy areas. H2 is positioned at the head of each transport packet, and contains a flag indicating the transport packet succeeding the H2 header contains an intra-picture data.

The transport packet data read from the first memory 203 is input to the first header appending circuit 207, where H1 and H2 headers are appended, and made into a packet configuration shown in FIG. 30, and is then supplied to the format circuit 209.

The intra detecting circuit 204 finds whether the data in the transport packet contains data of intra-picture data. The fast replay data generating circuit 205 extracts low-frequency component from the packet containing the detected intra-picture data, to generate HP data, and supplies it to the second memory 206.

The second memory 206 stores HP data sent from the fast replay data generating circuit 205, and the data is read so that the recording data configuration is as shown in FIG. 31. In the drawing, H1 denotes a first header identical to that in FIG. 30. The fast replay data read from the second memory is supplied to the second header appending circuit 208, where H1 header is appended, and is formed into the configuration shown in FIG. 31, and sent to the format circuit 209.

The format circuit 209 combines the data from the main areas output from the header appending circuit 207, and the data from the copy areas output from the second header appending circuit 208 to form data of one track, and sends it to the error correction encoder 210, where error correction encoding is performed on input data of one track. The output of the error correction encoder 210 is digital-modulated at the digital modulator 211 into data format suitable for recording on the tape, and passed through the recording amplifier 212, and recorded on the magnetic tape by means of the rotary heads 214a and 214b.

The operation for normal replay will next be described.

Figure 32:
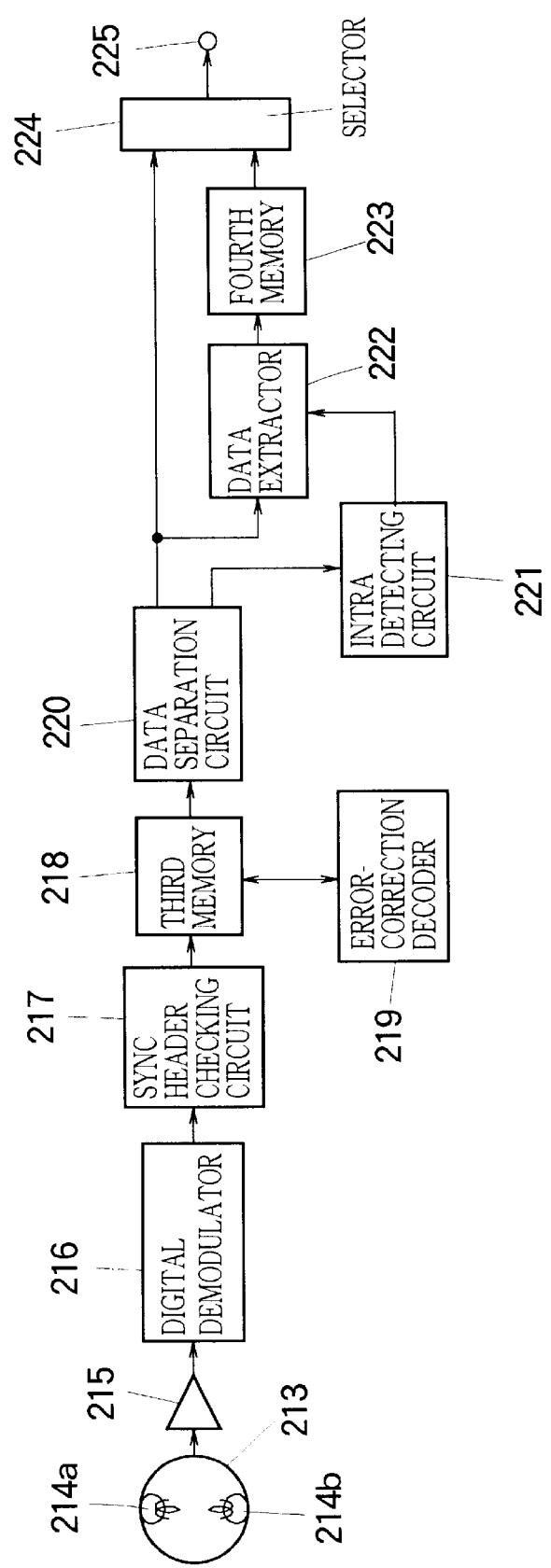
FIG. 32 is a block diagram showing a replay system of a digital VTR of Embodiment 6.

FIG. 32 is a block diagram showing a replay system of a digital VTR of Embodiment 6. In the drawing, reference numerals 213, 214a and 214b denote members identical to those in FIG. 27. Reference numeral 215 denotes a replay amplifier, 216 denotes a digital demodulator, 217 denotes a sync header detecting circuit, 218 denotes a third memory, 219 denotes an error correction decoder for correction replay errors, 220 denotes a data separation circuit for separating the data by checking H1 header in each sync block, and selectively outputting data according to the replay mode, 221 denotes an intra detection circuit for checking H2 header in the data output from the data separation circuit 220, and finding transport packets containing an intra-picture data, 222 denotes a data extractor for extracting transport packets containing an intra-picture data, and 223 denotes a fourth memory for extracting for storing the data extracted by the data extractor 222. Reference numeral 224 denotes a selector for selectively outputting the data according to the replay mode, and 225 denotes an output terminal for outputting the data selected by the selector 224.

In normal replay, the data replayed by the magnetic heads 214a and 214b from the magnetic tape is amplified by the replay amplifier 215, and is input to the digital demodulator 216. The digital demodulator 216 performs digital demodulation on the input data, and outputs the demodulated data to the sync header check circuit 217. The sync header check circuit 217 checks sync headers in the demodulated sync blocks, and stores the data in the third memory 218, according to the header information that has been read. Any replay errors in the data recorded in the third memory 218 are corrected, and the error-corrected data is output to the data separation circuit 220.

The data separation circuit 220 checks the H1 headers in the data read from the third memory 218, and separates it into normal replay transport packets, and fast replay data, and outputs the normal replay transport packets to the selector 224, and outputs the H2 headers having been appended to the head of the transport packet to the intra detection circuit 221. At this stage, the H1 and H2 headers are removed from the transport packets.

The intra detection circuit 221 reads the H2 header output from the data separation circuit 222, and checks whether the transport packet to which the H2 header has been appended contains an intra-picture data. If an intra-picture data is contained, the intra detection circuit 221 sends a control signal for causing the data extractor 222 to extracts the packet. In accordance with the control signal from the intra detection circuit 221, the data extractor 222 extracts the transport packet, and outputs it to the fourth memory 223. As a result, the transport packets extracted by the data extractor 222 are sequentially stored in the fourth memory 223.

The selector 224 selectively outputs the output of the data separation circuit 220, or the output of the fourth memory 223, to the output terminal 225. In normal replay, the output from the data separation circuit 220 is selected, and output via the output terminal 225.

Next, let us consider a situation case where a still replay mode is selected during normal replay. In normal replay, the data replayed by the magnetic heads 214a and 214b from the magnetic tape is amplified by the replay amplifier 215, and is then input to the digital demodulator 216. The digital demodulator 216 performs digital demodulation on the input data, and outputs the demodulated data to the sync header check circuit 217. The sync header check circuit 217 check the sync header in the demodulated sync block, and stores the data in the third memory 218 according to the header information that has been read. Any replay errors contained in the data recorded in the third memory 218 are corrected at the error correction decoder 219, and the error-corrected data is output to the data separation circuit 220.

The data separation circuit 220 checks the H1 headers in the data read from the third memory 218, and separates it into normal replay transport packets, and fast replay data, and outputs the normal replay transport packets to the selector 224, and outputs the H2 headers having been appended to the head of the transport packet to the intra detection circuit 221.

The intra detection circuit 221 reads the H2 header output from the data separation circuit 222, and checks whether the transport packet to which the H2 header has been appended contains an intra-picture data. If an intra-picture data is contained, the intra detection circuit 221 sends a control signal for causing the the data extractor 222 to extracts the packet. In accordance with the control signal from the intra detection circuit 221, the data extractor 222 extracts the transport packet, and outputs it to the fourth memory 223. As a result, the transport packets extracted by the data extractor 222 are sequentially stored in the fourth memory 223.

The selector 224 selectively outputs the output of the data separation circuit 220, or the output of the fourth memory 223, to the output terminal 225. In normal replay, the output from the data separation circuit 220 is selected, and output via the output terminal 225.

When still replay is selected during normal replay, the output of the transport packets for normal replay is stopped, and the output of the data from the selector to the output terminal 225 is terminated. The input to the selector 224 is switched, and the output of the fourth memory 223 is selected, so that still picture can be output via the output terminal 225.

Slow replay will next be described. During slow replay, the magnetic tape transport speed is lower than in normal replay, and the magnetic tape is transported while the same helical track is scanned and replayed a plurality of times. In particular, when the tape speed is ½ multiple-speed or less, the same track is replayed at least twice, so that it is possible to replay all the data of one track through the checking of the sync header at the sync header check circuit 217, and the error correction at the error correction decoder 219. The replayed data is recorded in the third memory 218.

The data separation circuit 220 checks the H1 headers in the data read from the third memory 218, and separates it into normal replay transport packets, and fast replay data, and outputs the normal replay transport packets to the selector 224, and outputs the H2 headers having been appended to the head of the transport packet to the intra detection circuit 221.

The intra detection circuit 221 reads the H2 header output from the data separation circuit 222, and checks whether the transport packet to which the H2 header has been appended contains an intra-picture data. If an intra-picture data is contained, the intra detection circuit 221 sends a control signal for causing the the data extractor 222 to extracts the packet. In accordance with the control signal from the intra detection circuit 221, the data extractor 222 extracts the transport packet for normal replay, and outputs it to the fourth memory 223. As a result, the transport packets extracted by the data extractor 222 are sequentially stored in the fourth memory 223. The selector 224 selectively outputs the output of the data separation circuit 220, or the output of the fourth memory 223, to the output terminal 225. In slow replay, the output from the data separation circuit 220 is selected, and output via the output terminal 225.

The operation in fast replay will next be described. In fast replay, the data replayed by the magnetic heads 214a and 214b from the magnetic tape is amplified by the replay amplifier 215, and is then input to the digital demodulator 216. The digital demodulator 216 performs digital demodulation on the input data, and outputs the demodulated data to the sync header check circuit 217. The sync header check circuit 217 checks the sync header in the demodulated sync block, and stores the data in the third memory 218 according to the header information that has been read. Any replay errors contained in the data recorded in the third memory 218 are corrected at the error correction decoder 219. and the error-corrected data is output to the data separation circuit 220.

The data separation circuit 220 checks the H1 headers in the data read from the third memory 218, and separates it into normal replay transport packets, and fast replay data, and outputs only the fast replay data to the selector 224.

The selector 224 selectively outputs the output of the data separation circuit 220, or the output of the fourth memory 223, to the output terminal 225. In fast replay, the output from the data separation circuit 220 is selected, and output via the output terminal 225.

Embodiment 7

Figure 33:
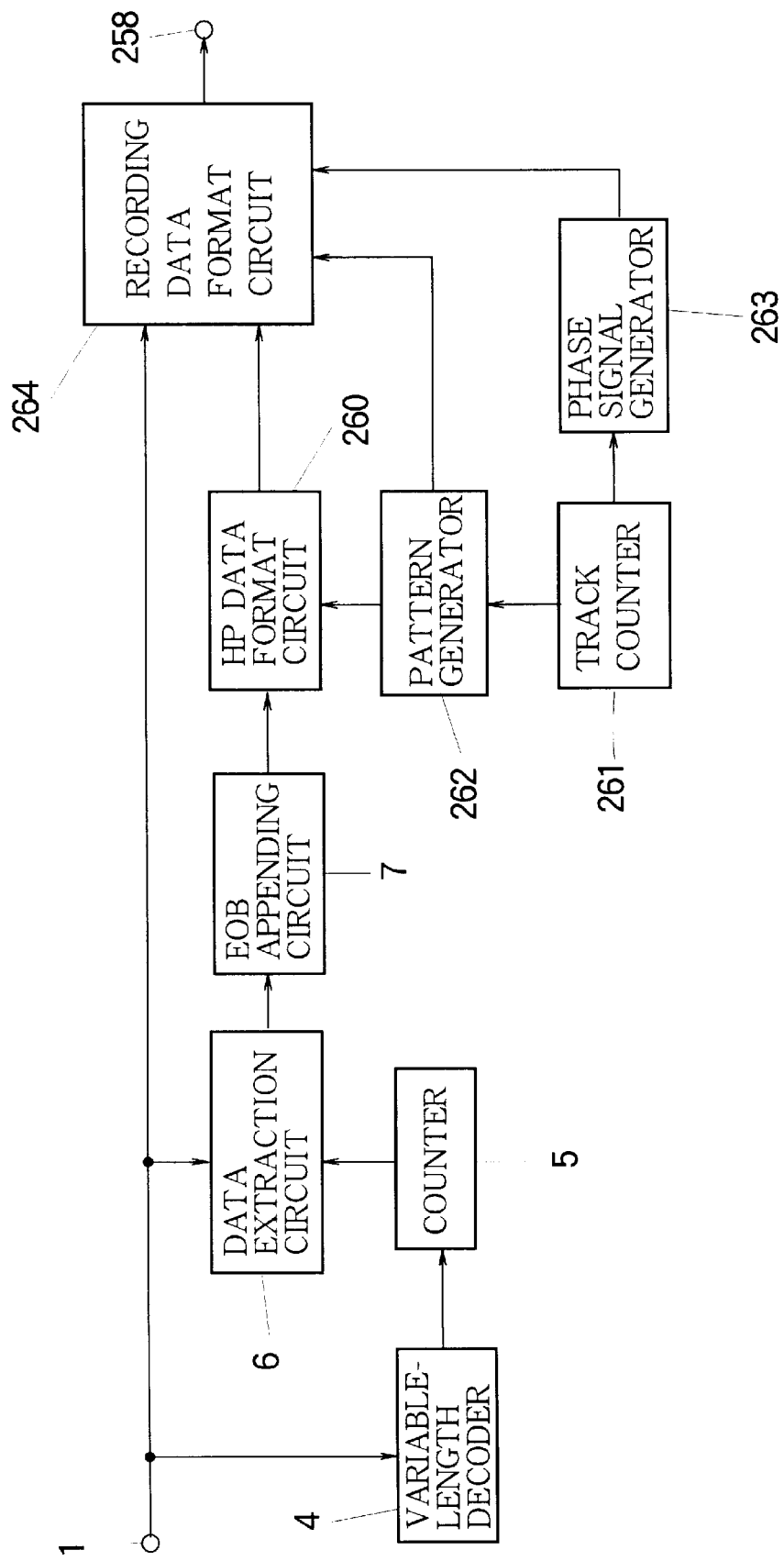
FIG. 33 is a block diagram showing a recording system of a digital VTR of Embodiment 7 of the invention.

FIG. 33 is a block diagram showing a recording system of a digital VTR of Embodiment 7 of the invention. In the drawing, reference numeral 1 denotes an input terminal for receiving an input bit stream, 4 denotes a variable-length decoder for analyzing the header in the input bit stream, and detecting the intra-encoded block to perform variable-length decoding, 5 denotes a counter for counting the number of blocks forming the variable-length decoded intra-picture data, 6 denotes a data extraction circuit for extracting HP data for fast replay, from the input bit stream, in accordance with instructions from the counter, 7 denotes an EOB appending circuit for appending EOB codes to the HP data having been extracted, and 258 denotes and HP data output terminal. Reference numeral 260 denotes an HP data format circuit for formatting the HP data according to a designated pattern, 261 denotes a track counter for counting the track numbers, and 262 denotes a pattern generating circuit for determining the position at which the HP data is to be recorded, for each track, on the basis of the count value at the track counter 261. Reference numeral 263 denotes a phase signal generating circuit for generating a phase signal having a value identical throughout each track group, according to the input from the track counter 261. Reference numeral 264 denotes a recording data format circuit 264.

Figure 43:
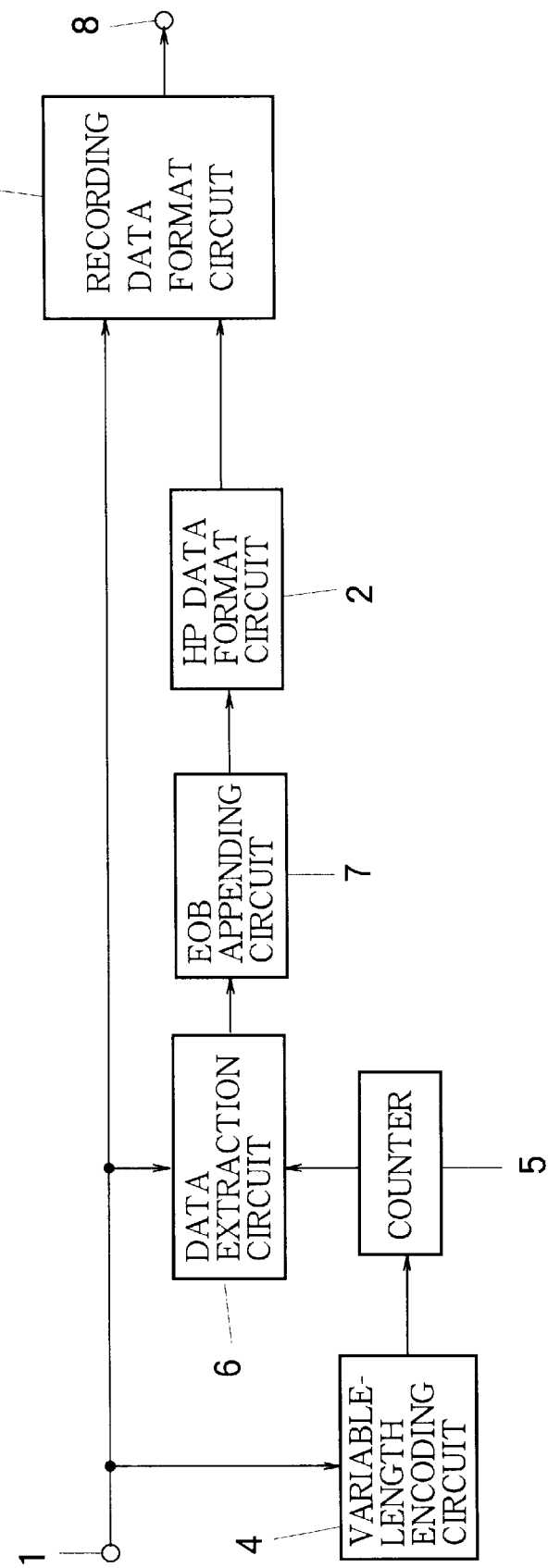
FIG. 43 is a block diagram showing an example of recording system of a conventional digital VTR capable of fast replay.

The operation will next be described. The operation from the input terminal 1 to the EOB appending circuit 7 is identical to that of the prior art example of FIG. 43. The HP data output from the EOB appending circuit 7 is input to the HP data format circuit 260, where the input HP data is stored in a memory within the HP data format circuit 260. The track counter 261 keeps counting the number of tracks until the recording of HP data in a designated track group is completed. Each time recording of different HP data in the tracks is started, the count value is reset. The count value generated from the track counter 261 is supplied to the pattern generating circuit 262 and the phase signal generator 263. The pattern signal from the pattern signal generator 262 is supplied to the HP data format circuit 260 and the recording data format circuit 264, and the phase signal from the phase signal generating circuit 263 is supplied to the recording data format circuit 264.

Figure 34:
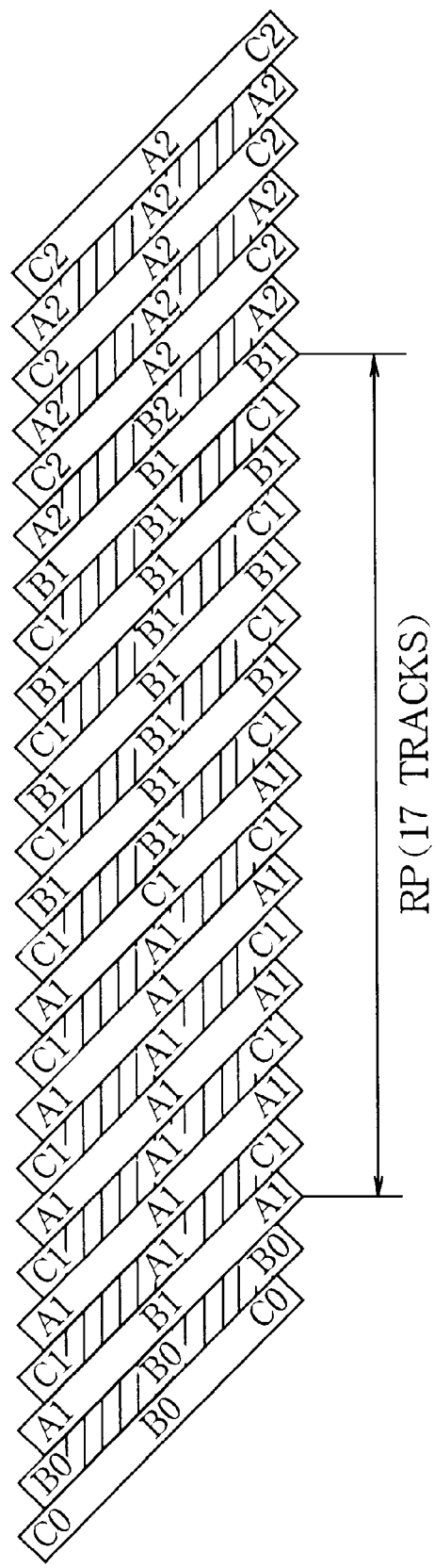
FIG. 34 is a diagram showing the recording pattern of HP data recorded on the tracks.

FIG. 34 shows the recording pattern of the HP data recorded in the tracks. It is assumed that "17" is the multiplier of the maximum fast replay speed, as in the prior art example. As in the prior art example, two heads are disposed opposite to each other, 180° apart from each other, and the tape is wrapped around the drum over 180°.

Figure 44:
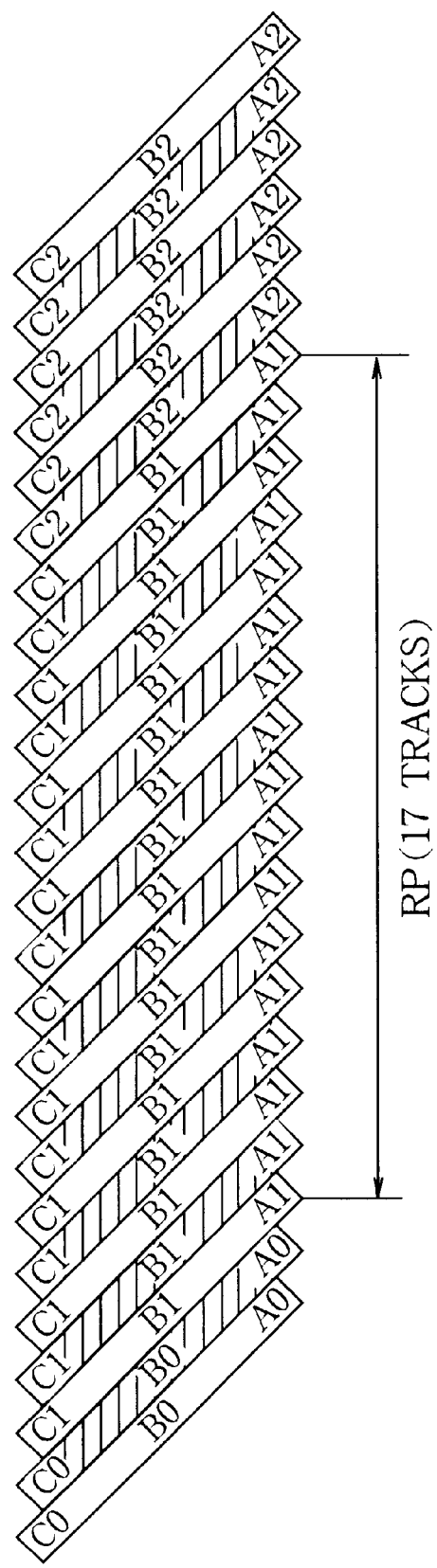
FIG. 44 is a diagram showing an example of data format of data recorded on the tracks in the prior art.
Figure 45A:
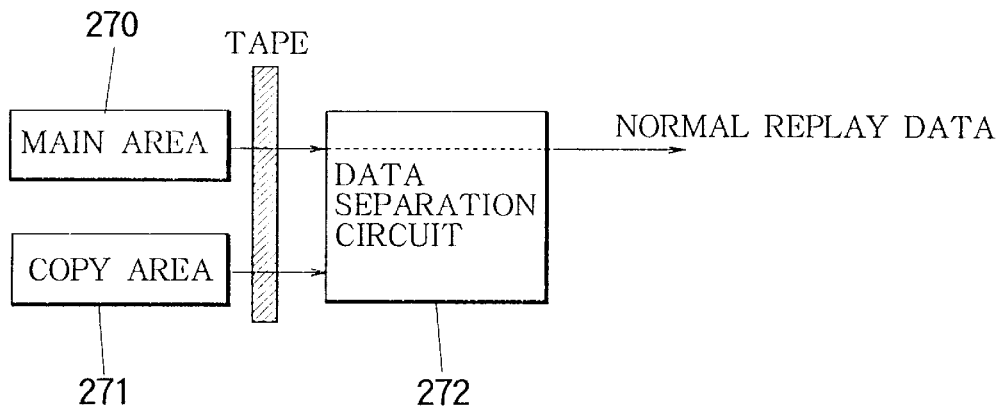
FIG. 45A is a schematic diagram showing normal replay in an example of a replay system of a conventional digital VTR.
Figure 45B:
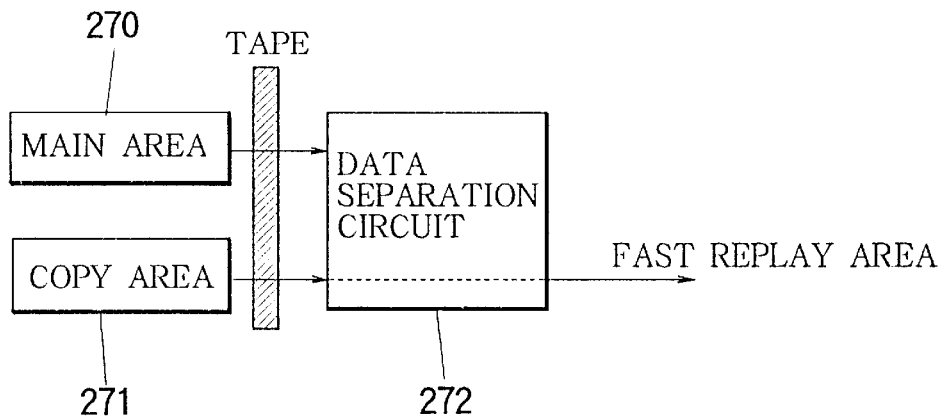
FIG. 45B is a schematic diagram showing fast replay in the example of a replay system of the conventional digital VTR.
Figure 46A:
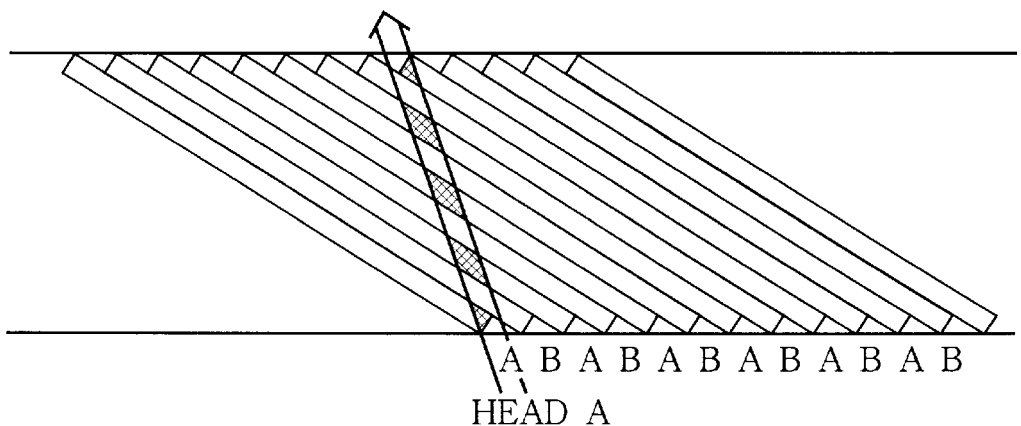
FIG. 46A is a diagram showing a scanning trace in a fast replay.
Figure 46B:
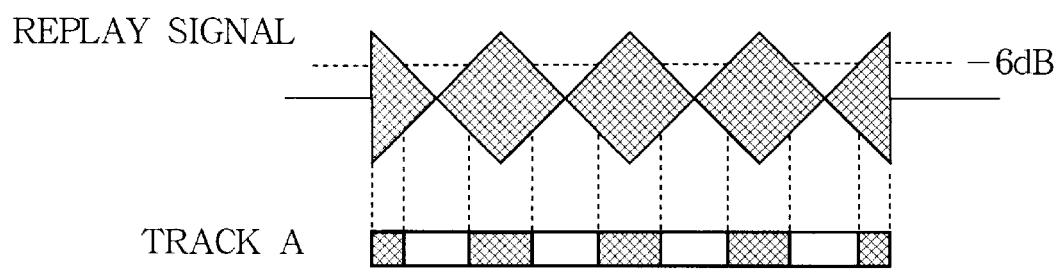
FIG. 46B is a diagram showing track regions where fast replay is possible.
Figure 47:
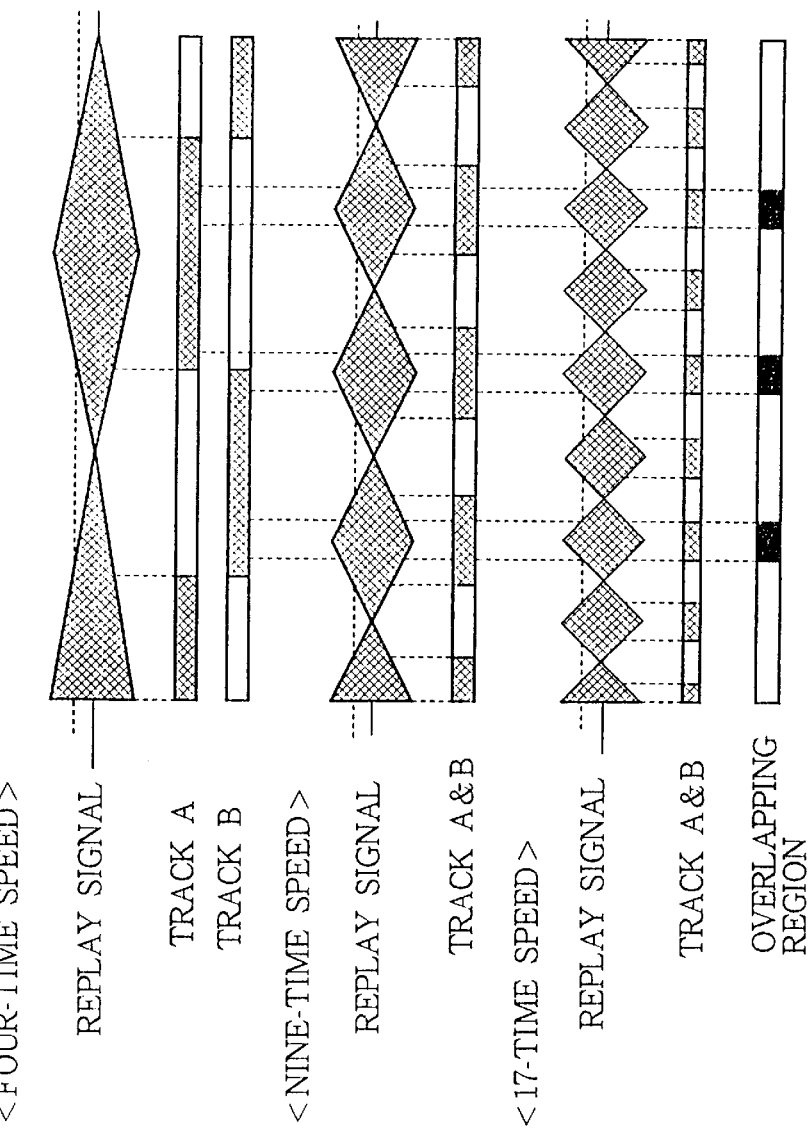
FIG. 47 is a diagram showing regions of the copy areas between different fast replay speeds.

"A", "B" and "C" indicate, by the same alphabetic character, identical HP data is recorded over 17 tracks. The numerals succeeding the alphabetic characters denotes different HP data are recorded in different track groups, each consisting of 17 tracks. The combinations of the alphabetic characters and numerals indicate, as in FIG. 44, that they are identical data.

More specifically, the recording patterns of the tracks forming one track group consisting of 17 tracks include a pattern TP1 in which HP data B is recorded in the copy area at the center of the track, and HP data A is recorded in the copy areas at both ends of the track, a pattern TP2 in which HP data A is recorded in the copy area at the center of the track, and HP data C is recorded in the copy areas at both ends of the track, a pattern TP3 in which HP data A is recorded in the copy areas at the center and both ends of the track, a pattern TP4 in which HP data C is recorded in the copy area at the center of the track, and HP data A is recorded in the copy areas at both ends of the track, a pattern TP5 in which HP data B is recorded in the copy area at the center of the track, and HP data C is recorded in the copy areas at both ends of the track, and a pattern TP6 in which HP data B is recorded in the copy areas at the center and both ends of the track, and in one track group, a first track of pattern TP4 is disposed in the center of the track group, a second track pattern TP1 is disposed at one end (at the head, in the illustrated example) of the track group, a third track of pattern TP6 is disposed at the opposite end (at the tail, in the illustrated example) of the track group, tracks of patterns TP2 and TP3 are alternately and repeatedly disposed between the first track and the second track, tracks of patterns TP5 and TP6 are alternately and repeatedly disposed between the first track and the third track.

The count value of the track counter 261 varies from "0" to "16" and this enables identification of each of the 17 tracks in each track group. The count value of the track counter 261 is reset every 17 tracks. The track counter 261 generates such a count value, and outputs it to the pattern generating circuit 262 and the phase signal generator 263.

FIG. 35 shows the pattern signal generated by the pattern generating circuit. The track counter 261 is reset at the head of 17 tracks, and its count value is incremented by one every track, and its count value is output to the pattern generating circuit 262. On the basis of the value input from the track counter 261, the pattern generating circuit 262 outputs a pattern signal, as a signal for specifying HP data to be recorded in the particular track. For instance, when a pattern shown in FIG. 34 is to be generated, at the first track in the group of tracks consisting of 17 tracks, the value of the track counter 261 is "0", and the pattern generating circuit 262 outputs a pattern ABA (FIG. 35) corresponding to the counter value "0". The pattern generating circuit 262 has a arrangement map for HP data for 17 tracks shown in FIG. 35, and specifies one of the pattern signals from the arrangement table, depending on the value of the track counter 261 input to the pattern generating circuit 262. According to the pattern signal generated by the pattern generating circuit 262, the HP data format circuit 260 outputs the HP data in the order of A, and B and again A. The pattern signal from the pattern generating circuit 262 is also sent to the recording format circuit 264.

The track counter 261 also outputs the counter value to the phase signal generator 263. The phase signal generator 263 generates a phase whose value varies every 17 tracks and maintained constant for the period of 17 tracks. The value of the phase signal varies every 17 track period, and within each track group formatted with an identical phase signal, the 17 track and next 17 tracks or immediately preceding 17 tracks can be discriminated. The phase signal is also input to the recording data format circuit 264. The phase signal generator 263 receives the input from the track counter 261, and varies its value. As long as it is possible to discriminate between the group of 17 tracks to which the particular track belongs, and the group of 17 tracks which are crossed during fast replay, any other signal may be used. If for instance, the multiplier of the fast replay speed is 17, two groups of 17 tracks are crossed, and it is sufficient if the two groups of the 17 tracks are discriminated from each other. The phase signal generator 263 may therefore generates a one-bit signal of "0" and "1", alternately.

Figure 36:
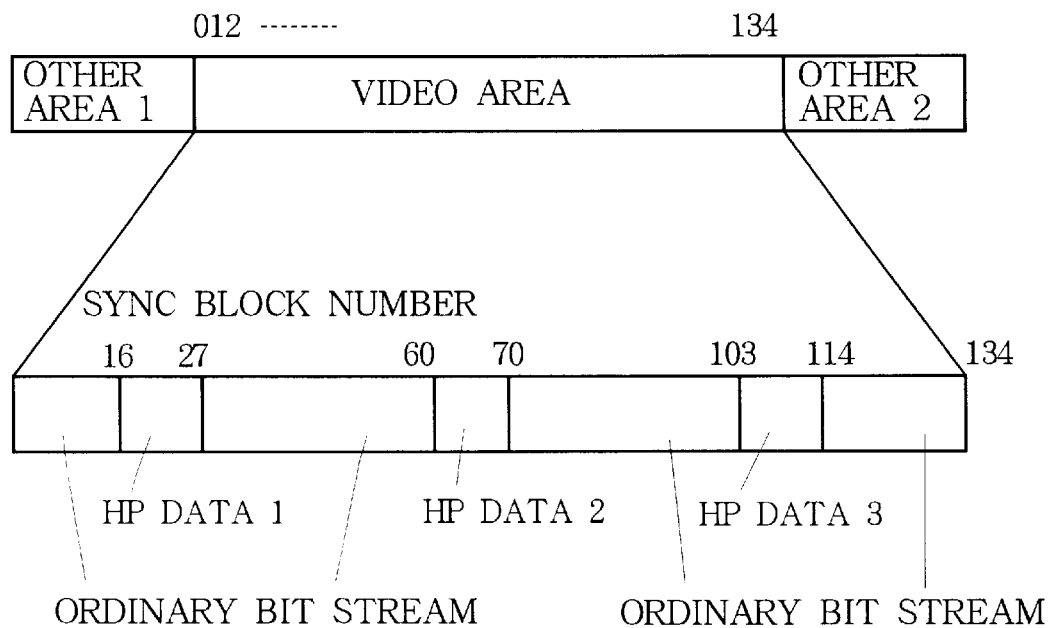
FIG. 36 is a diagram showing the data configuration of a sync block.
Figure 37:
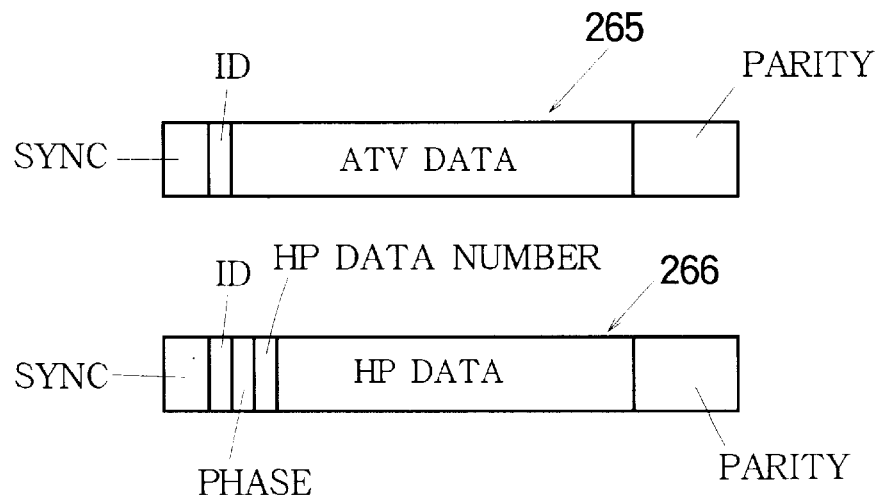
FIG. 37 is a diagram showing the data configuration of a sync block.

FIG. 36 shows the data configuration of the track. FIG. 37 shows the data configuration of the sync block. The recording data format circuit 264 forms data of a track as shown in FIG. 36. The sync block numbers allotted to the video area are from No. 0 to No. 134. At three locations in the video area, HP data areas are provided, and the HP data output from the HP data format circuit 260, together with the pattern signal from the pattern generating circuit 262 and the phase signal from the phase signal generator 263, are output via the output terminal 258. As shown in FIG. 37, the sync blocks are one of the two types, i.e., a first type of sync blocks 265 in the main areas, in which ATV bit stream, and parities are recorded, after SYNC and ID, and a second type of sync blocks 266 in the copy areas, in which, after SYNC and ID, the phase signal (PHASE) from the phase signal generator 263, the HP data number which can be identified by the signal from the pattern generating circuit 262, and then the HP data and parities are recorded. These sync blocks form part of the data of the track. In addition to these data, sync blocks in the AUX data area as defined for the VTR of the SD specification, form the data of the track. In this way, the data on the tape shown in FIG. 34 is formed. With the data thus formed, the fast replay can be conducted with any of a number of different multiple-speeds. For instance, +3-time fast replay cannot be achieved with the arrangement of data of the prior art example shown in FIG. 44. This is because, the HP data recorded in the center of the tracks on the tape that is scanned, and the HP data at both ends of the tracks are always of different azimuths.

If however, the HP data is arranged as in Embodiment 7, while the 17 tracks with an identical phase signal are scanned by the head, at least one set each of A, B and C HP data can be obtained. It is possible to detect whether the data is HP data or not, from the sync block number contained in the ID, and when the data is found to be HP data, then discrimination is made to find which of the A, B and C HP data, the detected HP data with an identical phase signal is, and while the head scans the 17 tracks, at least one set each of the A, B and C HP data can be obtained.

In Embodiment 7, one track groups consists of 17 tracks. But the invention is not limited to such configuration of the track group, and each track group may consists of tracks the number of which is given by:

$6 \times m+5$, or $4 \times n+5$, where m and n are integers not smaller than "1", and satisfying $3 \times m=2 \times n$. According, it is sufficient if I track groups (I being a positive integer) are formed of J tracks where $J=12 \times I+5$.

In Embodiment 7, it is assumed that all the intra-picture data contained in the input bit stream are used. Detection of the intra-picture data can be facilitated if only those intra-picture data which are contained in the intra-frame or intra-field the are used. This is because when variable-length decoding is effected the header of the input bit stream is detected, and the intra-picture data is recognized from the header. When the intra-picture data used as the HP data is limited to intra-frame or intra-field, it is not necessary to detect the intra information attendant to the macro block, and the picture header attendant to the head of one frame can be utilized to simplify the detection of intra-picture data.

Embodiment 8

Figure 38:
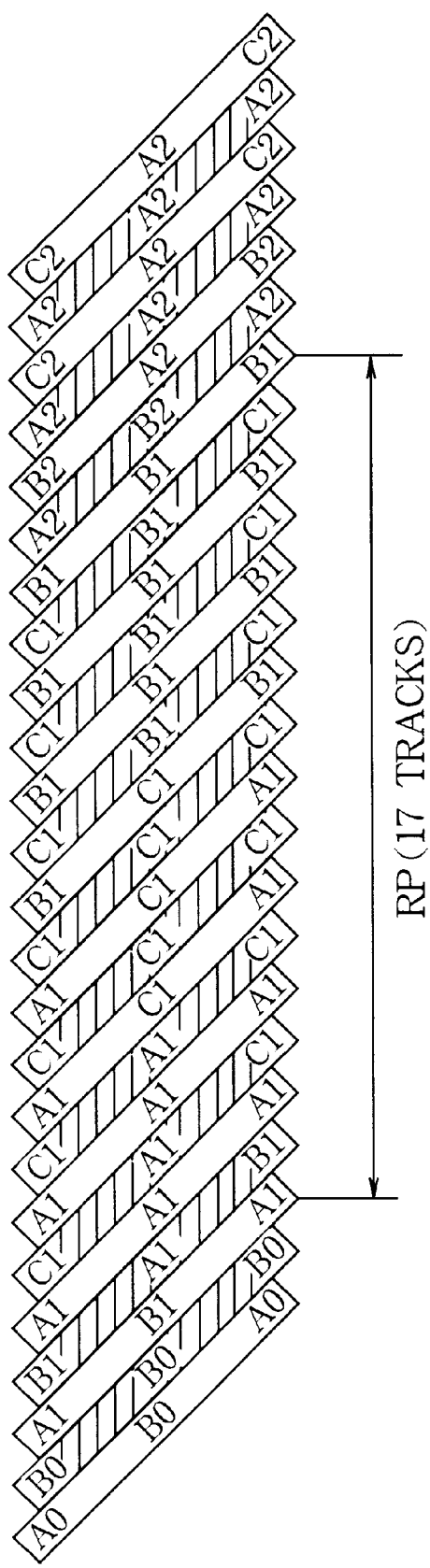
FIG. 38 is a diagram showing a recording pattern of HP data recorded on the tracks in Embodiment 8.

FIG. 38 shows a recording pattern of HP data on tracks in Embodiment 8.

In Embodiment 7, the recording pattern shown in FIG. 34 is used. In Embodiment 8, the recording patterns of the tracks forming one track group include a pattern TP1 in which HP data B is recorded in the copy area at the center of the track, and HP data A is recorded in the copy areas at both ends of the track, a pattern TP2 in which HP data A is recorded in the copy area at the center of the track, and HP data B is recorded in the copy areas at both ends of the track, a pattern TP3 in which HP data A is recorded in the copy areas at the center and both ends of the track, a pattern TP4 in which HP data A is recorded in the copy area at the center of the track, and HP data C is recorded in the copy areas at both ends of the track, a pattern TP5 in which HP data C is recorded in the copy area at the center of the track, and HP data A is recorded in the copy areas at both ends of the track, a pattern TP6 in which HP data C is recorded in the copy areas at the center and both ends of the track, a pattern TP7 in which HP data C is recorded in the copy area at the center of the track, and HP data B is recorded in the copy areas at both ends of the track, a pattern TP8 in which HP data B is recorded in the copy area at the center of the track, and HP data C is recorded in the copy areas at both ends of the track, and a pattern TP9 in which HP data B is recorded in the copy areas at the center and both ends of the track, and in one track group, a first track of pattern TP5 is disposed in the center of the track group, second and third tracks of pattern TP6 are disposed on both sides of and adjacent to the first track of pattern TP5, a fourth track of pattern TP5 is disposed adjacent one of the second and third tracks of pattern TP6, a fifth track of pattern TP7 is disposed adjacent the other of the second and third tracks, and on the opposite side of the fourth track of pattern TP5, with respect to the first track, a sixth track of pattern TP1 is disposed at the head or tail (at the head in the illustrated example) of the track group, and on the same side of the first track as the fourth track, a seventh track of pattern TP2 is disposed next to the track of pattern TP1, and on the same side of the first track as the fourth track, an eighth track of pattern TP9 is disposed at the tail or head (at the tail, in the illustrated example) of the track group, and on the same side of the first track as the fifth track, tracks of patterns TP3 and TP4 are alternately and repeatedly disposed between the seventh track and the fourth track, tracks of patterns TP8 and TP9 are alternately and repeatedly disposed between the eighth track and the fifth track.

In Embodiment 8, each track group consists of 17 tracks. The invention is not limited to the particular number of the tracks, and may also be applicable if the number of tracks forming a track groups is a track number given by 6×m+5 or 4×n+5 where m and n are integers not smaller than 1 and satisfying 3×m=2×n, that is the number of tracks forming a track group may be J given by J=12×I+5, where I is a positive integer.

In Embodiment 8, the intra-picture data contained in the input bit stream are all used. But detection of intra-picture data is facilitated if intra-picture data contained in intra-frame or intra-field.

This is because of the following reason. That is, when variable-length encoding is performed, the header of the input bit stream is detected, and the intra-picture data is recognized from the header. But if the intra-picture data used as the HP data is limited to intra-frame or intra-field, it is unnecessary to detect intra-information attendant to the macro blocks and the detection of the intra-picture data can be simplified by utilizing the picture header attendant to the head of one frame.

Embodiment 9

Figure 39A:
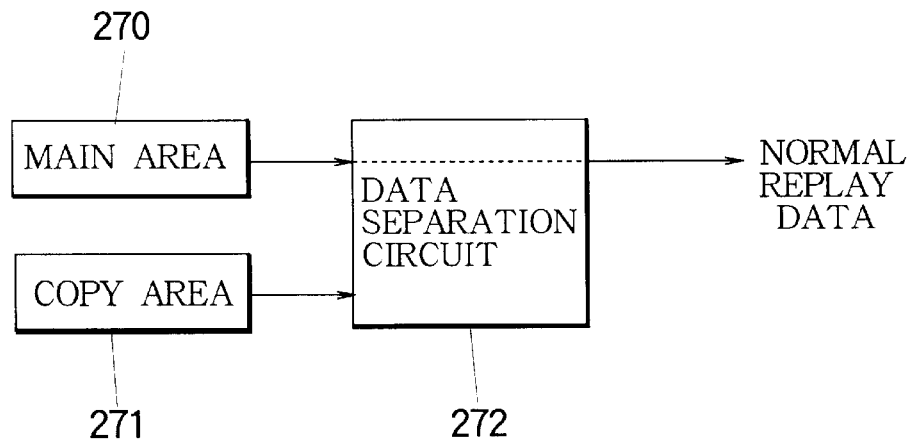
FIG. 39A and FIG. 39B are diagrams showing an example of replay system of a digital VTR in Embodiment 8.
Figure 39B:
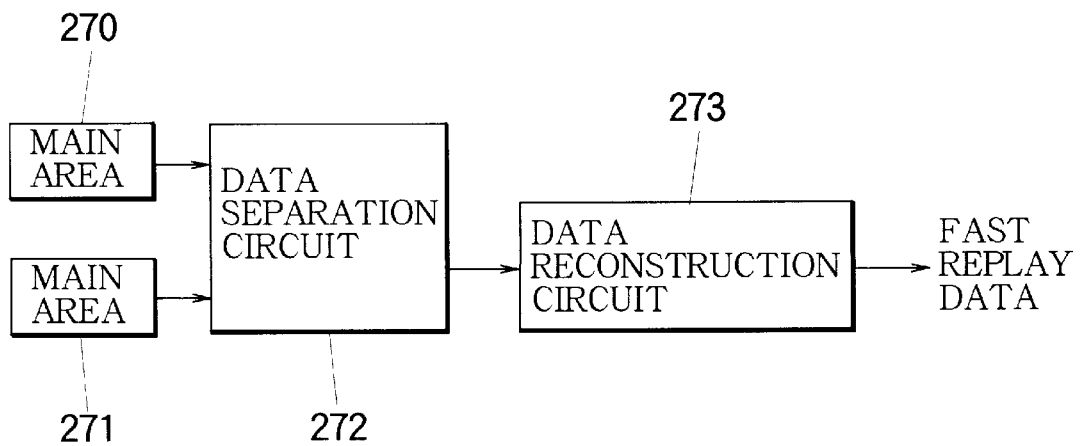

In connection with Embodiment 9, replay from the tape recorded in Embodiment 7 and Embodiment 8 is explained, FIG. 39A and FIG. 39B show an example of replay system of a digital VTR of Embodiment 9. It is assumed, as in the prior art example, that the drum has two heads opposite to each other, and 180° apart from each other, and the tape is wrapped around the drum over 180°.

Reference numeral 270 denotes main areas in which the input bit stream is recorded on the tape, without modification, 271 denotes copy areas in which the low-frequency components of the DCT coefficients of the intra-picture data, extracted from the input bit stream, are recorded as HP data, 272 denotes a data separation circuit for selecting the output replay bit stream from the bit stream from the main areas and the bit stream from the copy areas, and 273 denotes a data reconstruction circuit for combining, for reconstruction, the HP data output from the data separation circuit during fast replay.

During normal replay, the data from the main areas 270 and the data from the copy areas 271 are input and judgement is made whether the sync block of the main area or the sync block of the copy areas is being replayed, in accordance with the ID in the sync block, and the data of the main areas is selected as the replay data.

During fast replay, the data separation circuit 272 outputs the sync blocks from the copy areas, in accordance with the ID's from the respective sync blocks. The data reconstruction circuit 273 checks the phase signal of the data of the input sync block, checks the HP data number in the sync blocks having identical phase signal, and forms a set of three HP data recorded in one track group. In this way, a bit stream of intra-picture data is formed, and is output to the decoder.

Figure 40:
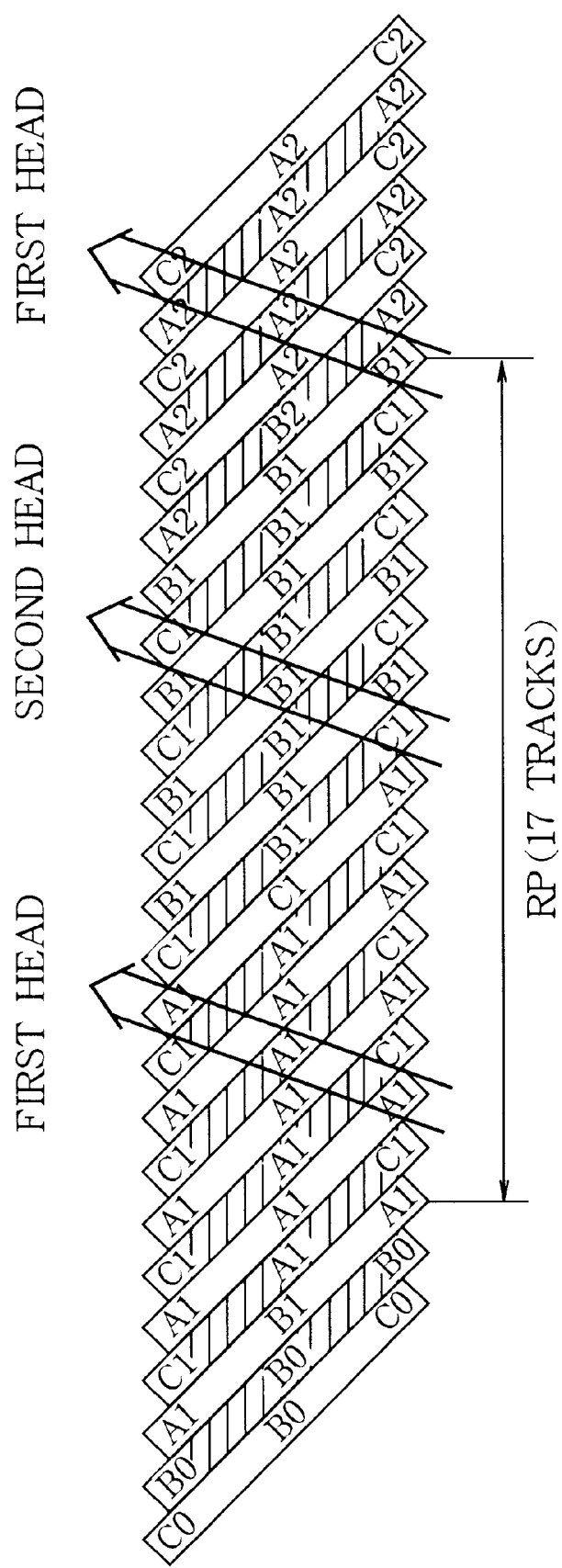
FIG. 40 is a diagram showing scanning traces of a rotary head during the seven-time speed replay.

FIG. 40 is a diagram showing a scanning trace of the rotary head at the time of seven-time speed replay. The operation of the seven-time speed replay from the magnetic tape of the recording pattern of FIG. 34 will next be described. One track group consists, for example of 17n tracks, as indicated by RP, at the bottom of the drawing, and A, B and C HP data are recorded 17 times each. Let us consider a situation where first and second heads scan at a seven-time speed.

When the first head records tracks without hatching, and the second head records tracks with hatching. When the first head scans as shown on the left side of the drawing only data A1 can be obtained as the HP data because of the azimuth.

The data A1 is stored in the data reconstruction circuit 273. When the second head scans, only data C1 can be obtained. This data is also stored in the data reconstruction circuit 273. The phase signal is then checked, and if it is identical to the phase signal of A1 earlier obtained, then the data C1 is stored together with A1. If the phase signal is different, the data A1 is discarded, and only the data C1 is stored. In this case, the HP data of the A1 and C1 are stored. Finally, the data B1 and C1 can be obtained when the first head scans the tape. The phase signal of the data B1 is identical to that of A1 and C1, but the phase signal of the data C2 is different from that of A1 and C1. When B1 is obtained, a set of A1, B1 and C1 is completed, and the HP data is reconstructed. The C2 data is newly stored.

In this way, the bit stream from the main areas 270 can be replayed during normal replay, ad HP data is reconstructed during fast replay to reproduce bit stream of intra-picture data.

What is claimed is:

1. An apparatus for recording a bit stream in a recording medium without further modification and replaying the bit stream, comprising:
   replay means for replaying the bit stream from the recording medium;
   detecting means for detecting intra-picture data in the bit stream being replayed from tracks in the recording medium;
   extracting means for extracting the intra-picture data from the bit stream based on output from the detecting means;
   replay mode designating means for designating one of a normal replay mode and a slow replay mode as a replay mode, the slow replay mode being replay at a speed slower than the normal replay mode; and
   replay data outputting means for storing the extracted intra-picture data, and outputting only the entire extracted intra-picture data as replay picture data when the slow replay mode is designated,
   wherein said replay means includes a reading head;
   said apparatus further comprising
   control means for causing relative movement between said recording medium and said reading head in a forward direction and in a backward direction;
   said replay means replaying the bit stream while said control means causes the relative movement in said forward direction, and
   said control means causing the relative movement in said backward direction a predetermined amount after extracting the intra-picture data for a first time.

2. An apparatus as set forth in claim 1, wherein said replay data outputting means comprises:
   control means for stopping the recording medium for a predetermined period after all the intra-picture data is extracted from the bit stream by normal speed replay.

3. The apparatus of claim 1, wherein said control means performs said relative movement in said backward direction when the detecting means detects an end of the intra-picture data.

4. The apparatus of claim 1, further comprising:
   address identifying means for identifying a track address of a track from which the bit stream is being replayed; and
   the control means controlling the relative movement in said backward direction based on output from the address identifying means.

5. The apparatus of claim 1, wherein the relative movement is set such that a next intra-picture data extracted by the extracting means precedes the extracted intra-picture data to effect reverse slow replay.

6. The apparatus of claim 1, wherein
   the replay mode designating means designates one of the normal replay mode, the slow replay mode and still replay as the replay mode; and
   the replay data output means outputs the extracted intra-picture data when the still replay ode is designated.

7. The apparatus of claim 4, wherein the control means causes the relative movement in said backward direction to a track preceding a track storing a beginning of the extracted intra-picture data.

8. The apparatus of claim 5, further comprising:
   address identifying means for identifying a track address of a track from which the bit stream is being replayed; and
   the control means controlling the relative movement in said backward direction based on output from the address identifying means.

9. An apparatus for recording a bit stream in a recording medium without further modification and replaying the bit stream, comprising:
   replay means including a reading head;
   control means for causing relative movement between said recording medium and said reading head in a forward direction when said replay means replays the bit stream and in a backward direction;
   said replay means replaying the bit stream from the recording medium while said control means causes the relative movement in said forward direction;
   detecting means for detecting intra-picture data in the bit stream being replayed from tracks in the recording medium;
   extracting means for extracting the intra-picture data from the bit stream based on output from the detecting means;
   replay mode designating means for designating one of a normal replay mode and a slow replay mode as a replay mode, the slow replay mode being at a speed slower than the normal replay mode; and
   replay data outputting means for storing the extracted intra-picture data, and outputting only the entire extracted intra-picture data as replay picture data when the slow replay mode is designated;
   said control means causing the relative movement in said backward direction a predetermined amount after extracting the intra-picture data for a first time.

10. A method for recording a bit stream in a recording medium without further modification and replaying the bit stream, comprising:
    (a') replaying the bit stream from the recording medium;
    (a) detecting intra-picture data in the bit stream being replayed from tracks in the recording medium;
    (b) extracting the intra-picture data from the bit stream based on output from step (a);
    (c) designating one of a normal replay ode and a slow replay mode as a replay mode, the slow replay mode being replay at a speed slower than the normal replay mode;
    (d) storing the extracted intra-picture data;
    (e) outputting only the entire extracted intra-picture data as replay picture data when the slow replay mode is designated;

wherein said step (a) includes replaying the bit stream by means of a reading head while causing relative movement between said recording medium and said reading head in a forward direction, and (f) causing the relative movement in a backward direction a predetermined amount after extracting the intra-picture data for a first time.

11. The method of claim 10, wherein said step (f) performs the relative movement in said backward direction when said step (a) detects an end of the intra-picture data.

12. The method of claim 10, further comprising:

(g) identifying a track address of a track from which the bit stream is being replayed; and wherein said step (f) causes the relative movement in said backward direction based on output from step (g).

13. The method of claim 10, wherein the relative movement is set such that a next intra-picture data extracted by said step (b) precedes the extracted intra-picture data to effect reverse slow replay.

14. The method of claim 10, wherein said step (c) designates one of the normal replay mode, the slow replay mode and still replay as the replay mode; and said step (e) outputs only the entire extracted intra-picture data when the still replay mode is designated.

15. The method of claim 12, wherein said step (f) causes the relative movement in said backward direction to a track preceding a track storing a beginning of the extracted intra-picture data.

16. The method of claim 13, further comprising:

(g) identifying a track address of a track from which the bit stream is being replayed; and wherein said step (f) causes the relative movement in the backward direction based on output from step (g).

17. A method for recording a bit stream in a recording medium without further modification and replaying the bit stream, comprising:

(a') replaying, by means of a reading head, the bit stream from the recording medium while causing relative movement between the recording medium and the recording head in a forward direction;

(a) detecting intra-picture data in the bit stream being replayed from tracks in the recording medium;

(b) extracting the intra-picture data from the bit stream based on output from step (a);

(c) designating one of a normal replay mode and a slow replay mode as a replay mode, the slow replay mode being replay at a speed slower than the normal replay mode;

(d) storing the extracted intra-picture data;

(e) outputting only the entire extracted intra-picture data as replay picture data when the slow replay mode is designated; and (f) causing relative movement in a backward direction a predetermined amount after extracting the intra-picture data for a first time.

* * * * *